US008805439B2

(12) United States Patent
Kim et al.

(10) Patent No.: US 8,805,439 B2
(45) Date of Patent: Aug. 12, 2014

(54) MOBILE TERMINAL AND METHOD FOR CONTROLLING THE SAME

(75) Inventors: Jong-Hwan Kim, Gyeonggi-do (KR); Sang-Yun Oh, Seoul (KR); Woo-Jin Suh, Seoul (KR); Sang-Hyuck Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 875 days.

(21) Appl. No.: 12/552,766

(22) Filed: Sep. 2, 2009

(65) Prior Publication Data

US 2010/0227642 A1 Sep. 9, 2010

(30) Foreign Application Priority Data

Mar. 5, 2009 (KR) .................. 10-2009-0019010
Apr. 21, 2009 (KR) .................. 10-2009-0034739

(51) Int. Cl.
*H04M 1/00* (2006.01)
*H04B 1/38* (2006.01)

(52) U.S. Cl.
USPC ...... 455/556.1; 455/557; 455/566; 455/550.1

(58) Field of Classification Search
CPC .................................................. H04M 1/025
USPC ............. 455/550.1, 556.1, 557, 575.1, 575.3, 455/90.1
See application file for complete search history.

(56) References Cited

U.S. PATENT DOCUMENTS

| | | | | |
|---|---|---|---|---|
| 1,889,018 A * | 11/1932 | Gilbert | .......................... | 455/254 |
| 1,920,743 A * | 8/1933 | French et al. | ................. | 333/167 |
| 2,395,413 A * | 2/1946 | Lange | ........................... | 455/144 |
| 2,587,667 A * | 3/1952 | Toth | ........................... | 455/197.1 |
| 2,779,869 A * | 1/1957 | Gerks | ............................. | 327/77 |
| 3,090,918 A * | 5/1963 | Arguimbau | ................... | 455/210 |
| 5,561,446 A * | 10/1996 | Montlick | ....................... | 345/173 |
| 5,857,148 A * | 1/1999 | Weisshappel et al. | ..... | 455/575.3 |
| 5,960,332 A * | 9/1999 | Michalzik | ................. | 455/575.1 |
| 6,009,336 A | 12/1999 | Harris et al. | | |
| 6,141,569 A * | 10/2000 | Weisshappel et al. | ........ | 455/572 |
| 6,643,529 B1 * | 11/2003 | Inoue et al. | ................. | 455/575.4 |
| 7,003,316 B1 * | 2/2006 | Elias et al. | ................. | 455/556.1 |
| 7,065,389 B2 * | 6/2006 | Kim et al. | ..................... | 455/572 |
| 7,197,346 B2 * | 3/2007 | Eromaki et al. | ........... | 455/575.8 |
| 7,383,038 B2 * | 6/2008 | Koenck et al. | ................ | 455/418 |
| 7,537,167 B1 * | 5/2009 | Miller | ....................... | 235/472.01 |
| 7,831,218 B2 * | 11/2010 | Wulff et al. | .................. | 455/90.3 |
| 7,853,254 B2 * | 12/2010 | Koenck et al. | ............. | 455/432.1 |
| 8,204,489 B2 * | 6/2012 | Kim et al. | ................. | 455/414.4 |
| 8,244,294 B2 * | 8/2012 | Chae et al. | ................. | 455/550.1 |
| 8,483,755 B2 * | 7/2013 | Kumar | ....................... | 455/556.1 |
| 8,600,437 B2 * | 12/2013 | Kumar | ....................... | 455/556.1 |

(Continued)

OTHER PUBLICATIONS

European Patent Office Application Serial No. 09013230.9, Search Report dated Aug. 5, 2013, 7 pages.

*Primary Examiner* — Tilahun B Gesesse
(74) *Attorney, Agent, or Firm* — Lee, Hong, Degerman, Kang & Waimey

(57) ABSTRACT

A mobile terminal includes a sub-device that is attached thereto or detached therefrom, to remotely control the operation and state of the terminal. The mobile terminal includes: a sub-device having an input/output unit and attached to or detached from the terminal; and a controller configured to receive a user input via a certain communication path from the sub-device when the sub-device is separated, and control elements and applications of the terminal according to the user input.

58 Claims, 79 Drawing Sheets

(56) References Cited

U.S. PATENT DOCUMENTS

| | | |
|---|---|---|
| 2002/0082042 A1 | 6/2002 | Mark et al. |
| 2004/0018851 A1* | 1/2004 | Koenck et al. ............. 455/550.1 |
| 2004/0166895 A1* | 8/2004 | Koenck et al. ............. 455/556.1 |
| 2007/0004461 A1* | 1/2007 | Bathina et al. ................ 455/566 |
| 2007/0182663 A1 | 8/2007 | Biech |
| 2008/0123287 A1 | 5/2008 | Rossell et al. |
| 2008/0273297 A1* | 11/2008 | Kumar ........................ 361/680 |
| 2008/0274731 A1* | 11/2008 | Koenck et al. ............. 455/426.1 |
| 2008/0304688 A1* | 12/2008 | Kumar ........................ 381/370 |
| 2009/0179869 A1* | 7/2009 | Slotznick ..................... 345/173 |
| 2011/0143769 A1* | 6/2011 | Jones et al. ................ 455/456.1 |
| 2011/0230178 A1* | 9/2011 | Jones et al. ................ 455/422.1 |
| 2012/0108215 A1* | 5/2012 | Kameli ..................... 455/412.2 |

\* cited by examiner

FIG. 10B
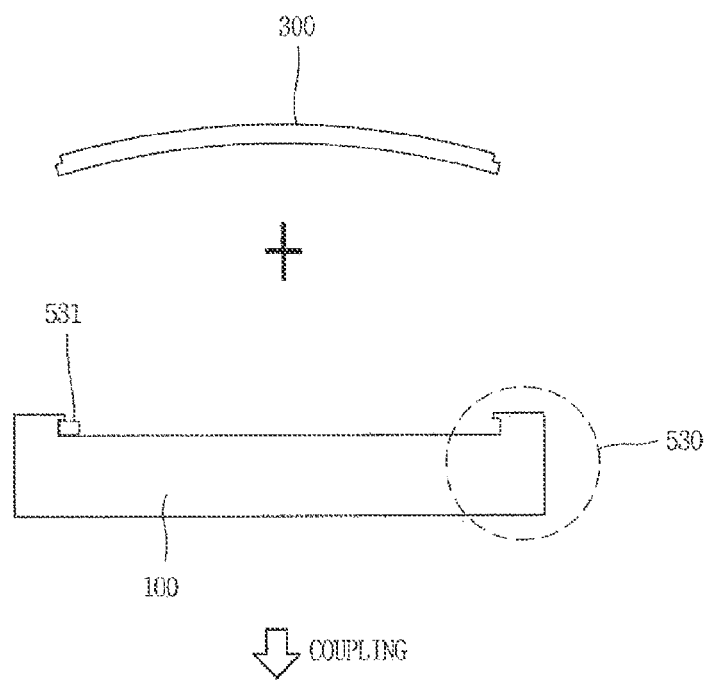
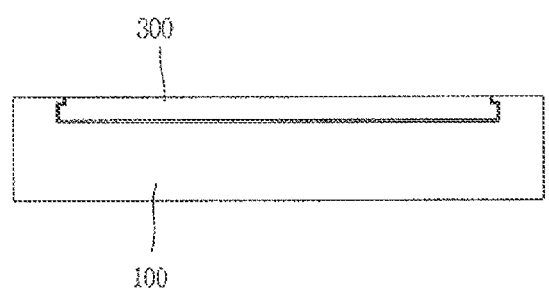

FIG. 10D
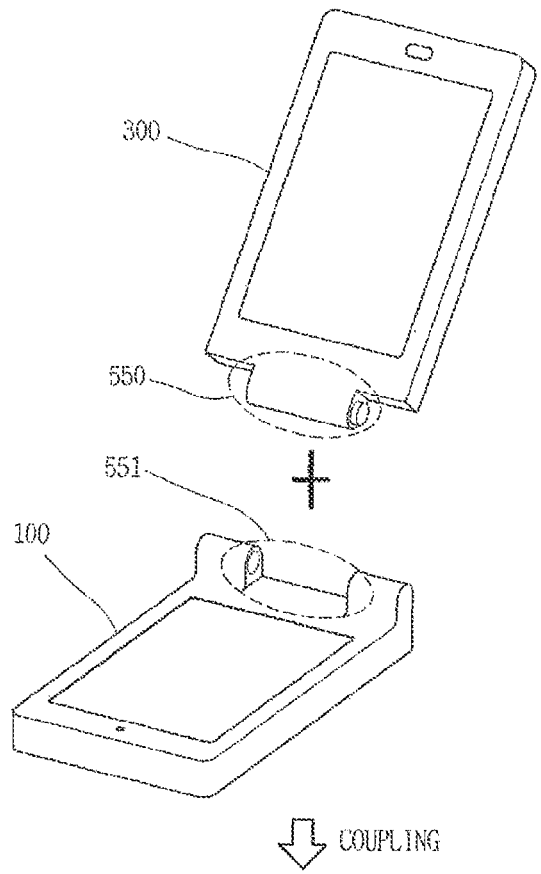
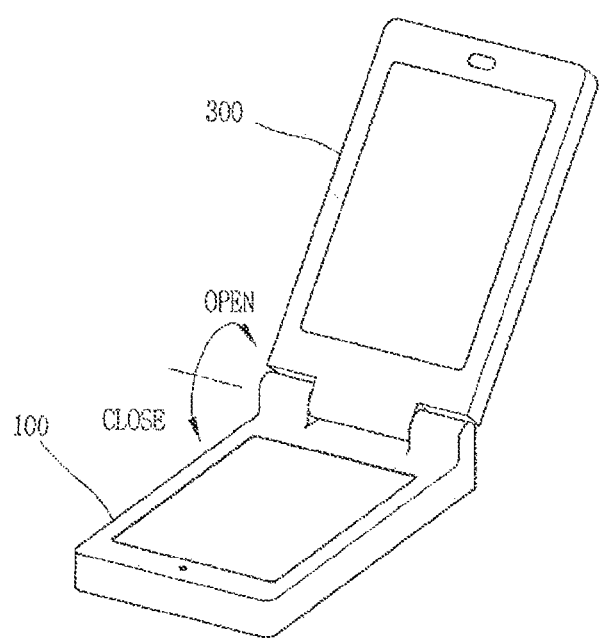

FIG. 11B
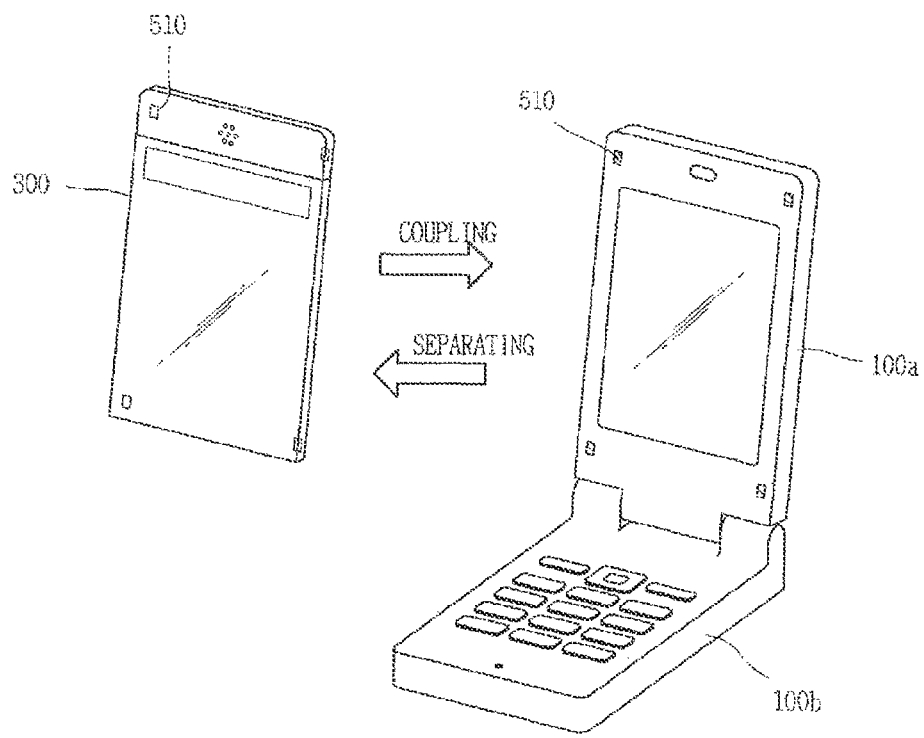
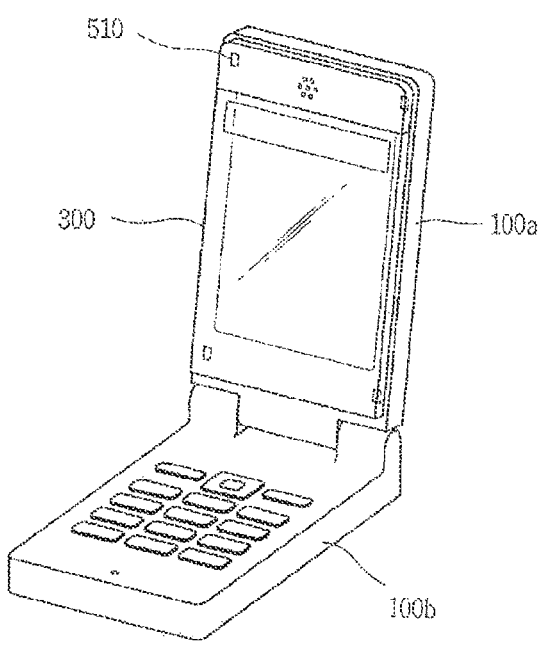

FIG. 12B
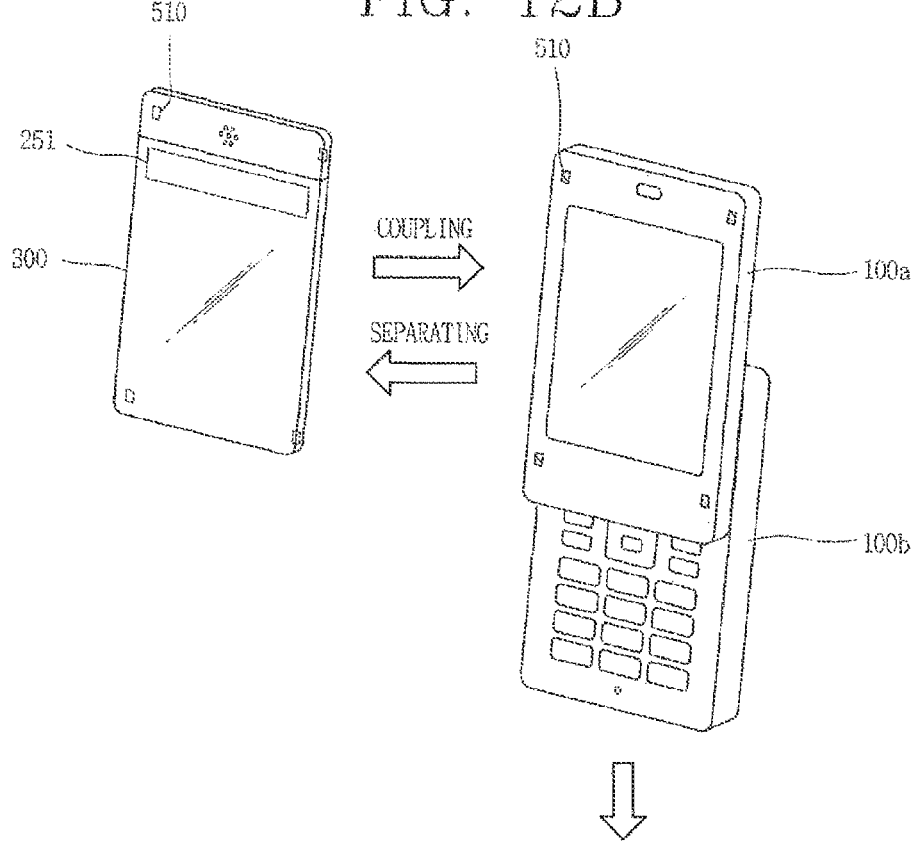
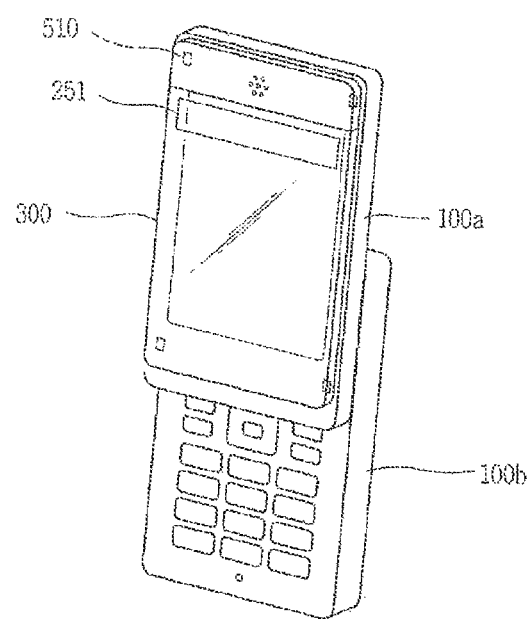

FIG. 12D
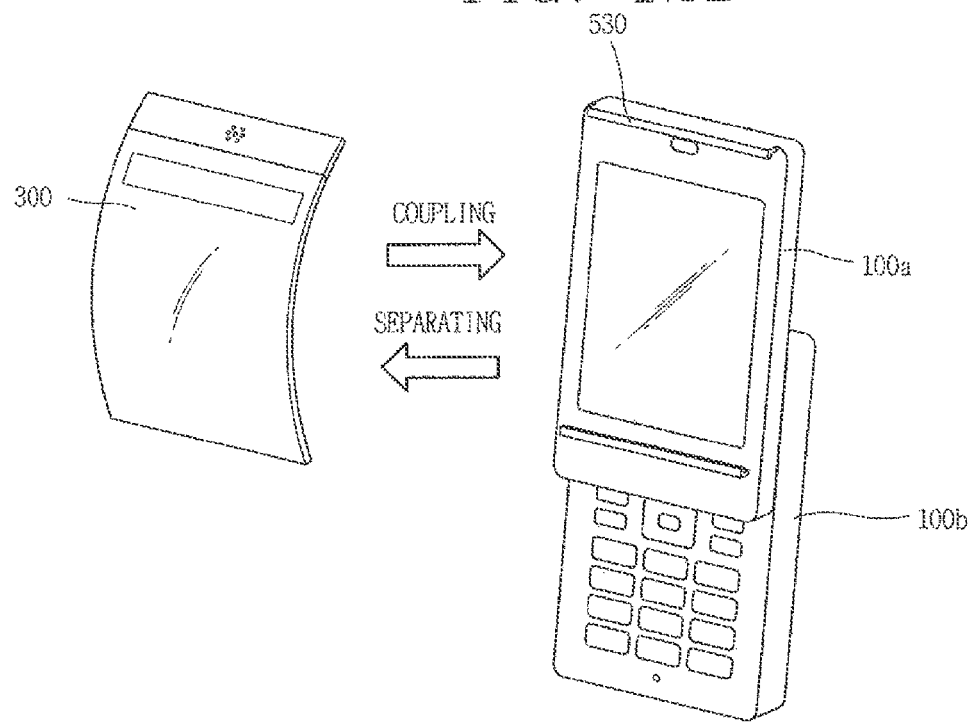
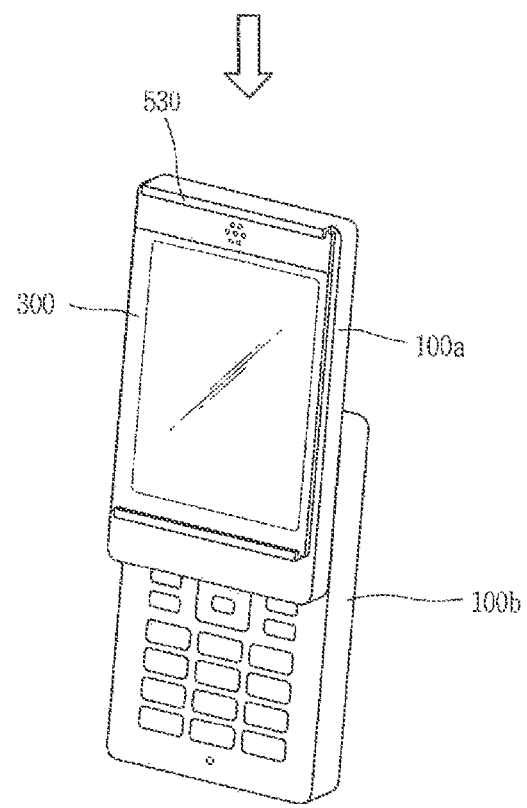

FIG. 13D
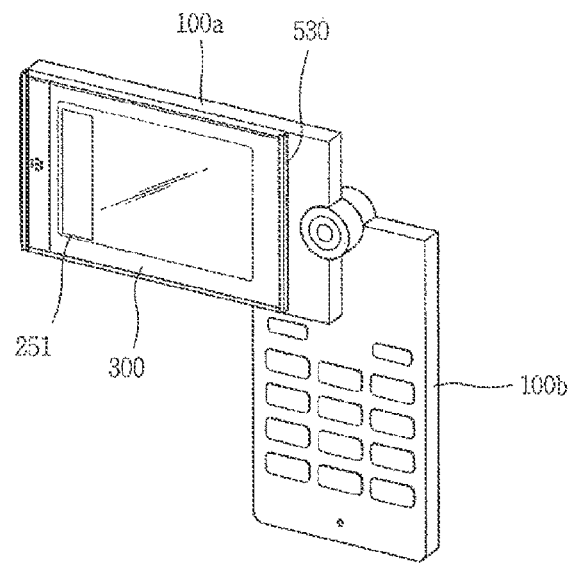
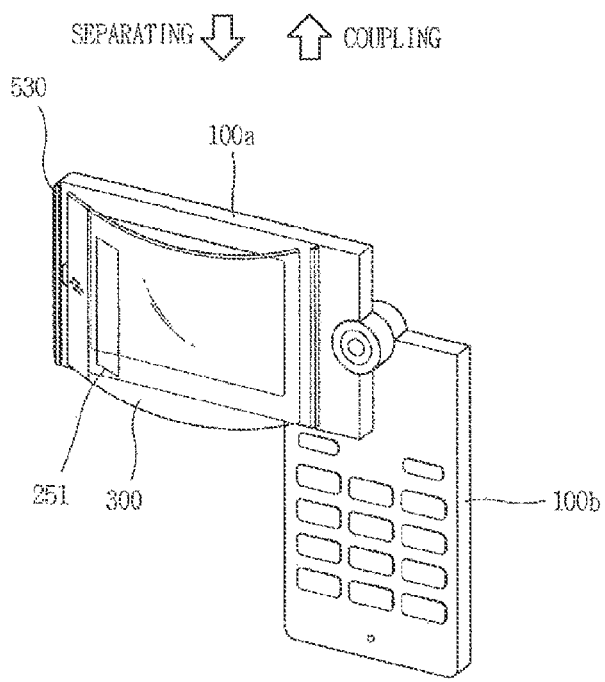

FIG. 14A
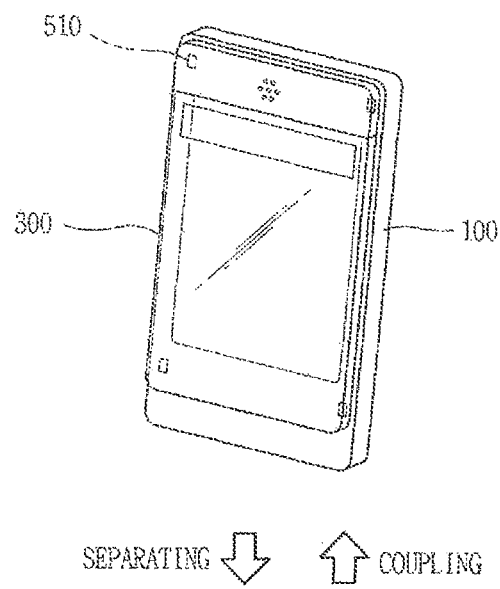
SEPARATING ⇩   ⇧ COUPLING
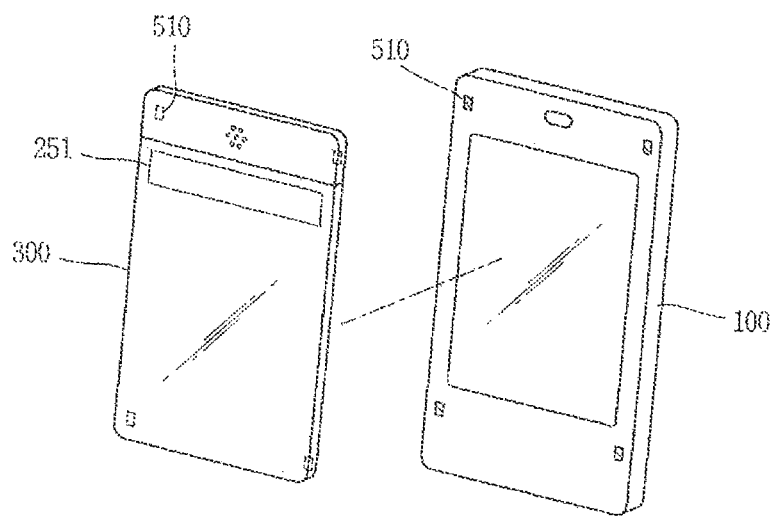

FIG. 14B
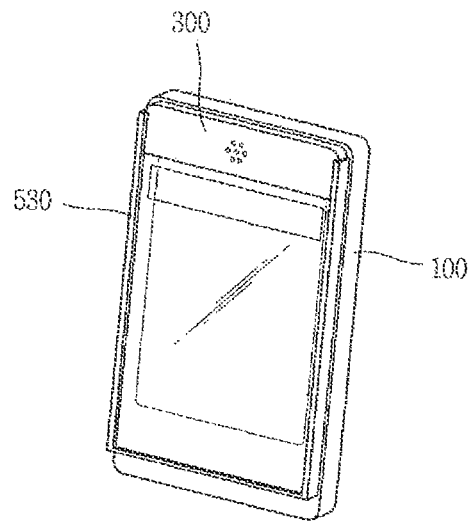
SEPARATING ⇩   ⇧ COUPLING
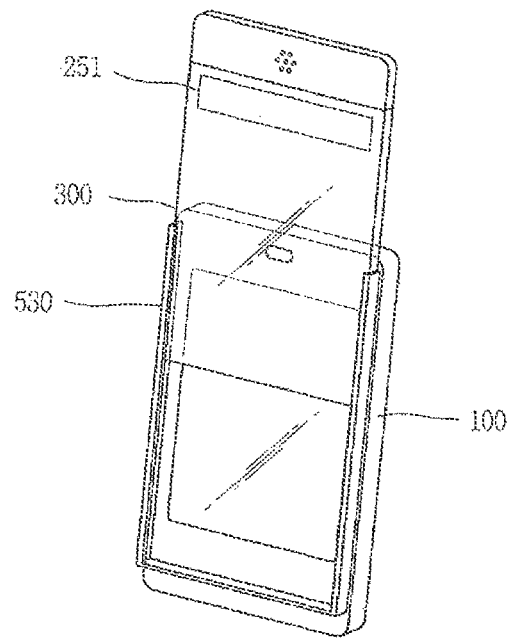

FIG. 14C
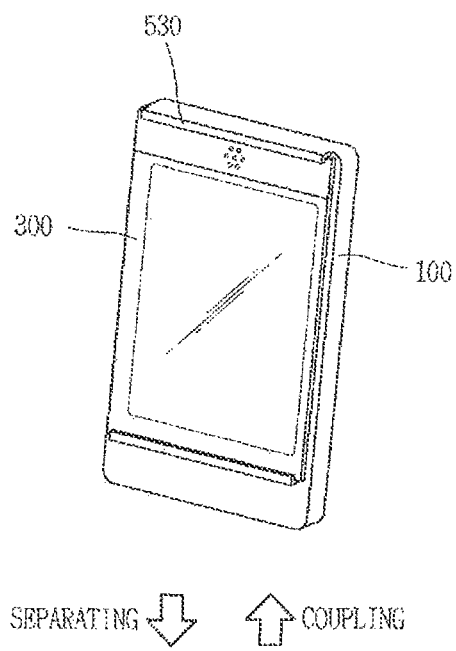
SEPARATING ⇩   ⇧ COUPLING
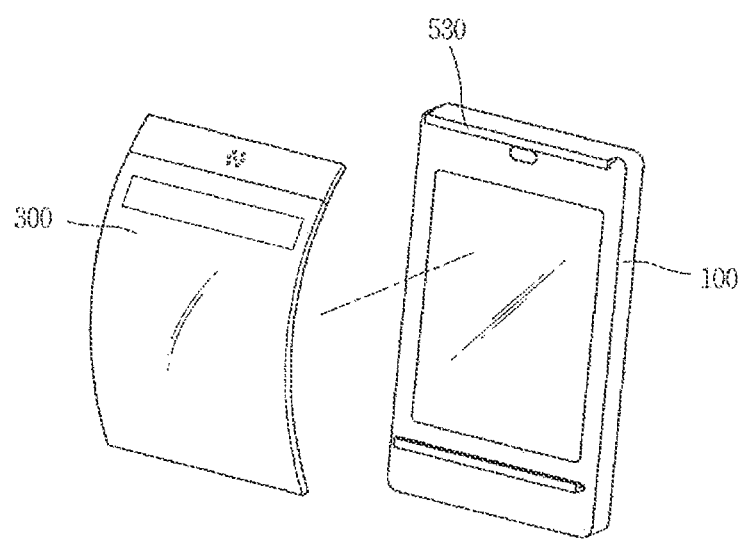

FIG. 15D
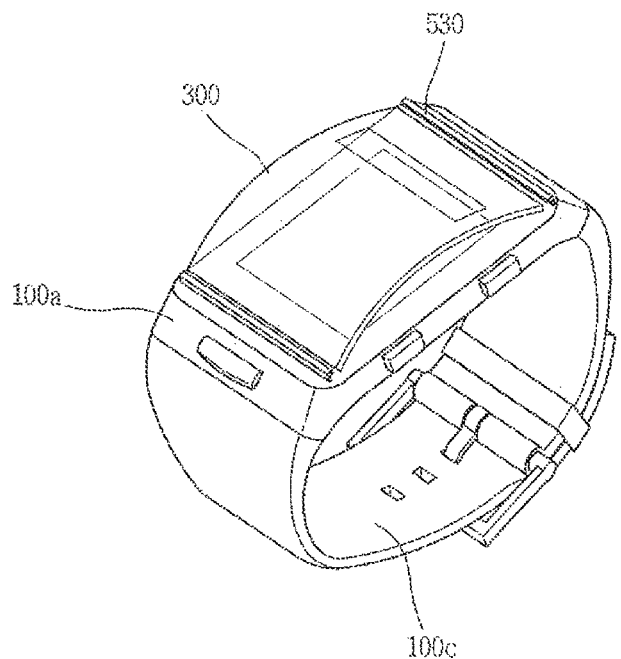
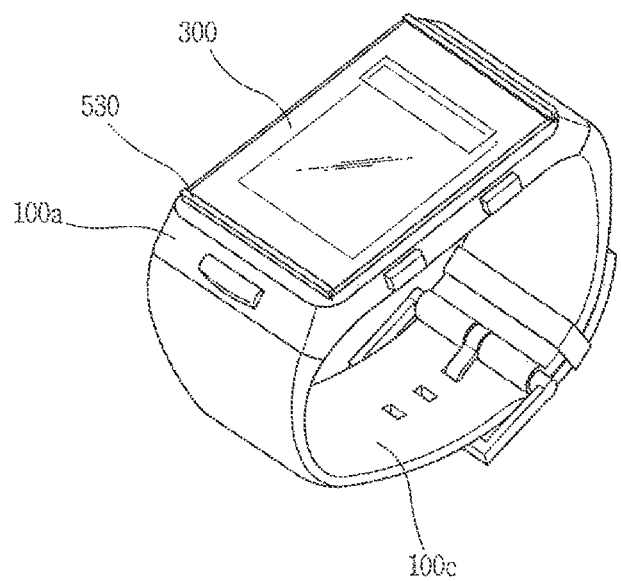

FIG. 16
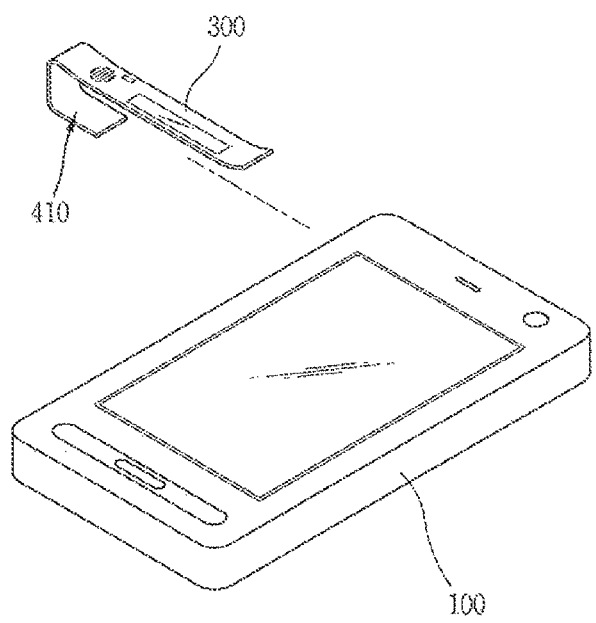
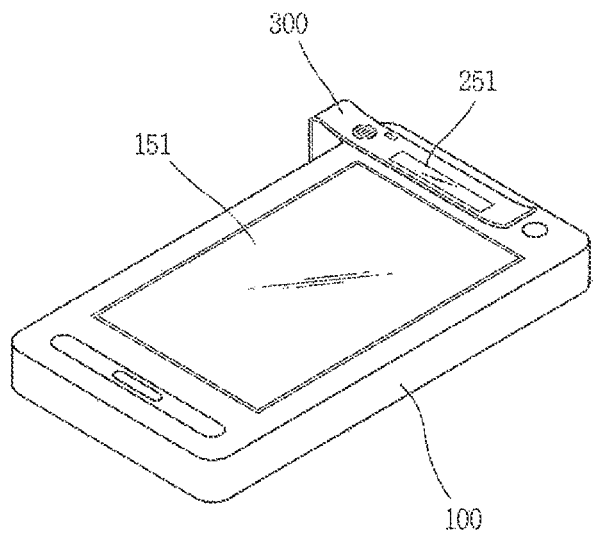

FIG. 18
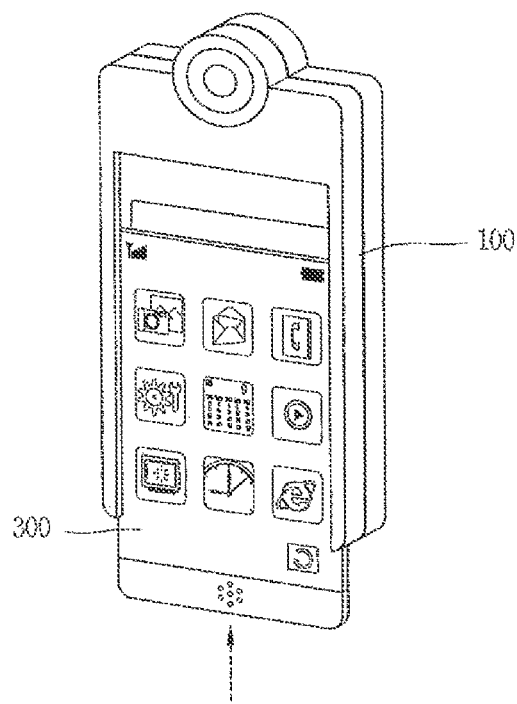
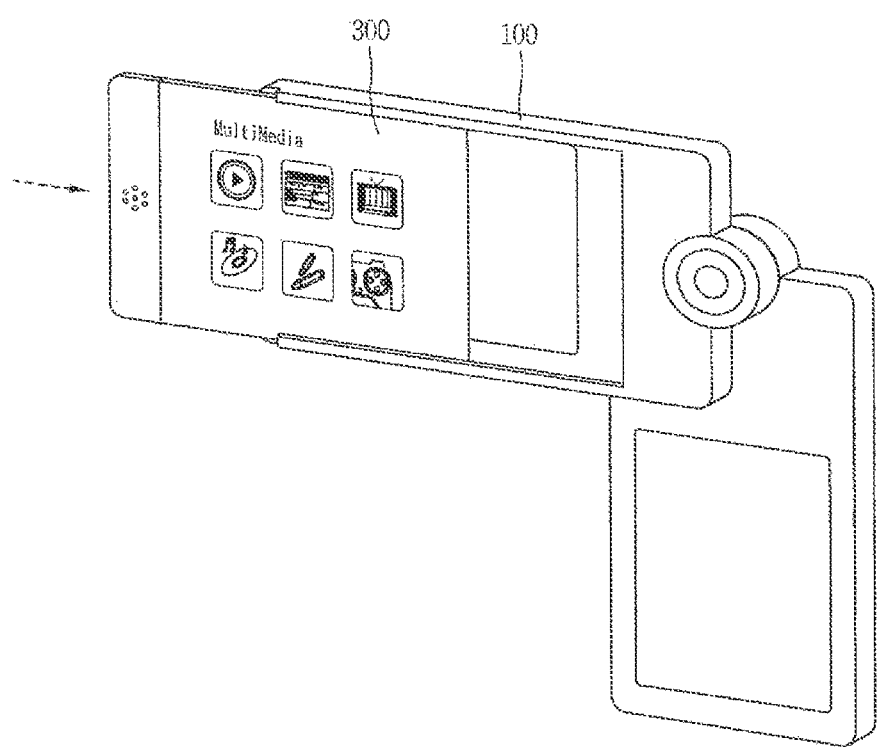

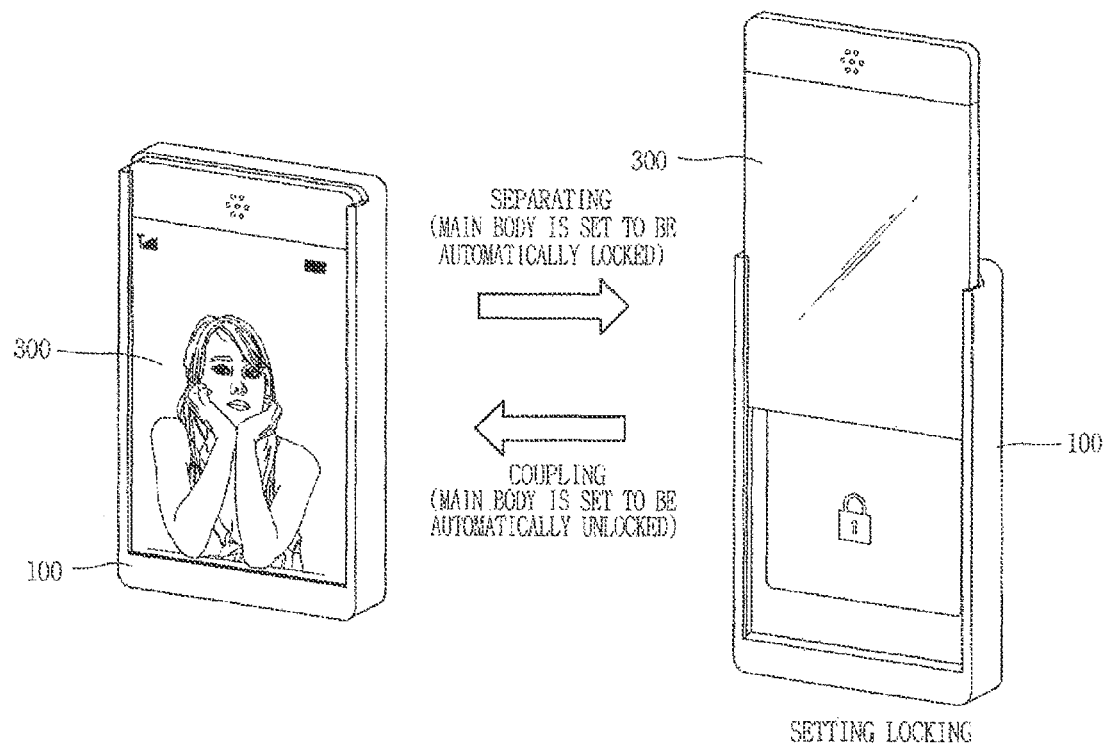

FIG. 41
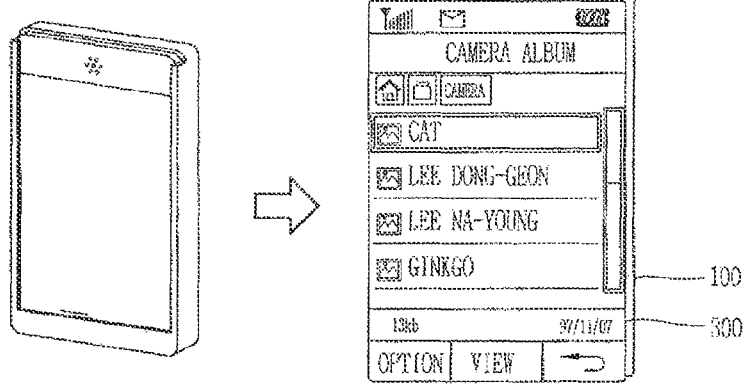
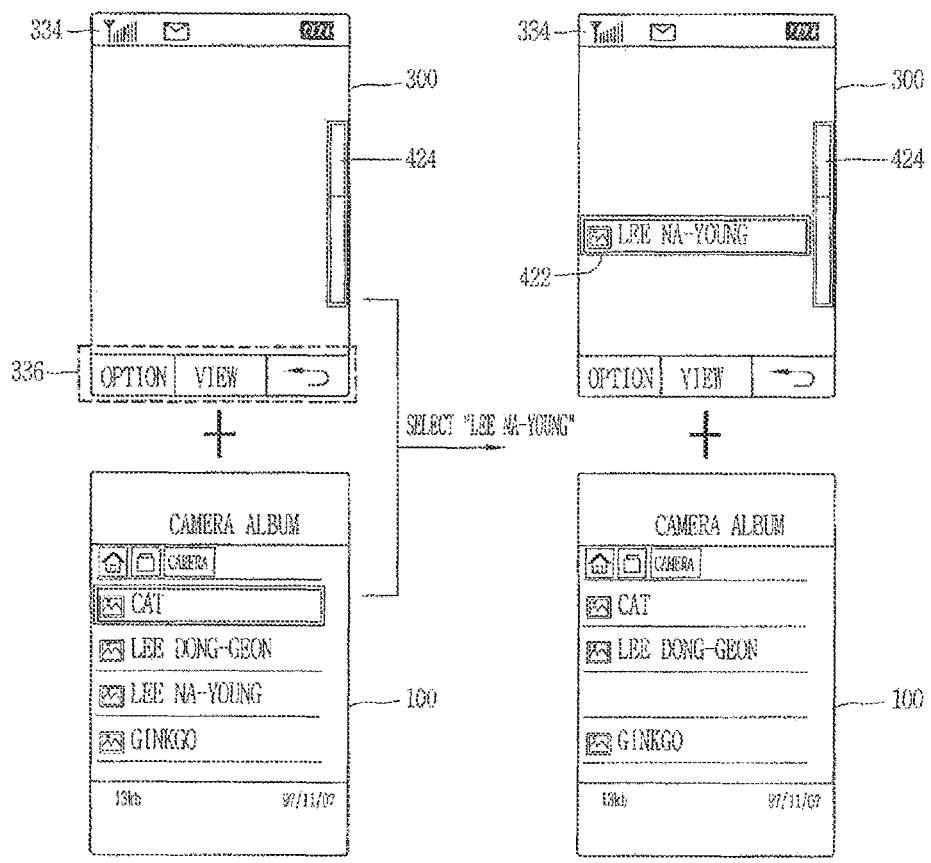

POWER OF MAIN DEVICE(100) CAN BE
CONTROLLED BY SUB-DEVICE(300)

BAR TYPE TERMINAL

FOLDER TYPE TERMINAL

SLIDE TYPE TERMINAL

FIG. 44
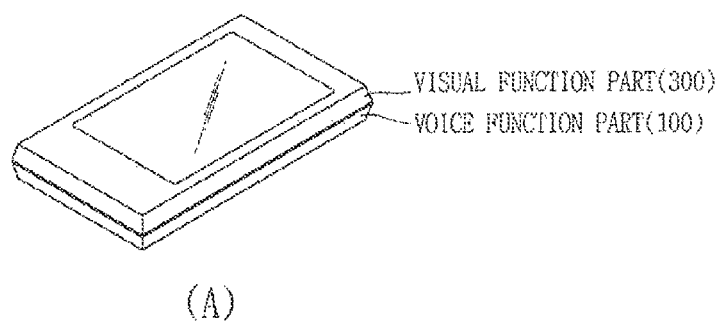
(A)
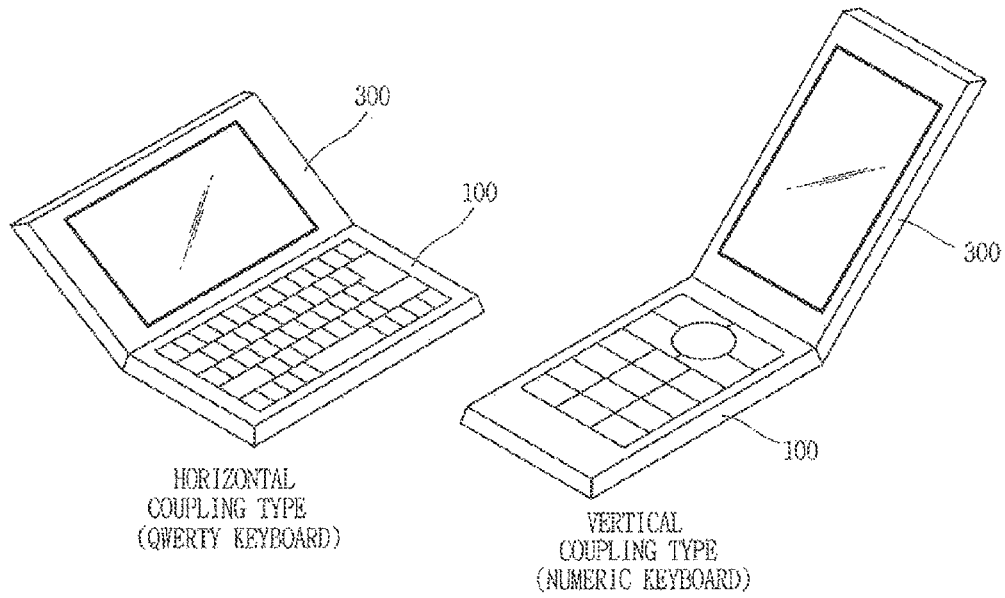
(B)

FIG. 48
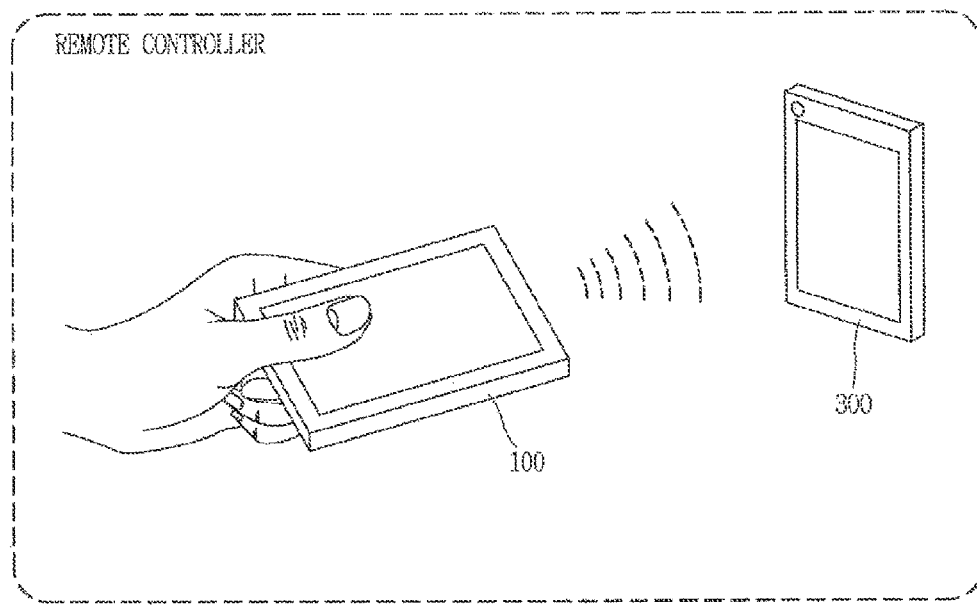
OR
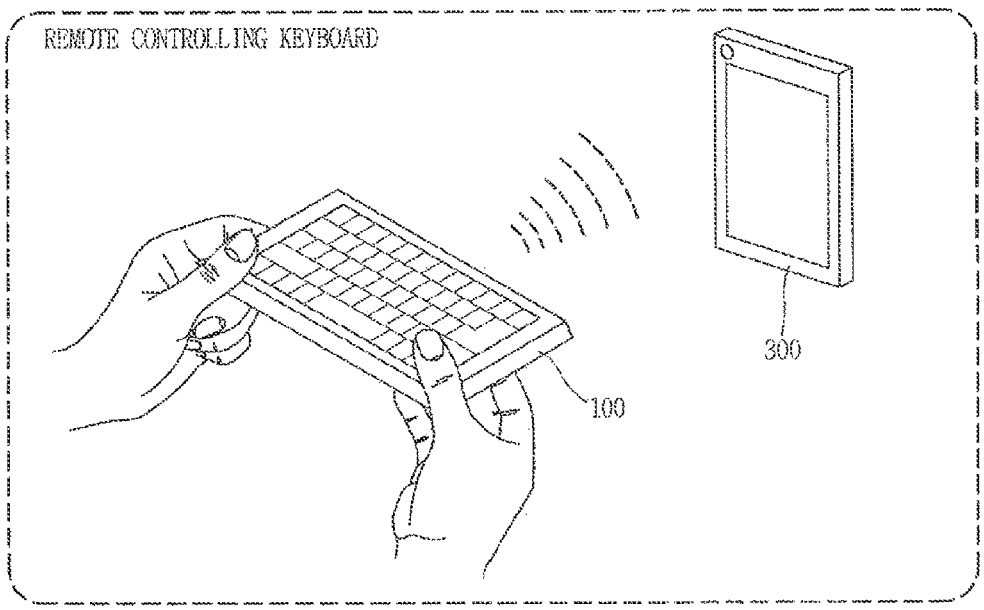

US 8,805,439 B2

MOBILE TERMINAL AND METHOD FOR CONTROLLING THE SAME

CROSS REFERENCE TO RELATED APPLICATIONS

Pursuant to 35 U.S.C. §119(a), this application claims the benefit of earlier filing date and right of priority to Korean Application Nos. 10-2009-0019010, filed in Korea on Mar. 5, 2009, and 10-2009-0034739, filed in Korea on Apr. 21, 2009, the entire contents of all of which are incorporated by reference herein in their entirety.

BACKGROUND OF THE INVENTION

1. Field of the Invention

The present invention relates to a mobile terminal that allows a sub-device to be attached thereto or detached therefrom.

2. Description of the Related Art

Terminals may be divided into a mobile terminal (portable terminal) and a stationary terminal according to whether the terminal is portable or not. The mobile terminals may be divided into a handheld terminal that can be directly carried around and a vehicle mount terminal.

According to diversification of functions, the terminals are implemented in the form of multimedia players having complex functions such as capturing images or video, reproducing music or video files, playing games, receiving broadcasts, etc.

In order to support and increase the functions of the terminals, modification of structural parts and/or software parts of the terminals may be taken into consideration. Research on mobile terminals having bodies that are made blocks or modularized so as to be detachably attached in functional or structural aspects is ongoing.

SUMMARY OF THE INVENTION

Accordingly, one object of the present invention is to address the above-noted and other problems.

Another object of the present invention is to provide a method for controlling an operation and state of a mobile terminal when a main device and a sub-device of the mobile terminal are coupled or separated.

To achieve these and other advantages and in accordance with the purpose of the present invention, as embodied and broadly described herein, the present invention provides in one aspect a mobile terminal including: a sub-device having an input/output unit and attached to or detached from the terminal; and a controller configured to receive a user input via a certain communication path from the sub-device when the sub-device is separated, and control elements and applications of the terminal according to the user input.

To achieve these and other advantages and in accordance with the purpose of the present invention, as embodied and broadly described herein, the present invention provides in another aspect a method for controlling coupling and separation of a sub-device to or from a mobile terminal, the method including: establishing a radio communication path with the sub-device when a connection of the mobile terminal with the sub-device is released; receiving a user input via the communication path; and controlling elements and applications of the terminal according to the received user input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 10a to 10d illustrate how the main device and the sub-device are coupled according to an embodiment of the present invention;

FIGS. 11a to 11e illustrate the structure and method for coupling or separating the sub-device to a folder type main device according to an embodiment of the present invention;

FIGS. 12a to 12e illustrate the structure and method for coupling or separating the sub-device to a slide type main device according to an embodiment of the present invention;

FIGS. 13a to 13d illustrate the structure and method for coupling or separating the sub-device to a swivel type main device according to an embodiment of the present invention;

FIGS. 14a to 14d illustrate the structure and method for coupling or separating the sub-device to a bar type main device according to an embodiment of the present invention;

FIGS. 15a to 15d illustrate the structure and method for coupling or separating the sub-device to a watch type main device according to an embodiment of the present invention;

FIG. 16 illustrates the structure of a clip type sub-device that can be easily attached to any types of main devices according to an embodiment of the present invention;

FIG. 18 illustrates application of the automatic controlling of the terminal operation (menu display) to a swing type or swivel type mobile terminal;

FIG. 25 illustrates automatic controlling of locking of the terminal;

FIG. 26 illustrates user setting in controlling of coupling/separating according to an embodiment of the present invention;

FIG. 41 illustrates another example of a method of controlling the main device 100 and the sub-device 300 in a coupled state;

FIG. 44 illustrates a voice function part and a visual function part of the mobile terminal;

FIG. 48 illustrates the use of a second body in a separated state;

DETAILED DESCRIPTION OF THE INVENTION

The mobile terminal according to exemplary embodiments of the present invention will now be described with reference to the accompanying drawings. In the following description, the suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present invention may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
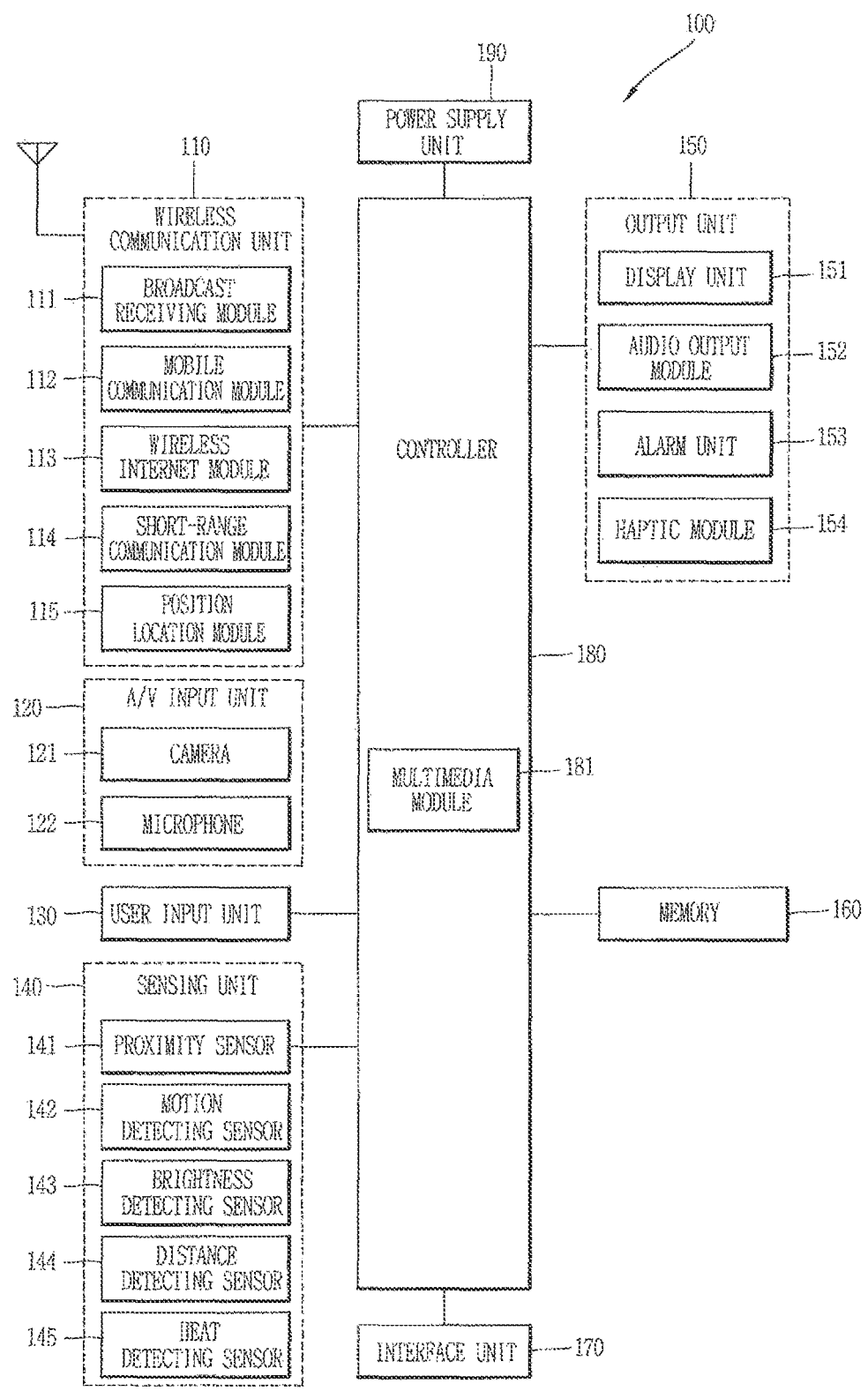
FIG. 1 is a schematic block diagram of a mobile terminal implementing an embodiment of the present invention.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180.

The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
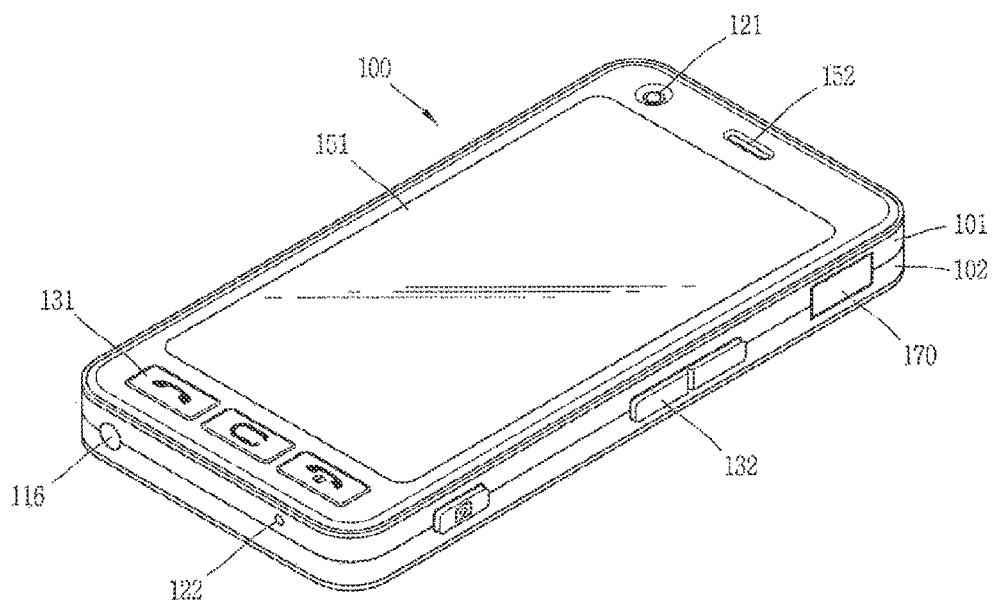
FIG. 2A is a front perspective view of a mobile terminal implementing an embodiment of the present invention.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
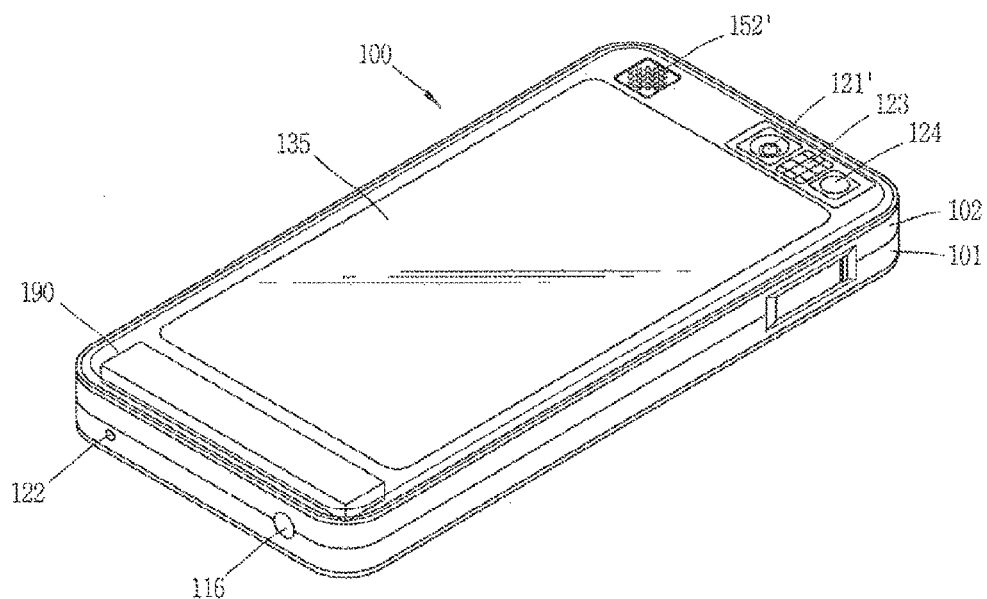
FIG. 2B is a rear perspective view of a mobile terminal implementing an embodiment of the present invention.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
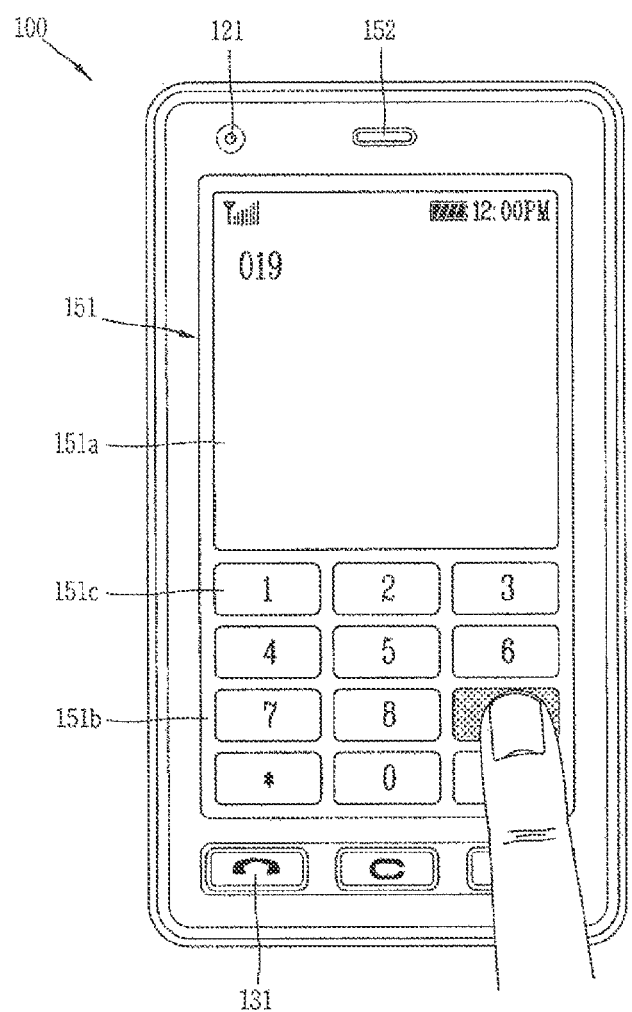
FIGS. 3a and 3b are front views of the mobile terminal for explaining operational states of the mobile terminal according to an embodiment of the present invention.
Figure 3B:
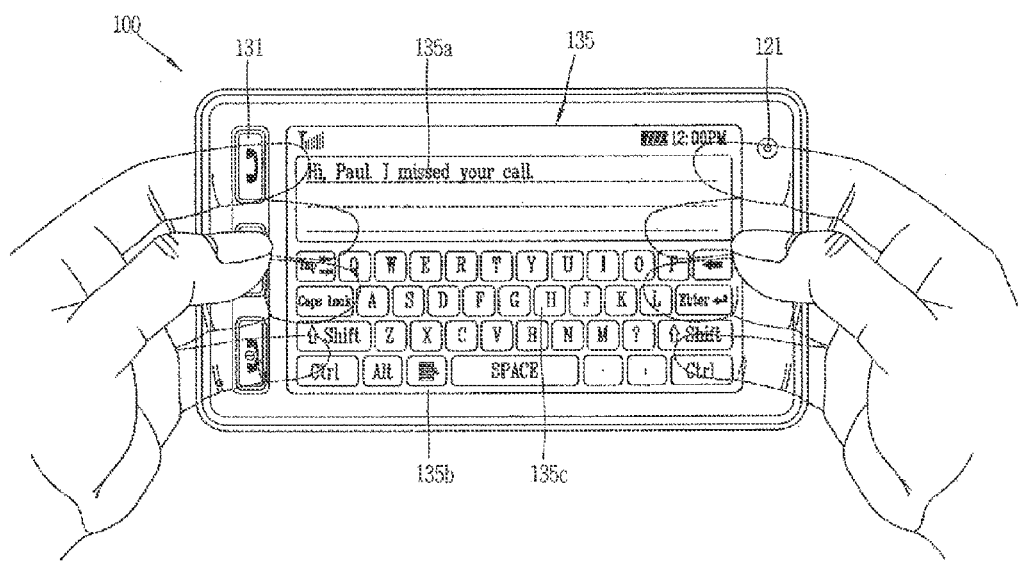

FIGS. 3A and 3B are front-view diagrams of a mobile terminal according to an example embodiment. Other embodiments, configurations and arrangements are also within the scope of the present invention.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body.

The display 151 may be operable through an entire area or may be divided into a plurality of regions. The plurality of the regions may be configured interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body is vertically arranged (i.e., in a portrait manner). FIG. 3B shows that the terminal body is horizontally arranged (i.e., in a landscape manner). The display 151 may change an output picture according to the arranged direction of the terminal body.

FIG. 3B also shows that a text input mode is activated in the mobile terminal 100. FIG. 3B shows that the touchscreen 135 may include an output window 135a and an input window 135b. The output window 135a and the input window 135b may be displayed on the display 151. A plurality of soft keys 135c representing characters, symbols and/or digits may be arranged in the input window 135b. The soft keys 135c may be arranged in a QWERTY key formation.

If the soft keys 135c are touched using the touchpad 135, the characters, symbols and/or digits corresponding to the touched soft keys may be outputted to the output window 135a. Touch input via the touchpad 135 may be advantageous in that the soft keys 135c may be prevented from being blocked by a finger in case of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the mobile terminal 100 can be executed. The simultaneous touch may correspond to a case that the terminal body is held by a user using a thumb and a first finger (clamping). The function may include activation or deactivation for the display 151 or the touchpad 135.

The proximity sensor 141 described with reference to FIG. 1 may now be explained in detail with reference to FIG. 4.

Figure 4:
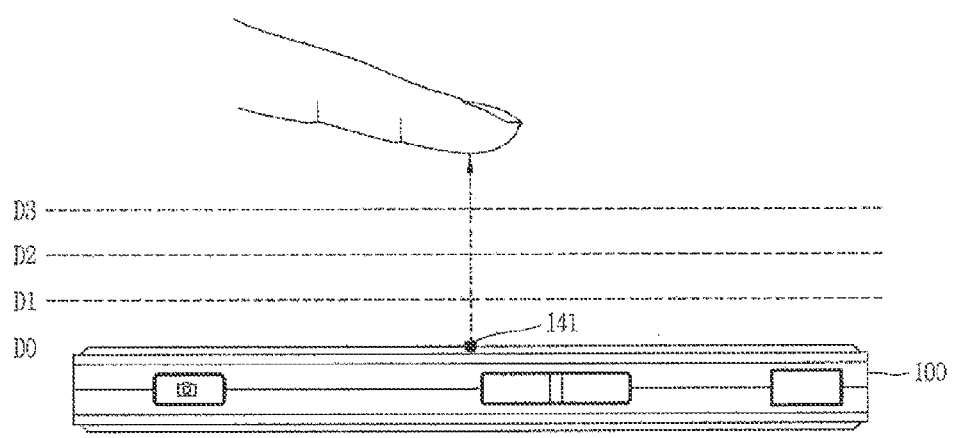
FIG. 4 is a conceptual view for explaining a proximity depth of a proximity sensor.

FIG. 4 is a diagram relating to a proximity depth of a proximity sensor. Other embodiments, arrangements and configurations may also be used.

As shown in FIG. 4, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 4 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Figure 5:
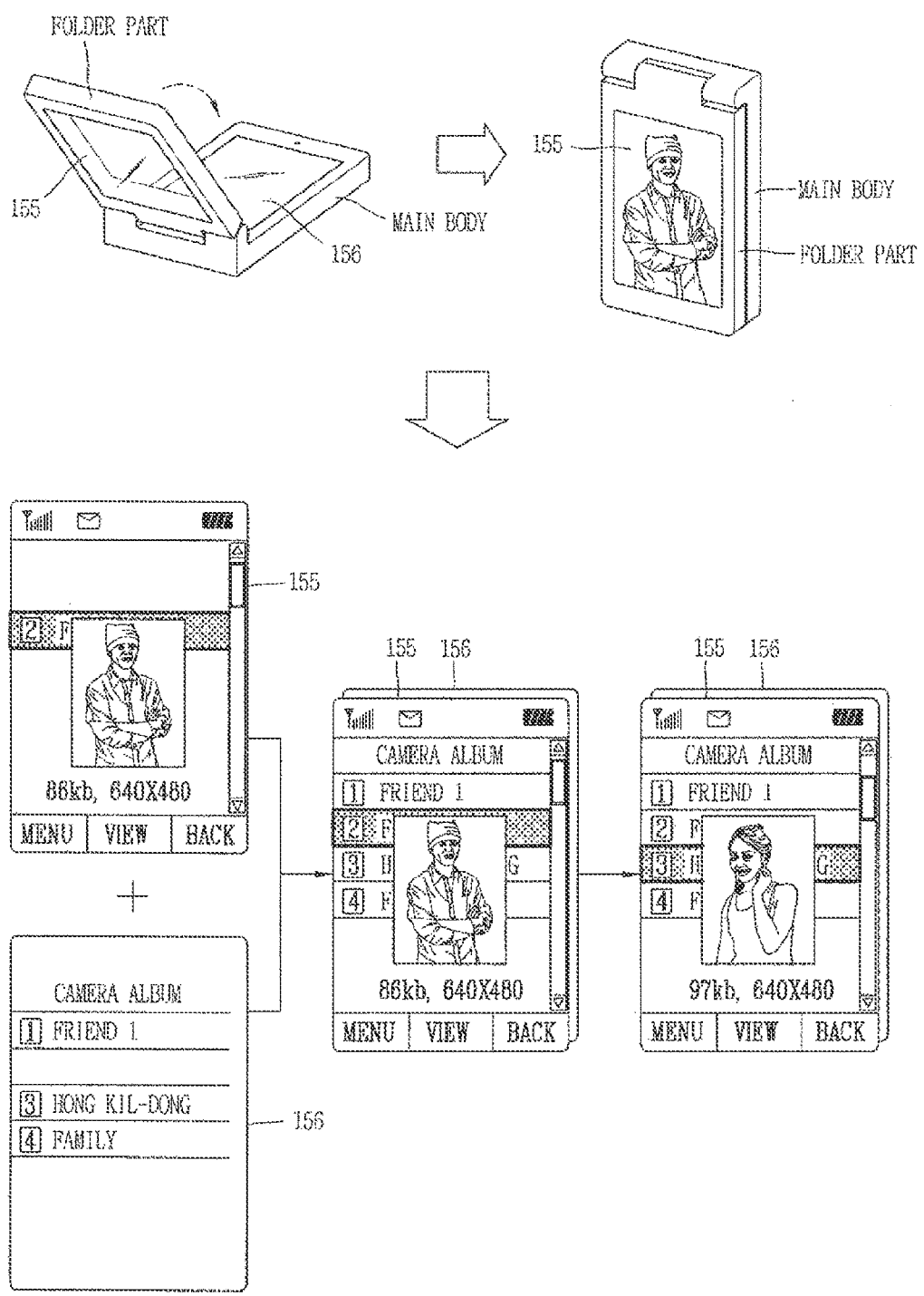
FIG. 5 is a conceptual view for explaining a method for controlling a touch operation in a configuration that a pair of display units overlap with each other.

FIG. 5 is a diagram for exampling a method of controlling a touch action when a pair of display units 155 and 156 overlap each other.

FIG. 5 shows a folder type mobile terminal in which a folder part is connected to a main body in a manner of being folded or unfolded. The mobile terminal shown in FIG. 5 includes a first display unit 155 and a second display unit 156.

The first display unit 155 provided on the folder part may be a light-transmittive or transparent type (such as TOLED), and the second display unit 156 provided on the main body may be a non-transmittive type (such as LCD). Each of the first display unit 155 and the second display unit 156 may include a touch-inputtable touchscreen.

For example, if a touch (i.e., a contact touch or a proximity touch) to the first display unit (or TOLED) 155 is detected, the controller 180 may select or run at least one image from an image list displayed on the first display unit 155 (or TOLED) according to a touch type and a touch duration.

A method may now be described of controlling information displayed on a different display unit than the second display unit 156 (or LCD) in case of a touch to the first display unit (or TOLED) 155 externally exposed in an overlapped configuration. The description may be made with reference to input types classified into a touch, a long touch, a long-touch & drag and/or etc.

In the overlapped state (a state that the mobile terminal is closed or folded), the first display unit (or TOLED) 155 may overlap with the second display unit (or LCD) 156. In this state, if a touch different from a touch for controlling an image displayed on the first display unit (or TOLED) 155, e.g., a long touch (e.g., a touch having a duration of at least 2 seconds) is detected, the controller 180 may enable at least one image to be selected from an image list displayed on the second display unit (or LCD) 156 according to the touched input. The result from running the selected image may be displayed on the first display unit (or TOLED) 155.

The long touch may be usable in selectively shifting a specific one of entities displayed on the second display unit (or LCD) 156 to the first display unit (or TOLED) 155 (without an action for running the corresponding entity). In particular, if a user performs a long touch on a prescribed region of the first display unit (or TOLED) 155 corresponding to a specific entity of the second display unit (or LCD) 156, the controller 180 may control the corresponding entity to be displayed by being shifted to the first display unit (or TOLED) 155.

An entity displayed on the first display unit (or TOLED) 155 may be displayed by being shifted to the second display unit (or LCD) 156 according to a prescribed touch input to the first display unit (or TOLED) 155 such as flicking, swirling and/or the like. FIG. 5 shows a menu displayed on the second display unit (or LCD) 156 is shifted to the first display unit (or TOLED) 155.

In case of another input (e.g., a drag is additionally detected together with a long touch), the controller 180 may execute a function associated with an image selected by the long touch so that a preview picture for the image may be displayed on the first display unit (or TOLED) 155, for example. FIG. 5 shows a preview (i.e., a picture of a male) for a menu (i.e., an image file) may be performed.

While the preview image is outputted, if a drag (or movement) toward a different image is additionally performed on the first display unit (or TOLED) 155 by maintaining the long touch, the controller 180 may shift a selection cursor (or a selection bar) of the second display unit (or LCD) 156 and then display the image selected by the selection cursor on the preview picture (i.e., a picture of a female). Thereafter, after completion of the touch (i.e., long touch and drag), the controller 180 may display the initial image selected by the long touch.

The touch action (long touch and drag) may be identically applied to a case that a slide (i.e., an action of a proximity touch corresponding to the drag) is detected together with a long proximity touch (e.g., a proximity touch maintained for at least 2 or 3 seconds) to the first display unit (or TOLED) 155.

If a touch action differing from the above-mentioned touch actions is detected, the controller 180 may operate in a same manner as the general touch controlling method.

The method of controlling the touch action in the overlapped state may be applicable to a terminal having a single display. The method of controlling the touch action in the overlapped state may also be applicable to terminals differing from the folder type terminal having a dual display.

Figure 6A:
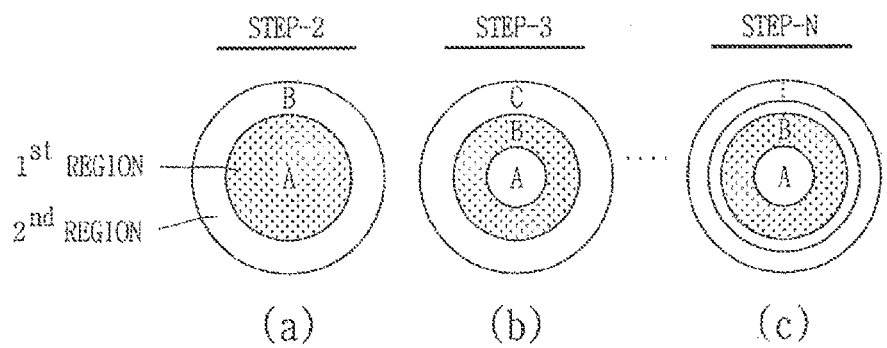
FIGS. 6a and 6b are conceptual views illustrating proximity touch recognition regions where proximity signals are detected and haptic regions where haptic effects are generated.
Figure 6B:
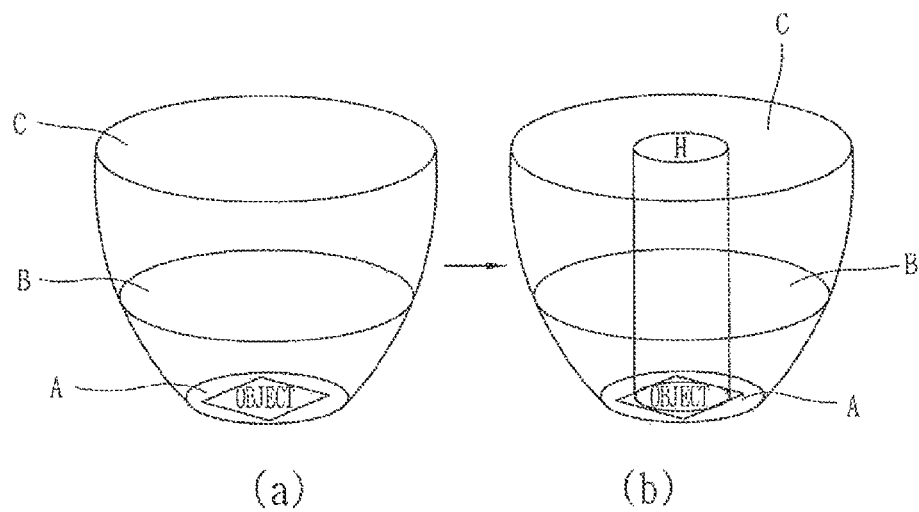

FIGS. 6A and 6B are diagrams relating to a proximity touch recognition area and a tactile effect generation region.

FIG. 6A represents an object such as an icon, a menu item, etc. in a circle type for ease of description.

As shown in FIG. 6A(a), a region for displaying an object on the display 151 may be divided into a first region A at a central part and a second region B that encloses (or surrounds) the first region A. The first and second regions A and B may be configured to generate tactile effects, such as strength or pattern, that differ from each other. For example, the first and second regions A and B may be configured to generate 2-step vibrations in a manner of outputting a first vibration when the second region B is touched or outputting a second vibration greater than the first vibration when the first region A is touched.

If both the proximity touch recognition region and the haptic region are simultaneously set in the region having the object displayed therein, the haptic region may be set for generating the tactile effect that is different from the proximity touch recognition region for detecting the proximity signal. In particular, the haptic region may be narrower or wider than the proximity touch recognition region. For example, in FIG. 6A(a), the proximity touch recognition region may be set to the area including both the first and second regions A and B. The haptic region may be set to the first region A.

As shown in FIG. 6A(b), the region having the object displayed therein may be divided into three regions A, B and C. Alternatively, the region having the object displayed therein may be divided into N regions (N>4) as shown in FIG. 6A(c). Each of the divided regions may generate a tactile effect having a different strength or pattern. If a region having a single object represented therein is divided into at least three regions, the haptic region and the proximity touch recognition region may be set to differ from each other according to a use environment.

A size of the proximity touch recognition region of the display 151 may be set to vary according to proximity depth. For example, FIG. 6B(a) shows the proximity touch recognition region is configured to decrease by C→B→A according to the proximity depth for the display 151. The proximity touch recognition region may also be configured to increase by C→B→A according to the proximity depth for the display 151. The haptic region may be set to have a predetermined size, such as the region 'H' in FIG. 6B(b), regardless of the proximity depth for the display 151.

In case of dividing the object-displayed region for setting of the haptic region or the proximity touch recognition region, one of various schemes of horizontal/vertical division, radial division and/or combinations thereof may be used as well as the concentric circle type division shown in FIG. 6A.

Embodiments for a control method in the mobile terminal 100 may now be described with reference to the accompanying drawings. Embodiments may be used singly and/or by being combined together. Embodiments may be implemented more easily when the display 151 includes the touchscreen.

Figure 7:
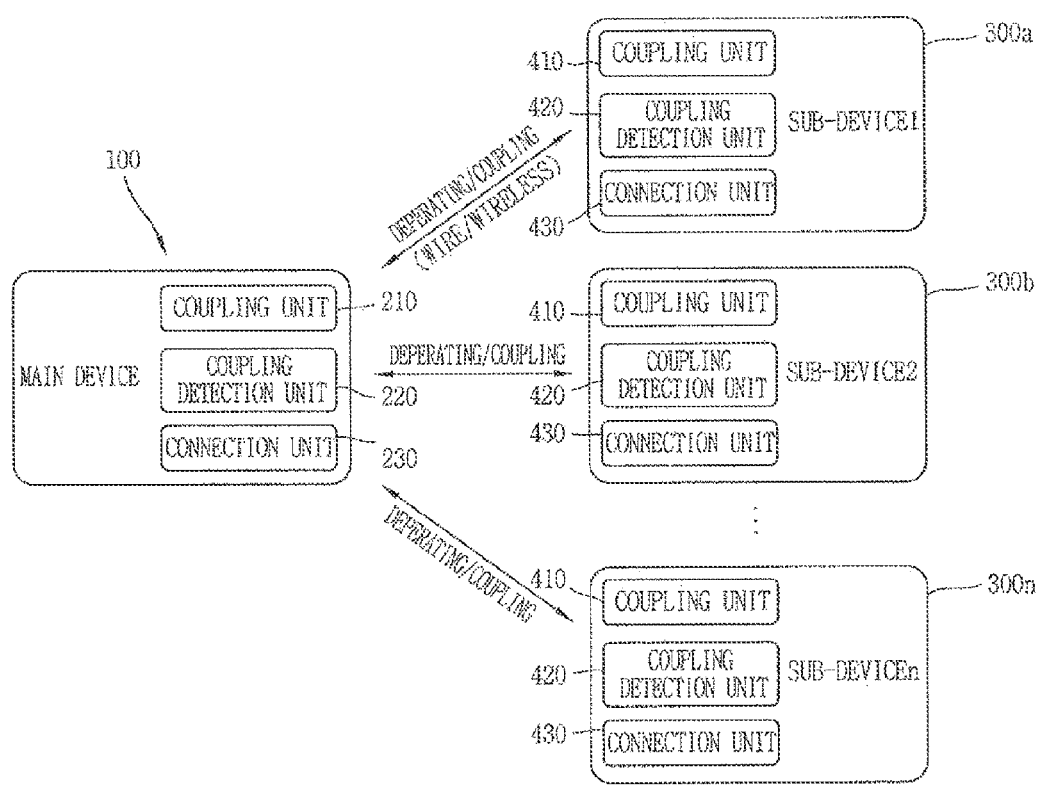
FIG. 7 illustrates the configuration of the mobile terminal including a main device and a sub-device according to an embodiment of the present invention.

FIG. 7 illustrates the configuration of the mobile terminal including a main device and a sub-device according to an embodiment of the present invention.

As shown in FIG. 7, the present invention relates to a mobile terminal including a main device (first device) 100 and one or more sub-devices (second devices) 300a to 300n that can be detachably attached to the main device. The main device, whose concept is compared with the sub-devices, refers to the entire mobile terminal to which the sub-devices can be substantially coupled, but in an embodiment of the present invention, the main device may refer to one of a plurality of bodies constituting the mobile terminal which is coupled to the sub devices.

The main device (i.e., the first device) 100 may include all the elements of the mobile terminal as described above with reference to FIG. 1 and, besides those elements, the main device may additionally include a coupling unit 210 for mechanically coupling the sub-de ices (i.e., the second devices), a coupling detection unit 220 that detects whether or not the sub-devices are coupled, and a connection unit 230 that electrically connects the sub-devices and the main device to allow signals or data to be transmitted or received therebetween.

The coupling unit 210 may be configured to mechanically couple the main device and the sub-devices, and the connection unit 230, a block for allowing communication between the main device and the sub-devices, is configured to directly connect the main device and the sub-devices by using a hardware connection terminal (not shown), connect them by using a fixed line such as a cable or a connector, or wirelessly connect them by using a wireless scheme (e.g., Bluetooth™, IrDA, or the like).

The coupling detection unit 220 may detect whether or not the main device and the sub devices are coupled or separated, and automatically change the main device and the sub-devices to each pre-set operation mode according to a detection result.

The coupling unit 210 may be changed in various structures (or configurations) according to types (e.g., bar type, slide type, folder type, swing type, swivel type, watch type, and the like) of mobile terminals. In addition, the main device of the mobile terminal may further include an auxiliary member such as a magnet, a spring, a latch, or the like, to fix the sub-devices such that the sub-devices are not moved, shattered or released after being coupled at accurate positions, as well as changing the external configuration of the body. In this case, the dispositions of the elements 210 to 230 may vary according to the types of the mobile terminals.

The sub-devices 300 may form the body in a structure or configuration in which they can be firmly coupled corresponding to the coupling unit 210 of the main device. Namely, the coupling unit 410 of each sub-device may be configured in a structure (or configuration) corresponding to the coupling unit 210 of the main device. The structures or the shapes of the elements 410 to 430 may be changed to be suitable for the sub-devices. For example, each sub-device may be configured to receive a radio signal transmitted from the main device and generate driving power by itself by using the radio signal as an energy resource, rather than including a weighty and voluminous battery. Accordingly, the sub-devices may be configured to be transparent or flexible to be bent, and because they do not include a battery, their volume can be reduced. Also, the sub-devices may have a small battery which may be charged by using an external power device or may be charged via the main device which the sub-devices are connected to the main device. The main device and the sub-devices may include a power source unit for charging the respective batteries by using solar light.

Each of the sub-devices 300 may be configured to include all the same elements as those of the main device. When only functions dependent on the main device are implemented, each sub-device may limitedly include only the elements suitable for implementing the functions. Or, only one of the main device or the sub-device may include a particular element, and the other may remotely control the particular element. For example, the sub-device may include only a touch pad or only a sound output unit, not the touch screen. Or, the main device may include a projector and the sub-device may remotely control the main device to control the function of the projector. Accordingly, the volume, weight, and fabrication costs of the sub-devices can be reduced. The sub-devices may be used as a remote controller for remotely controlling the main device, or may be used as a remote output device for outputting information outputted from the main device from a remote area.

Hereinbelow, the elements of the main device of the sub-devices will not be fully illustrated but only elements required for description will be selectively illustrated.

Figure 8:
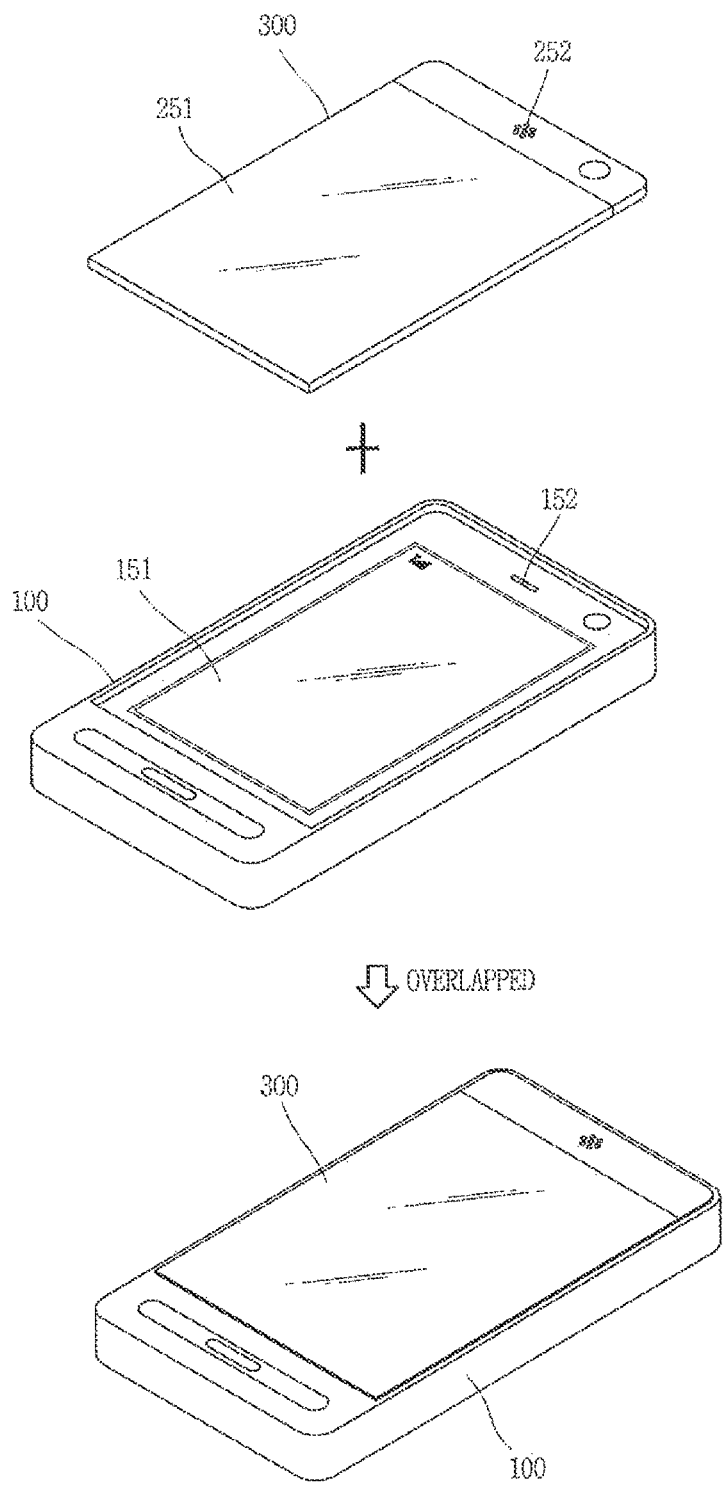
FIG. 8 illustrates the configuration of the sub-device attachable to the main device of the mobile terminal according to an embodiment of the present invention.

FIG. 8 illustrates the configuration of the sub-device attachable to the main device of the mobile terminal according to an embodiment of the present invention. A bar-type mobile terminal is illustrated for the sake of brevity, but the present invention can be applicable to any types of mobile terminals.

When the sub-device 300 is coupled to the main device 100, an element of the sub-device may mechanically overlap (or mechanically overlap to be coupled) with a particular element of the main device. For example, a display unit 251 may be configured to overlap with the display unit 151 of the main device. Or, an audio output module 252 of the sub-device may be configured to overlap with the audio output module 152. Or, a user input unit (not shown) of the sub-device may be configured to overlap with the user input unit 130.

Although a particular element of the sub-device overlaps with a particular element of the main device, the characteristics, size, thickness, or the like, of the overlapping elements may not necessarily be the same. For example, the display unit 251 of the sub-device may be configured to have a size (e.g., by one or two-line size) smaller than the display unit 151 of the main device. Or, only a function key or a touch pad may be configured without having the display unit 251.

The display unit 251 of the sub-device may be configured as a transparent display (TOLED). In addition, the display 251 of the sub-device may include a touch pad configured limitedly only at a particular region thereof (e.g., a region displaying keys or a region that does not display anything). In addition, the display 251 of the sub-device may be configured to display information indicating whether or not the main device and the sub-device are connected or disconnected. In order to display the information of the coupled or separated state, an indicator may be displayed on the display unit 251 of the sub-device, a backlight provided at the display unit 251 may be used, or an illumination lamp may be provided at one side of the sub-device.

The sub-device 300 is configured to be easily coupled to the exterior of the main device 100, and it can be also configured to be coupled to the main device 100 such that it is inserted into the interior of the main device such as a battery or a memory card. In this case, the coupling unit 210 of the main device may be configured in a recess or slot structure into which the sub-device can be inserted. In addition, a cover may be provided to prevent the sub-device from being separated undesirably after it is coupled.

In consideration of coupling with the main device 100 or in order to improve portability, the sub-device 300 may be configured in one of various forms such as necklace, glass, ring, card, ear ring, wrist watch, clip, pen, ear phone, or USB memory stick. Of course, in this case, the coupling unit 210 of the main device may be configured to have a structure (or shape) that can attach the sub-device 300 to the interior of the exterior of the main device.

The main device may detect whether or not the sub-device 300 is coupled or separated by using the coupling detection unit 230. Accordingly, when the sub-device 300 is coupled to the main device 100, the main device 100 may automatically change its operation mode or an operation mode of the sub-device.

As the main device and the sub-device are coupled or separated, data format transmitted from the main device to the sub-device may be changed. For example, as the sub-device is coupled or separated, the role of a function key provided in the sub-device may be changed to a different function key, image data may be transmitted in a full size or in a reduced size, a communication distance of a wireless communication function can be changed to be shorter or longer, and quality of audio or video can be varied to be transmitted.

FIGS. 9a to 9d illustrate various configuration of the sub-device according to an embodiment of the present invention.

Figure 9A:
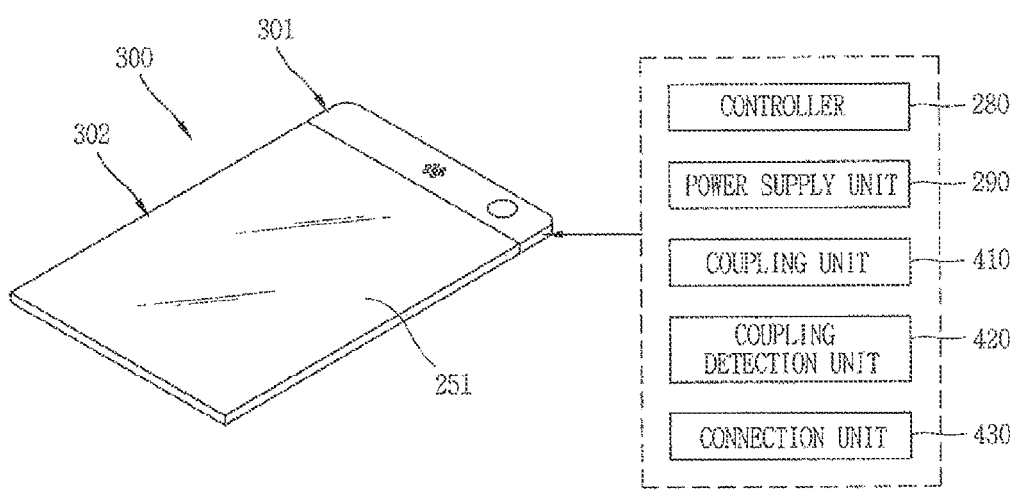
FIGS. 9a to 9d illustrate various configuration of the sub-device according to an embodiment of the present invention.

As shown in FIG. 9a, the sub-device 300 may include the same elements as those of the main device. However, when various conditions such as volume or weight are considered, basically, the sub-device 300 includes the display unit 251, a controller 280, and a power supply unit 290. The display unit 251 and the other elements (e.g., the controller, the power supply unit, the coupling unit, the coupling detection unit, the connection unit, and the output unit0 may be divided to be disposed at separated bodies 301 and 302. The display unit 251 may be configured as a transparent touch pad (or a transparent touch screen) in consideration of the configuration that it overlaps with the display unit 151 of the main device when the sub-device 300 is coupled to the main device 100.

Figure 9B:
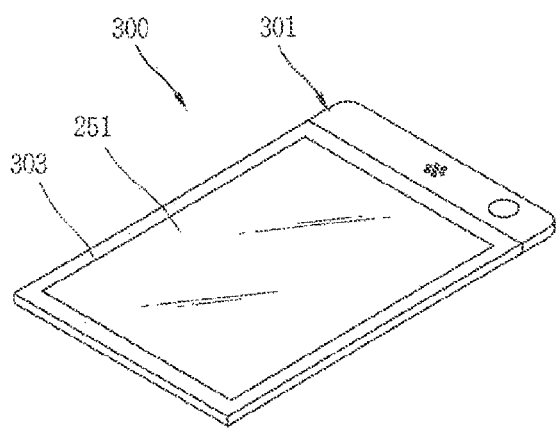

Also, as shown in FIG. 9b, the sub-device 300 may be configured to include a frame 303 surrounding the outer edges of the body 302 and the display unit 251 to improve firmness.

Figure 9C:
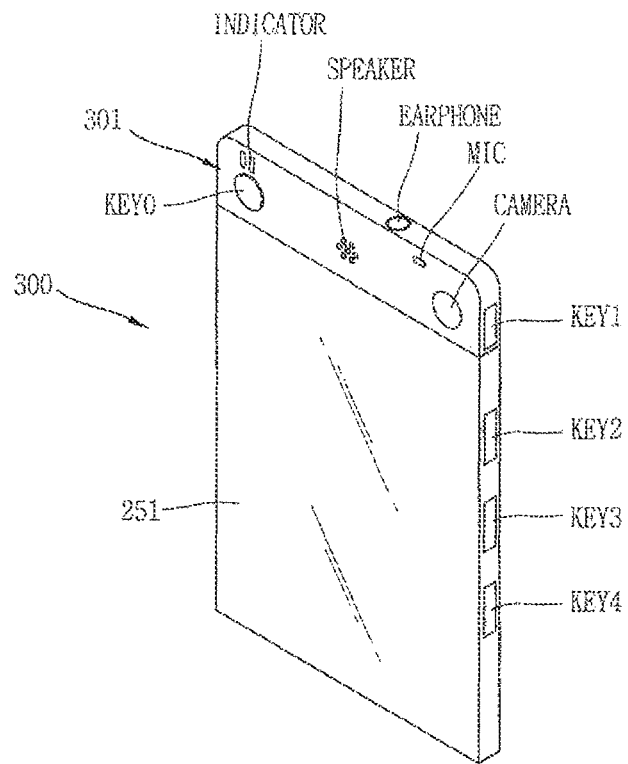

As shown in FIG. 9c, the sub-device may include function keys (e.g., a hold function, a call transmission/reception function, an MP3 control function, a Bluetooth function, a mouse key function), input units (e.g., a microphone, a camera), and output units (e.g., an audio output unit, an earphone connection unit, a beam output unit for projection, an infrared communication unit) on its front side or its side portion. Accordingly, although the sub-device is separated from the main device, the sub-device can solely control a call transmission/reception and multimedia output to allow the user to view the multimedia. By having such function keys, the user, who enjoying music by using the sub-device, can immediately input a particular key to change a current state to a call state when the call is received.

Figure 9D:
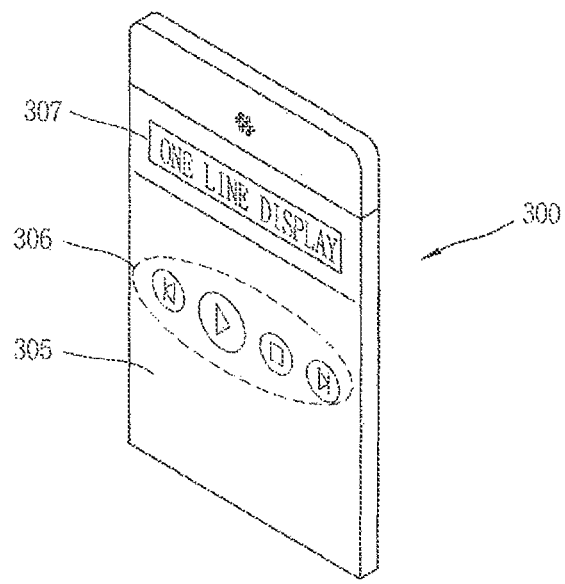

With reference to FIG. 9d, the sub-device may include only a touch pad 305 without the display unit 251. In this case, the touch pad 305 may correspond in a one-to-one manner to the region of the display 151 of the main device, or several function keys 306 may be created on the touch pad so as to be used together with buttons. Alternatively, a small display (e.g., one-line display, two-line display) 307 is coupled at one side of the touch pad to display simple information (e.g., a control state, a current state, a connection state with the main device).

FIGS. 10a to 10d illustrate how the main device and the sub-device are coupled according to an embodiment of the present invention.

Figure 10A:
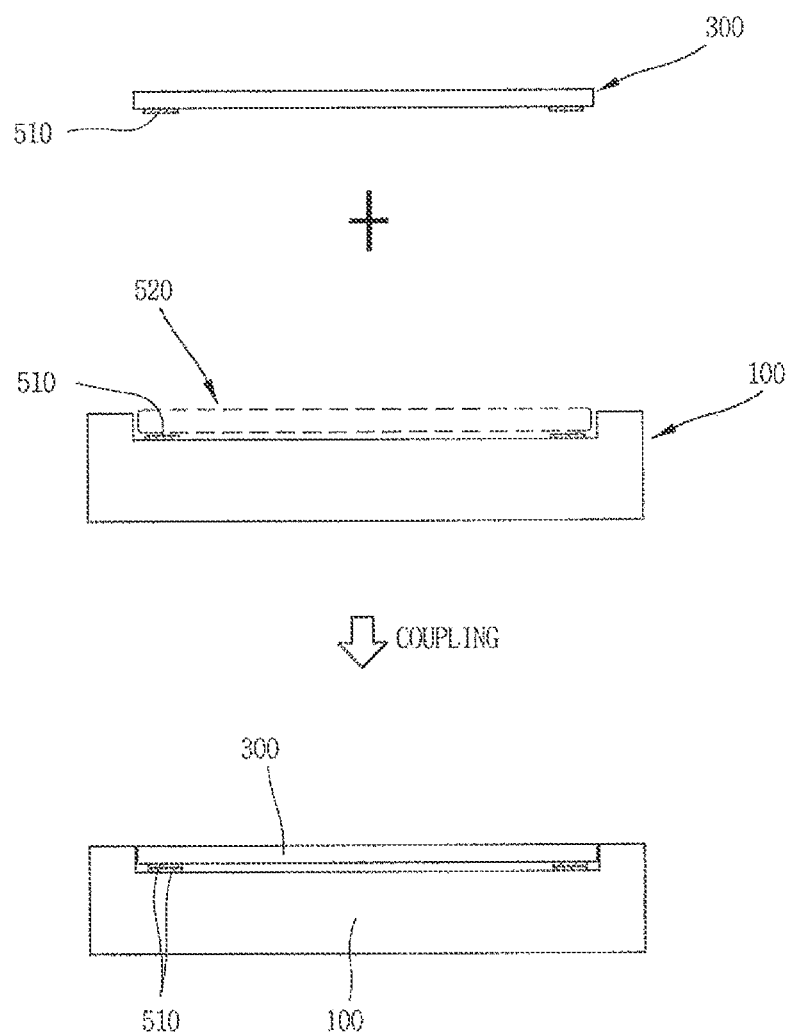

Specifically, FIG. 10a is a side sectional view illustrating a coupling method of the main device and the sub-device. As illustrated, coupling members 510 such as a magnet may be respectively attached to one side of the main device 100 and one side of the sub-device 300, to easily couple or separate (i.e., couple or de-couple) the main device 100 and the sub-device. Likewise, the main device may have a recess 520 corresponding to the shape and size of the sub-device, in which a magnet may be installed. The depth of the recess 520 may vary depending on the design of the main device.

FIG. 10b is a side sectional view for explaining how the main device and the elastic sub-device are coupled. As shown in FIG. 10b, the sub-device 300 may be configured to have elasticity. The elastic sub-device 300 may be bent up to a certain angle. In order to couple the elastic sub-device, the main device may have an edge holder 530 formed at its edge portion. Namely, it has a configuration allowing the user to bend the sub-device and insert it into the edge holder 530. The edge holder 530 may include a guide groove 531 for guiding the sub-device when the sub-device is inserted. In order to prevent the sub-device from being released or moved after being inserted into the edge holder, a fixing member such as a hook (not shown) may be provided at one side of the main device.

Figure 10C:
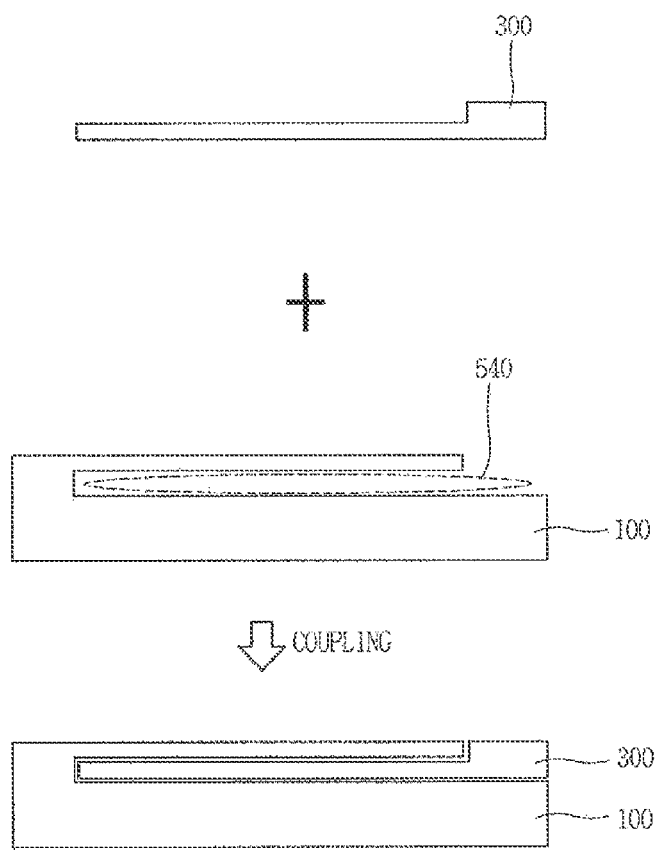

FIG. 10c is a side sectional view for explaining how the main device and the sub-device are coupled. As shown, when an edge holder or a slot 540 with a guide recess at an outer or inner side of the main device is provided, the sub-device can be coupled to be inserted into the guide recess or slot 540.

In this case, if one side of the main device is closed and the sub-device is pushed to the end of the closed portion, a fixing member such as a hook (not shown) may be provided to prevent the sub-device from being released. The hook may be configured to hook one side of the sub-device to fix it. Accordingly, one side of the sub-device may have a recess (not shown) having a configuration allowing the hook to be caught therein. In order to release the hook, the sub-device may be pushed further so as to be released, or a hook release key (not shown) may be pressed to release the hook, according to a configuration of the hook. Or, in order to easily separate the sub-device, a member such as a spring (not shown) or the like may be provided.

The sub-device may be coupled in a sliding manner along the edge holder. Namely, the sub-device may be slide in units of certain lengths. In other words, when the sub-device is slid by a certain length and then automatically stopped by a stopping unit (not shown), the sub-device may be slid again whenever the user applies force in a desired direction (e.g., a coupling direction or separating direction). Only a single stopping unit may be provided and two or more stopping units may be provided.

FIG. 10*d* illustrates how the main device and the sub-device are coupled by using a hinge. As shown in FIG. 10*d*, the main device or the sub-device may have hinges 550 and 551 at one side thereof, respectively, and connected by the hinges 550 and 551. When the main device and the sub-device are coupled by using the hinges, the sub-device may be covered down or open up like a folder.

The hinge may be configured such that it can be separated and coupled and can be rotatable at certain angle after being coupled. For example, the user may make the hinges 550 and 551 of the main device and the sub-device face and applies force in a direction that they can be coupled or in a direction that they are separated. After the main device and the sub-device are coupled, the sub-device can be open or closed like a folder type terminal.

The structures for coupling the sub-device according to the types of the main devices (e.g., bar type, slide type, folder type, swing type, swivel type, watch time, and the like) and their coupling and separating methods will now be described.

FIGS. 11*a* to 11*e* illustrate the structure and method for coupling or separating the sub-device to a folder type main device according to an embodiment of the present invention.

The folder type main device features that a first body 100*a* having a display unit and a second body 100*b* having a keypad are coupled by using hinges. In this embodiment, if the sub-device is assumed as a third body 300, the third body may overlap to be coupled to the first or second body, or the third body may replace one of the first and second bodies and be coupled. In this embodiment, the second body 100*b* may not necessarily include the keypad, and it may include a display unit, a touch screen or a touch pad like the first body.

Figure 11A:
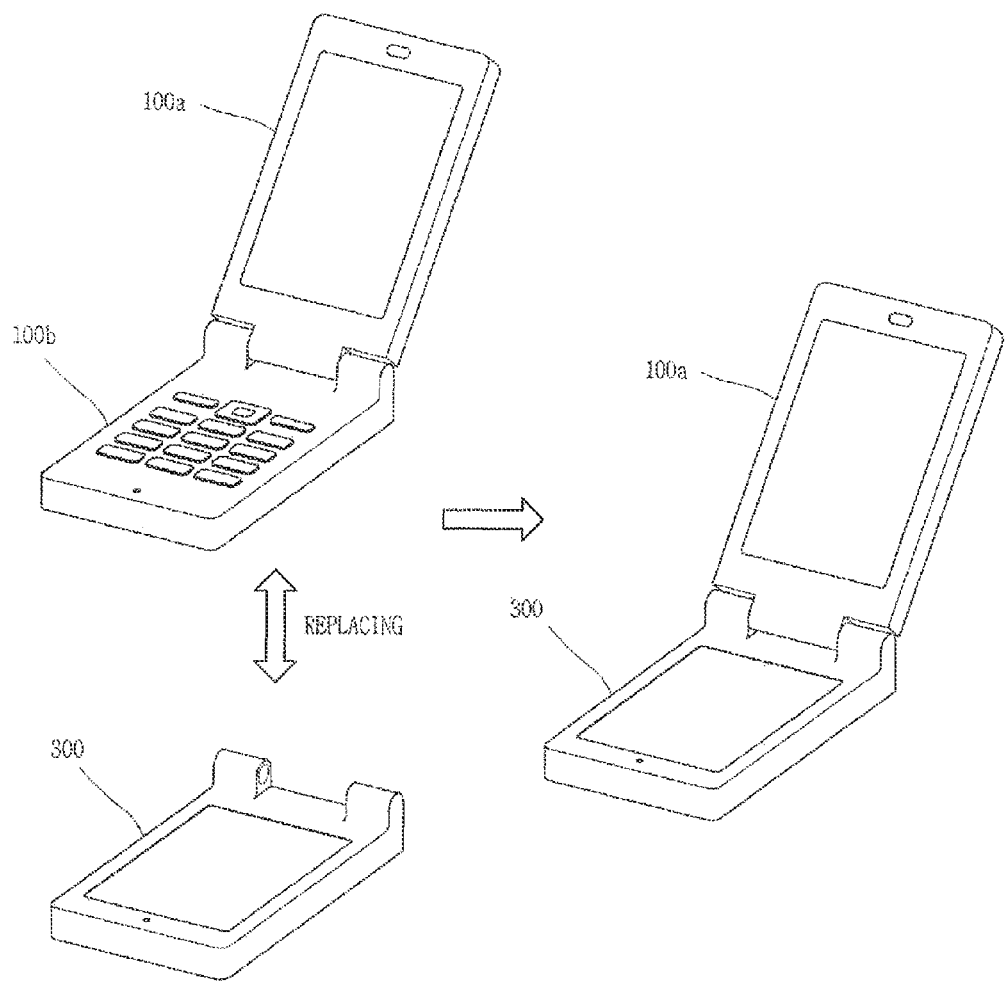

As shown in FIG. 11*a*, if the third body 300 replaces the second body 100*b*, the third body may operate as a folder part which is folded or unfolded. When the third body 300 is configured as a transparent display, the main device may have the effect of a dual-display. If the third body is configured as a transparent touch pad, it may overlap to be coupled to the display unit 151 of the first body 100*a* to generate such an effect as a touch screen. In this case, in order to configure the third body 300 such that it operates as a folder part, the hinge portions for coupling the first and third bodies are configured such that they can be separated and coupled.

When the third body is assumed to be a transparent display (TOLED), its transparency may be adjusted according to whether or not it overlaps with the first body. For example, when the third body 300 is folded to overlap with the display unit 151 of the first body 100*a*, the transparency of the display unit 251 of the third body 300 may be adjusted to allow the display screen of the first body to be transparent. In this case, it may be controlled such that only a particular region of the display screen of the first body is transparent. However, if the third body is separated or unfolded and thus not overlaps with the display unit 151 of the first body, the third body and the display unit 151 may operate as double displays to display different information, respectively.

Namely, the third body 300 may independently operate, and when it is coupled to the main device, the third body may operate in corporation with the structure or operation of the main device. For example, when the sub-device is coupled to the main device, the display unit 251 of the sub-device may operate as one of a main display or a sub-display. Here, the display unit 151 of the main device may be a TOLED or an LCD.

In the folder type mobile terminal, the third body serving as a folder part can be open and closed in a vertical direction (up/down direction) or in a horizontal direction (left/right direction) according to its position. Also, in the mobile terminal, the position (i.e., a rotational direction) of the terminal is detected, and information outputted to the first or third body may be rotated to be outputted according to the position (rotational direction) of the terminal. Alternatively, information outputted to the first or third body may be interchanged to be outputted. Such operation can be applicable to any other types of mobile terminals as well as to the folder type mobile terminal.

The method of replacing the sub-device by the folder part in the folder type mobile terminal and coupling it to or separating it from the main device has been described. Here, the third body may be overlapped to be coupled to one of the first and second bodies in a state that the first and second bodes are coupled, but in the following description, the method of coupling the third body to the first body in an overlapping manner will now be described for the brevity.

As shown in FIG. 11*b*, a coupling member 510 for fixing the sub-device is provided on at least one side of the first body of the main device, and the sub-device may be coupled such that it is press-fit to the position of the coupling member 510. for example, a recess or a hook is formed at one side of the first body of the main device, and the third body 300 may be coupled by using the recess or the hook. Or, a magnet may be provided to one side of the first body of the main device, and the third body 300 having a member that can be attached to the magnet may be coupled. In this case, the first body 100*a* and the second body 100*b* may be folded or unfolded regardless of the coupling or separating of the sub-device.

Figure 11C:
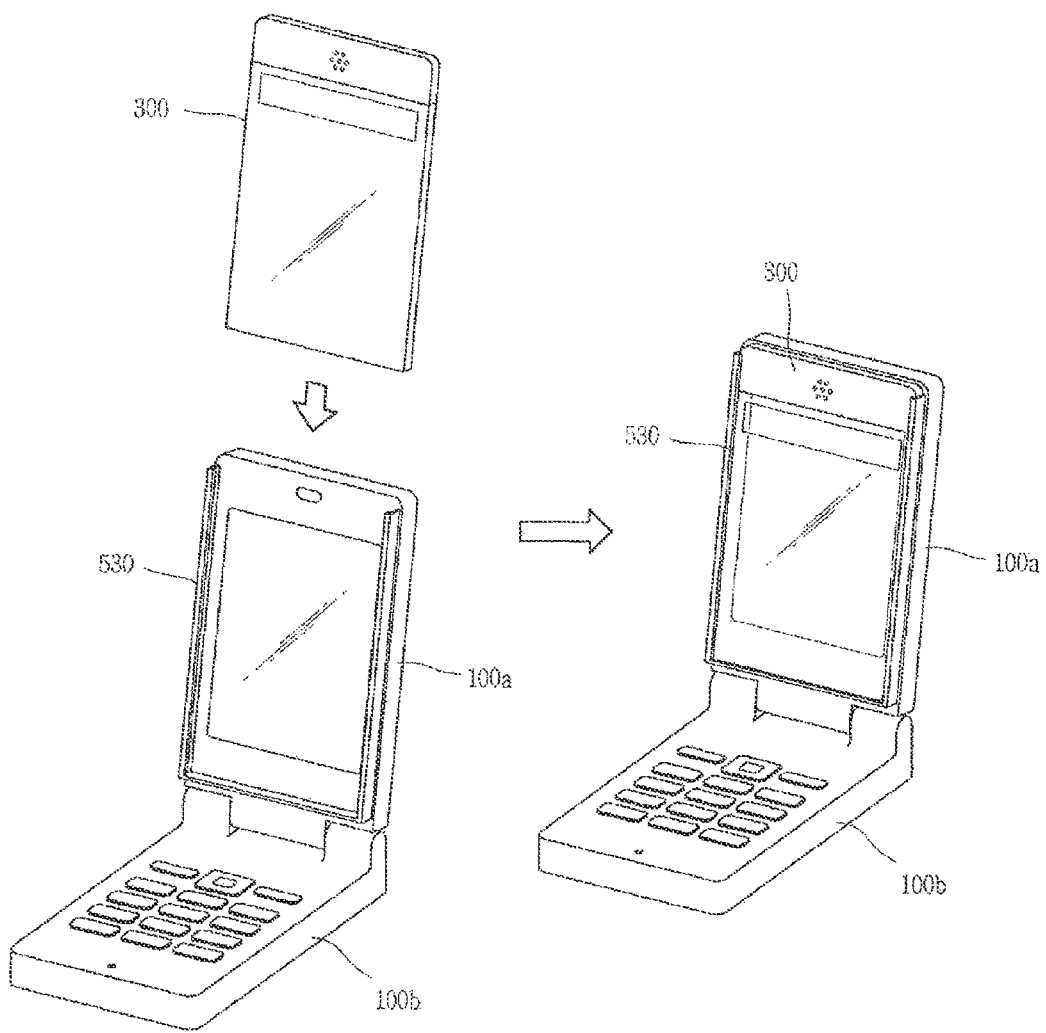
Figure 11D:
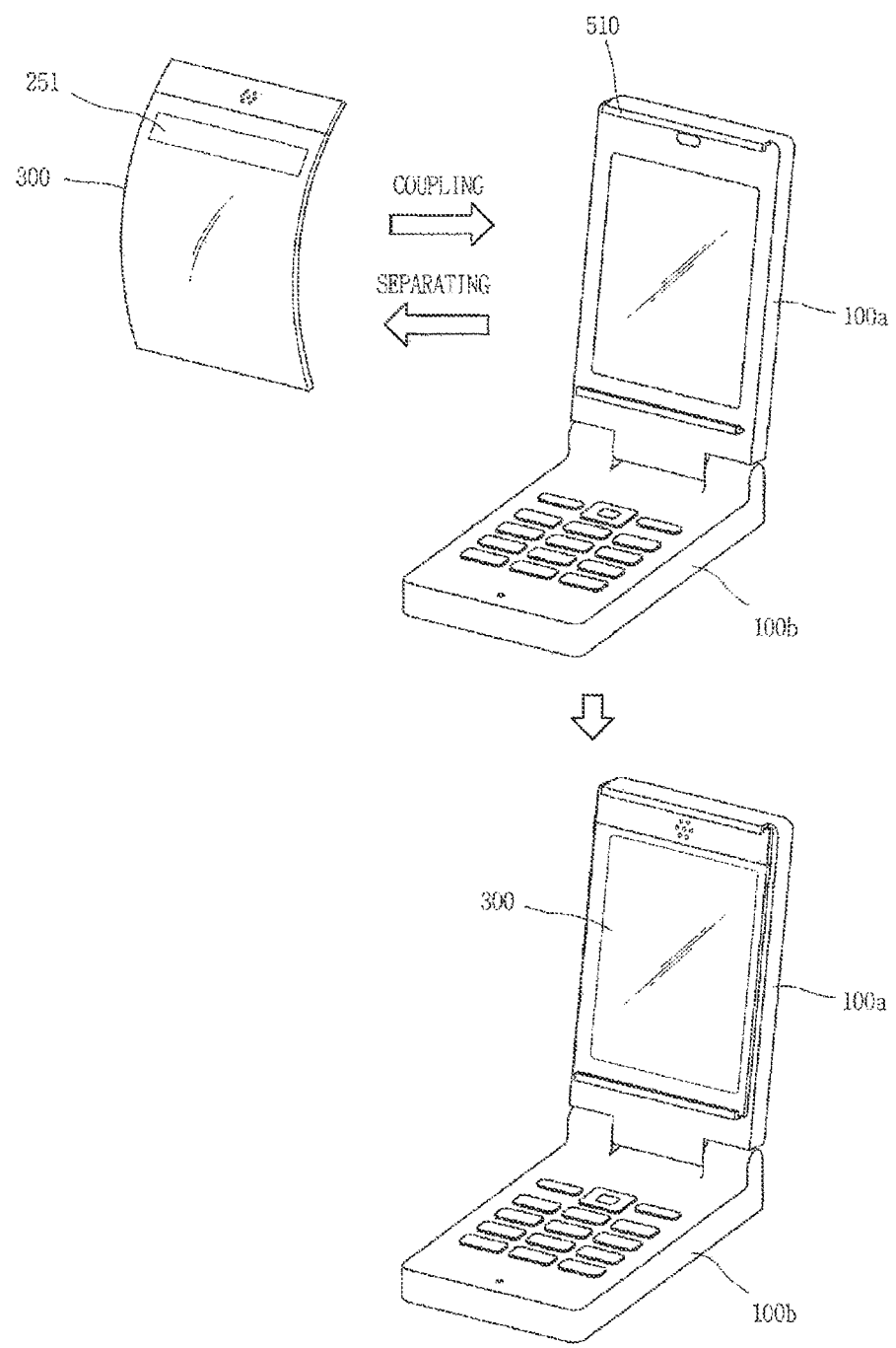

As shown in FIG. 11*c*, an edge holder 530 with a guide groove may be provided on at least one side of the first body of the main device, and the sub-device may be pushed into (or in a slot manner) the guide groove so as to be coupled. In this case, if the sub-device has elasticity, it may be bent and pushed into the edge holder 530 so as to be coupled as shown in FIG. 11*d*. When the sub-device is to be separated from the main device, it may be pushed up in a direction opposite of that when the sub-device was pushed in (as can be understood from the drawings). A fixing unit may be additionally provided to fix the sub-device so that it cannot be released from the holder after being coupled.

Figure 11E:
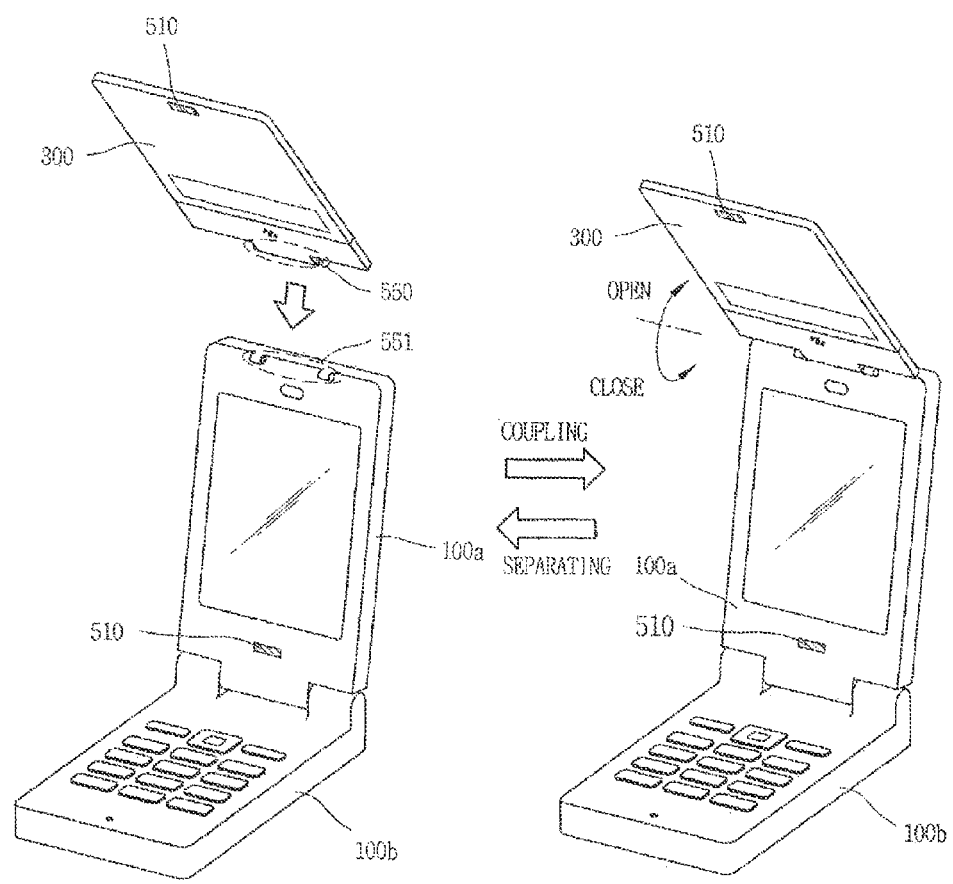

As shown in FIG. 11*e*, the hinge part may be additionally provided on at least one side of the first body of the main device. The second body can be coupled by using the one hinge part, and the third body 300 may be coupled by using the hinge part 550 and 551. The position of the hinge parts may be changed, and the coupling member 510 may be additionally provided to prevent the third body from being moved after it is folded. The coupling member 510 may include such holder or magnet as described above, and an arbitrary one of any other coupling members as known may be also used as the coupling member.

Accordingly, the hinge parts 550 and 551 used for coupling the third body can have the appropriate structure that allows coupling or separating. The first and second bodies may be configured to be folded or unfolded regardless of the coupling or separating of the third body (i.e., the sub-device).

The structure and method for coupling and separating the sub-device in the folder type mobile terminal have been described. Hereinafter, a method of coupling the sub-device to a slide type mobile terminal will now be described.

FIGS. 12*a* to 12*e* illustrate the structure and method for coupling or separating the sub-device to a slide type main device according to an embodiment of the present invention;

The slide type main device features that the first body 100*a* which has a display unit and is slidably moved and the second body 100*b* having a keypad are slidably coupled by using a guide rail (not shown). In this embodiment, the second body may be configured as a display unit or a touch screen, like the first body.

In this embodiment, if it is assumed that the sub-device is a third body, the third body 300 may be coupled in an overlapping manner with the first body 100*a* or the second body of a main device, or the third body may replace the first or second body so as to be coupled. When the sub-device is coupled to the main device, a display unit of one device may be used as a main display or a sub-display.

Figure 12A:
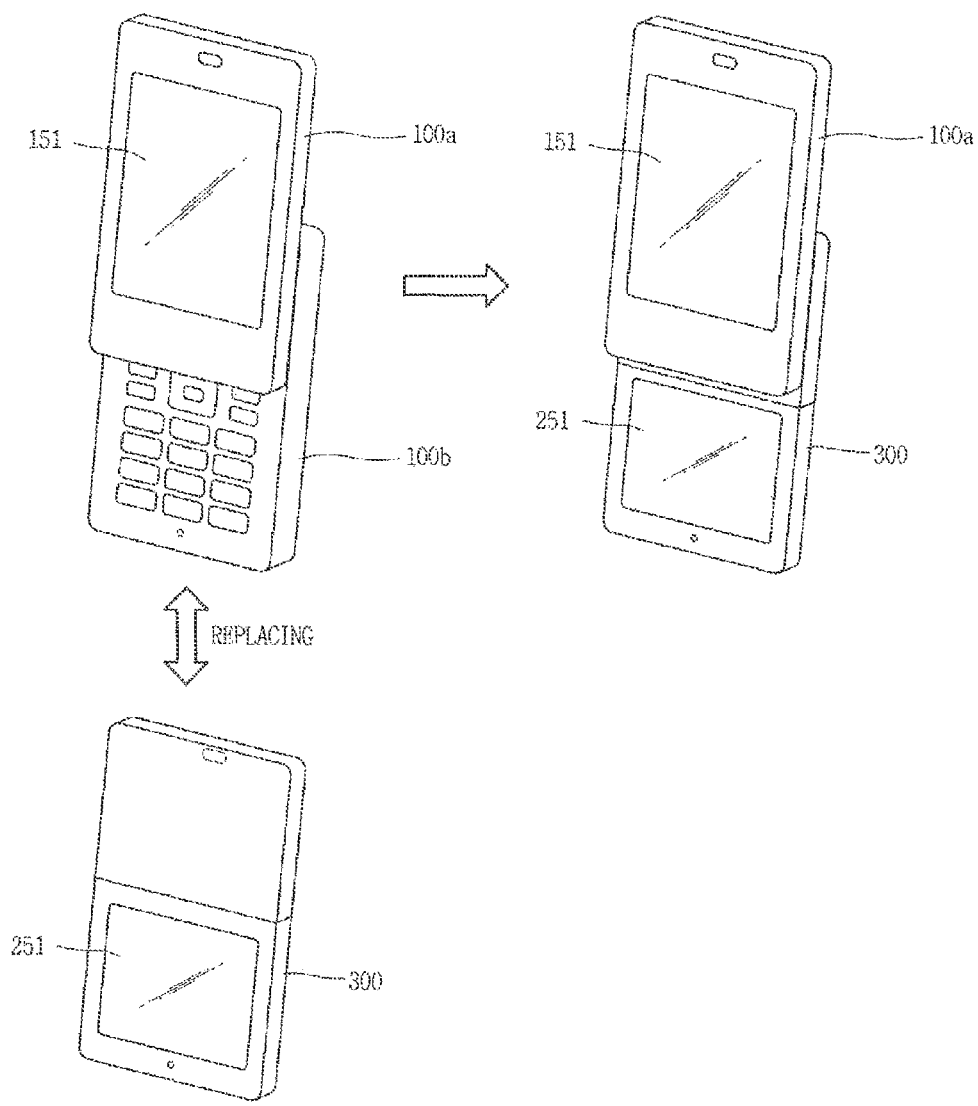

With reference to FIG. 12*a*, when one of the first or second body is replaced by the third body, the third body may operate as a slider unit which is slidably moved. It is assumed that the second body is replaced by the third body for the sake of brevity. In this case, if the display unit 251 of the third body 300 is configured as a transparent display (TOLED), it overlaps with the display unit 151 of the first body to obtain the effect of a dual-display. Of course, even if the display unit is not necessarily configured as the transparent display, when the first and third bodies are coupled, the effect of a double display of performing displaying from both surfaces (front and rear surfaces) of the mobile terminal can be obtained.

Meanwhile, if the third body is assumed to be a transparent display (TOLED), its transparency may be adjusted according to whether or not the first body (i.e., the main device) is coupled to the third body (i.e., the sub-body). Conversely, if the display unit 151 of the first body is assumed to be a transparent display, the transparency of the display unit 151 may be adjusted. For example, when the display unit 251 of the third body (i.e., the sub-device) overlaps with the display unit 151 of the first body (i.e., the main device), the transparency of the display unit of the third body 300 may be adjusted to allow the display screen of the first body to be transparent. However, if the third body is separated or slid and thus not overlaps with the display unit 151 of the first body, the third body and the display unit 151 may operate as double displays to display different information, respectively.

The third body may be coupled in the same direction (e.g., the front side) as the first body, or in the opposite direction (e.g., the rear side). When the third body is coupled in the opposite direction of the main device, the third body may be configured as a transparent touch screen or a transparent touch pad to implement a rear surface touch function. For example, the display unit 252 (or touch pad) of the third body may be touched without covering the display unit 151 of the first body with the user's finger to select and execute a specific function icon displayed on the display unit 151 of the first body.

In addition, when the third body (i.e., the sub-device) is coupled to the first body (i.e., the main body), it is slid along the guide rail (not shown) within a certain range, but if the user applies a stronger force to make third body be released from the guider ail, the third body can be separated from the main device. Accordingly, the guide rail for coupling the third body (i.e., the sub-device) may be configured to be separated or coupled.

When the first and third bodies are separated, they may operate as the main device and the sub-device, respectively. Namely, the sub-device and the main device may operate in a mutually independent manner, or the sub-device and the main device may be connected to interwork for communication. For example, if the sub-device requests the main device to reproduce a specific multimedia file, receives the multimedia file transmitted from the main device, and outputs the received multimedia file via an output unit of the sub-device. Or, the main device and the sub-device may perform communication like an interphone.

Meanwhile, the slide type mobile terminal may be configured such that the third body serving as a slide part to be slid in a vertical direction (up/down direction) or in a horizontal direction (left/right direction) so as to be open or closed according to the position of the slide type mobile terminal. Accordingly, the position (namely, a rotational direction) of the mobile terminal including the main device and the sub-device coupled may be detected, and information outputted to the first or third body may be rotated to be outputted according to the position of the terminal. Or, information outputted to the first or third body may be interchanged to be outputted.

The coupling of the sub-device as a slider part in the slide type mobile terminal has been described. In a state that the first and second bodies are coupled, the third body (i.e., the sub-device) may be coupled in an overlapping manner to one of the first and second bodies. The method of coupling the third body to the first body will now be described for the sake of brevity.

As shown in FIG. 12*b*, a coupling member 510 for fixing the sub-device is provided on at least one side of the first body of the slide type mobile terminal, and the sub-device may be adjusted to the position where the coupling member is formed, and pressed to be coupled. For example, a recess or a hook may be formed on one side of the first body of the main device or a magnet is attached, and the third body may be coupled by using the recess, the hook or the magnet. At this time, the first and second bodies may be configured to be slid regardless of the coupling or separating of the third body (sub-device).

Figure 12C:
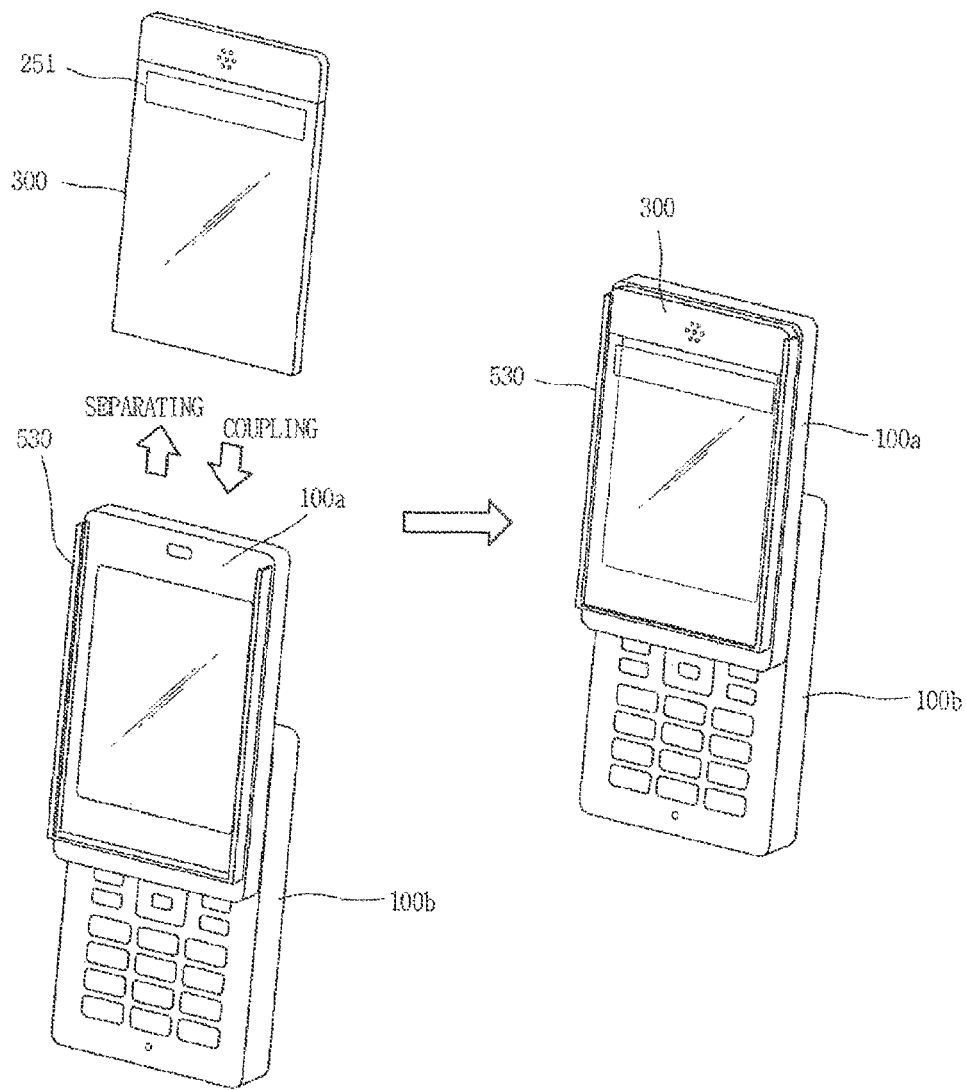

As shown in FIG. 12*c*, the edge holder or a slot 530 with a guide groove is provided on at least one side of the first body of the slide type mobile terminal, and the sub-device may be pushed (or slot manner) into the guide groove so as to be coupled. In this case, if the sub-device has elasticity, it may be bent to be pushed into the edge holder so as to be coupled as shown in FIG. 12*d*. When the sub-device is desired to be separated from the main device (i.e., the first body), it may be pushed up in the direction opposite of that when the sub-devices was pushed in. A fixing unit may be additionally provided to fix the sub-device so that the sub-device cannot be released from the holder after being coupled. The fixing unit may be configured in various shapes in consideration of the design of the mobile terminal.

Figure 12E:
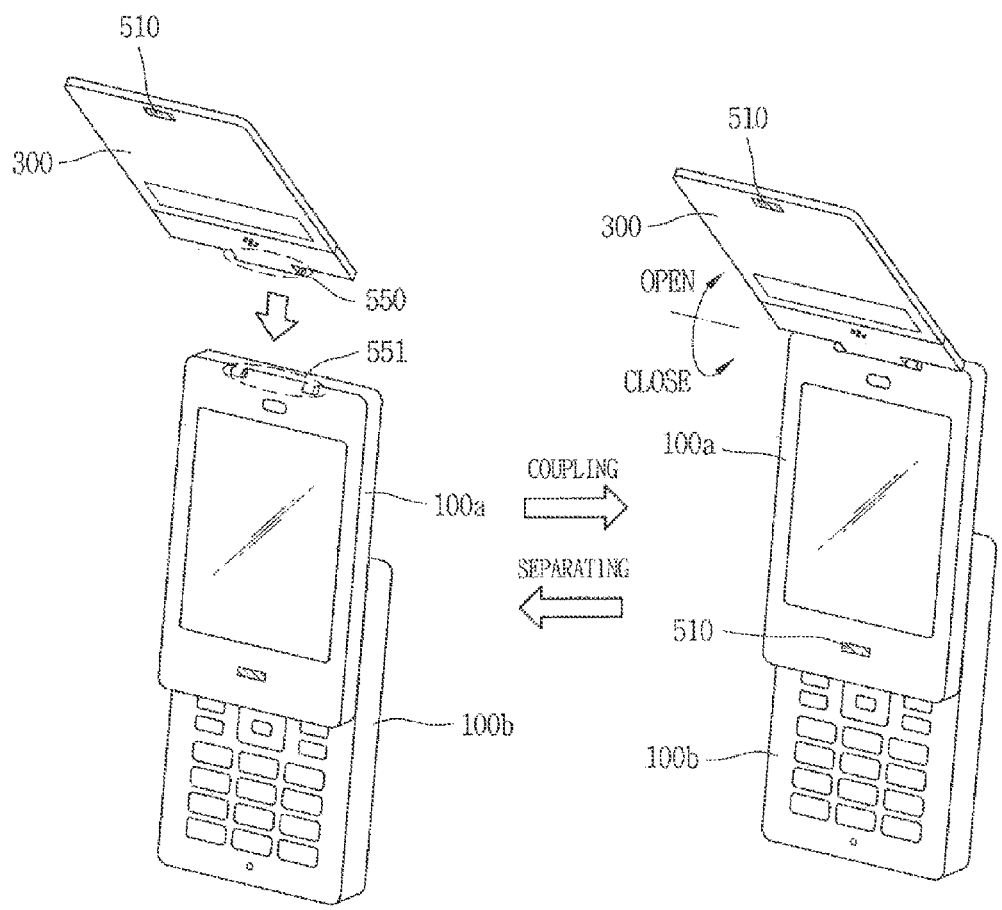

As shown in FIG. 12*e*, the hinge part 551 may be additionally provided on at least one side of the first body of the slide type mobile terminal, and the third body can be coupled by using the hinge part. The positions of the respective hinge parts 550 and 551 may be interchanged, and a fixing unit (not shown) may be additionally provided to fix the third body such that the third body cannot be moved after being folded. The fixing member 510 may include such holder or magnet as described above, or may be configured with an arbitrary one of any other fixing members as known. The hinge parts for coupling the third body must be configured to allow separating or coupling of the third body. The first and second bodies may be configured to be slidable regardless of the coupling or separating of the third body 300.

Although not shown, the third body (i.e., the sub-device) may be coupled to the second body in a similar manner as that in which the third body is coupled to the first body. Likewise, when the main device (the first body) operates cooperatively with the sub-device (third body) according to whether or not the display unit 251 is a transparent display or a touch pad, the transparency of either display unit of the device can be adjusted.

The structure and method for coupling or separating the sub-device in the slide type mobile terminal have been described. A method for coupling a sub-device of a swivel type mobile terminal will now be described.

FIGS. 13a to 13d illustrate the structure and method for coupling or separating the sub-device to a swivel type main device according to an embodiment of the present invention.

As shown in FIGS. 13a to 13d, the swivel folder type mobile terminal according to an embodiment of the present invention includes a swivel hinge. The swivel hinge operates to allow a folder part to be rotated or moved at a particular angle (or position). In this embodiment, if a folder part including the display unit 151 is a first body 100a, a second body 100b coupled to the first body 100a may be configured as a keypad or a touch screen.

In this embodiment, when the sub-device is a third body 300, the third body (i.e., the sub-device) may be coupled to the first or second body in an overlapping manner or the third body may replace one of the first and second bodies and be coupled. When the sub-device is coupled to the main device (i.e., the first body), a display unit of one device (i.e., the sub-device) may be used as a sub-display.

Figure 13A:
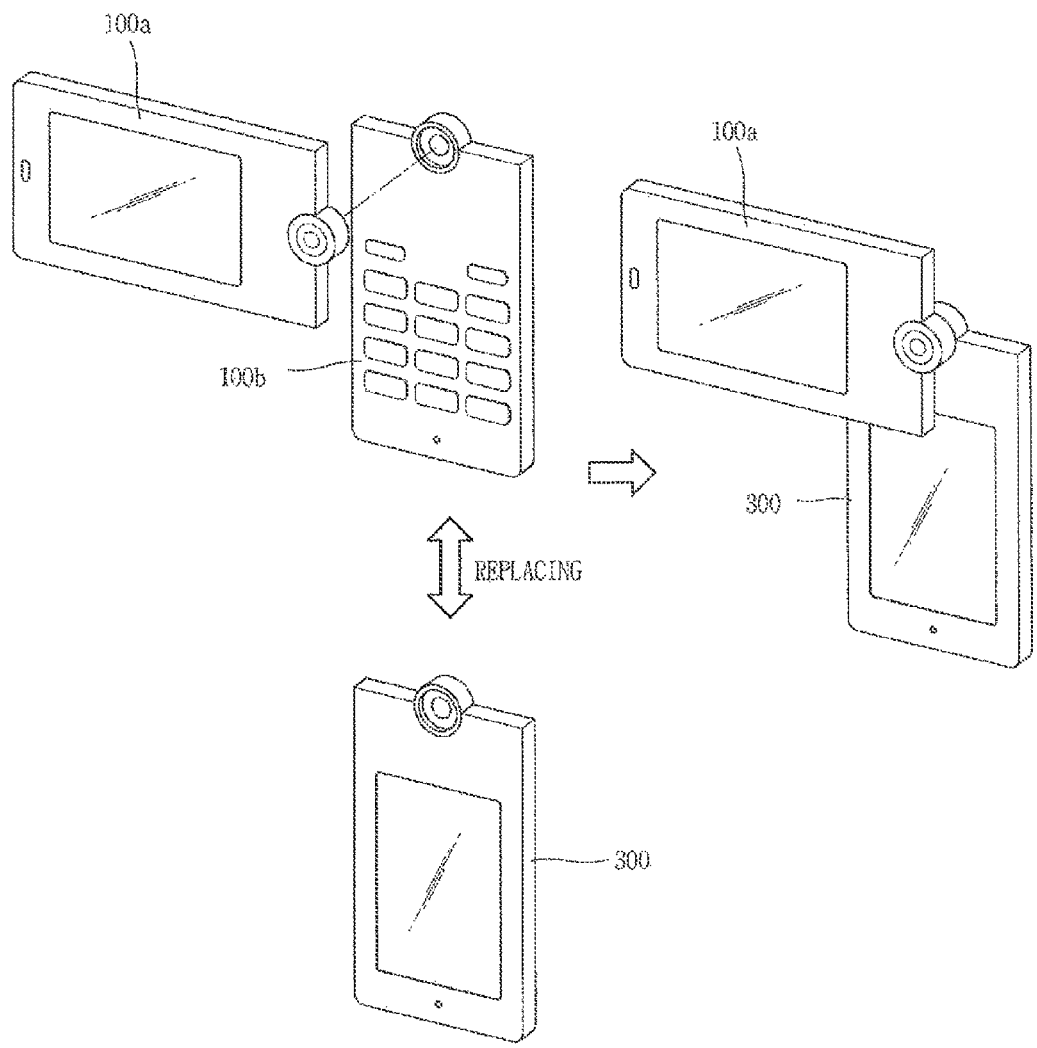

As shown in FIG. 13a, if the third body 300 replaces the first or second body, the third body may operate as a swivel folder part which is folded or unfolded. Here, it is assumed that the third body replaces the second body.

If the third body 300 (i.e., sub-device) is configured as a transparent display, it may overlap with the display unit 151 of the first body to have an effect of a dual-display. Of course, the display unit may not necessarily be the transparent display but be an LCD, an opaque display, and when the display unit is configured as the LCD and the first and third bodies are coupled, the mobile terminal can have the effect of a double display having displays on both surfaces (front and rear surfaces) thereof.

Meanwhile, if the third body is assumed to be a transparent display (TOLED), when the first body (i.e., the main device) and the third body (i.e., the sub-device) are coupled in an overlapping manner, the transparency of the transparent display of one of the two devices may be adjusted. For example, if the display unit 251 of the third body 300 overlaps with the display unit 151 of the first body 100a, the display unit of the third body 300 may be adjusted to be transparent (or semi-transparent) to allow the display screen of the first body to be seen through the display unit of the third body 300. However, if the third body is separated or unfolded so as not to overlap with the display unit 151 of the first body, they may operate as double displays to display different screen images, respectively. In this case, as the first body is swiveled, the third body may overlap with the first body such that the display directions of the two devices are the same (e.g., the front side) or may overlap with the first body such that the display directions of the two devices are the opposite.

Meanwhile, the third body may be coupled such that it faces the opposite direction from that of the display of the main device and if the third body is configured as a transparent touch screen or a transparent touch pad, then some rear surface touch functions may also be implemented thereto.

For example, the third body may be touched without covering the display unit 151 of the first body with the user's finger to select and execute a specific function icon displayed on the display unit 151 of the first body.

Accordingly, the swivel hinge may be configured in an appropriate manner to provide connection with the third body 300, thus allowing separation and coupling thereof.

When the first and third bodies 100a and 300 are separated, they may operate as the main device and the sub-device, respectively. Namely, the sub-device and the main device may operate in a mutually independent manner, or the sub-device and the main device may be connected to interwork for communication. For example, if the sub-device requests the main device to reproduce a specific multimedia file, receives the multimedia file transmitted from the main device, and outputs the received multimedia file via an output unit of the sub-device. Or, the main device and the sub-device may perform communication like an interphone.

Meanwhile, the swivel type mobile terminal may detect a position of the terminal (namely, a rotational direction0, and may rotate to output information outputted to the first or the third body according to the position (rotational direction) of the terminal. For example, the first body may output a multimedia file in a horizontal direction, and the third body may output a multimedia file in a vertical direction.

The method for coupling the sub-device to the swivel type mobile terminal has been described. Here, in a state that the first and second bodies are coupled, the third body (i.e., the sub-device) may be coupled in an overlapping manner to one of the first and second bodies in a similar manner. The method of coupling the third body to the first body will now be described for the sake of brevity.

Figure 13B:
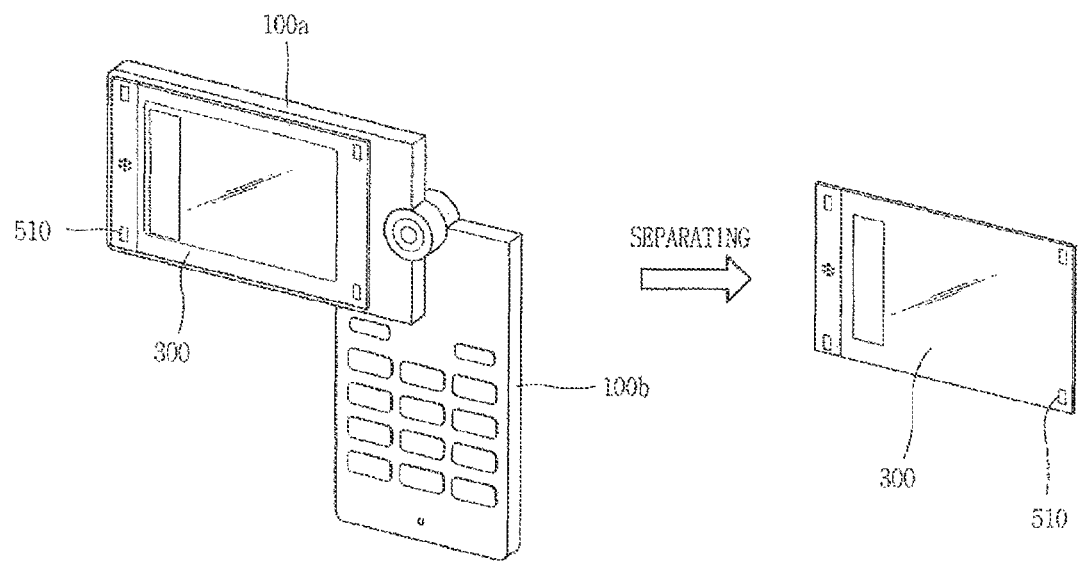

As shown in FIG. 13b, a coupling member 510 for fixing the sub-device is provided on at least one side of the first body of the swivel type mobile terminal, and the sub-device may be adjusted to the position where the coupling member is formed, and pressed to be coupled.

Figure 13C:
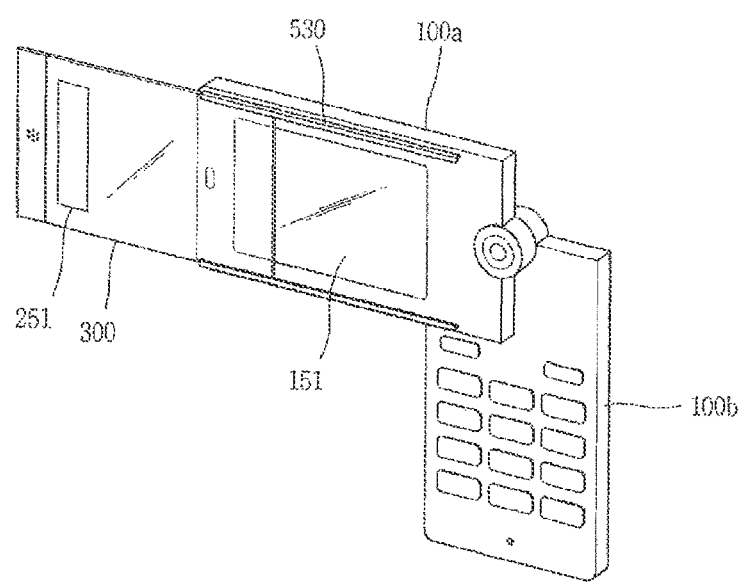

As shown in FIG. 13c, the edge holder or a slot 530 with a guide groove is provided on at least one side of the first body of the main device, and the sub-device may be pushed (or slot manner) into the guide groove so as to be coupled. In this case, if the sub-device has elasticity, it may be bent to be pushed into the edge holder so as to be coupled as shown in FIG. 13d.

The structure and method for coupling or separating the sub-device in a bar type mobile terminal will now be described. In the bar type mobile terminal the sub-device may be coupled or separated in a similar manner as the folder type, slide type, or swivel type mobile terminal as described above.

FIGS. 14a to 14d illustrate the structure and method for coupling or separating the sub-device to a bar type main device according to an embodiment of the present invention.

Figure 14D:
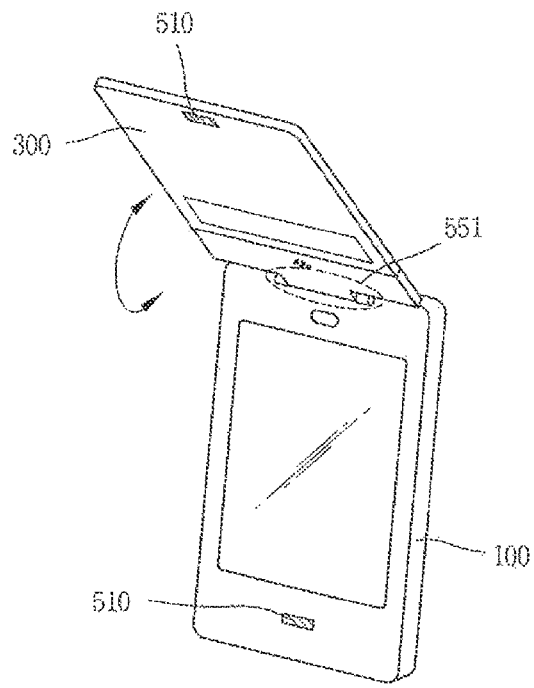

As shown in FIG. 14a, a coupling member 510 for fixing the sub-device is provided on at least one side of the main device, and the sub-device may be adjusted to the position where the coupling member 510 is formed, and pressed to be coupled. Or, as shown in FIG. 14b, the edge holder or a slot 530 with a guide groove is provided on at least one side of the main device, and the sub-device may be pushed (or slot manner) into the guide groove so as to be coupled. In this case, if the sub-device has elasticity, it may be bent to be pushed into the edge holder so as to be coupled as shown in FIG. 14c. As shown in FIG. 14d, the hinge part 551 may be additionally provided on at least one side of the main device, and the sub-body can be coupled by using the hinge part. The positions of the respective hinge parts may be interchanged, and a fixing unit (not shown) may be additionally provided to fix the sub-device such that the sub-device cannot be moved after being folded. The method of coupling the sub-device in the bar type mobile terminal has been described. A method for coupling the sub-device in a watch type mobile terminal will now be described.

FIGS. 15a to 15d illustrate the structure and method for coupling or separating the sub-device to a watch type main device according to an embodiment of the present invention.

Figure 15A:
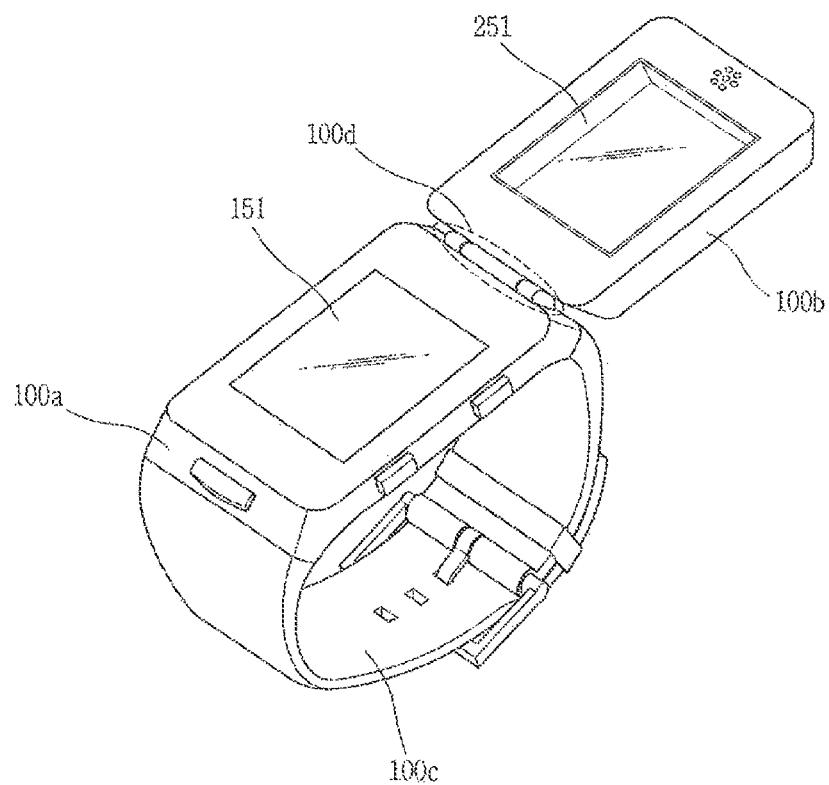

As shown in FIG. 15a, the watch type mobile terminal includes the first body 100a to which a band part 100c is connected and the second body 100b including a display unit and coupled to the first body and. The second body may be configured to be connected by a hinge 100*d* to one side of the first body so as to be open or closed. The second body may be referred to as a cover, and the first body may include a display unit to configure a dual-display together with the display unit of the second body.

At least one of the displays of the first body 100*a* and the second body 100*b* may be configured as a transparent display (TOLED). Each display may operate as a main display or a sub-display, and different information may be displayed on each display unit as the second body is open or closed. A touch pad or a transparent touch pad may be attached to at least one of the displays 151 and 251 of the first and second bodies.

In this embodiment, one of the first and second bodies may operate as a main device or a sub-device. For example, the first body may operate as a main device and the second body may operate as a sub-device. Accordingly, the hinge 100*d* may be configured to allow coupling and separating the first body (i.e., the main device) and the second body (i.e., the sub-device). The hinge part 100*d* for coupling the sub-device must have a structure allowing coupling and separating.

Like the other types of mobile terminals as described above, the main device and the sub-device may interwork, and as the two devices are coupled or separated, types of information displayed on each device or display formats may be changed.

A method of coupling the third body (i.e., the sub-device) is coupled to one of the first and second bodies in a state that the first and second bodies are coupled will now be described. The method of coupling the sub-device in an overlapping manner to the second body will now be described for the sake of brevity.

Figure 15B:
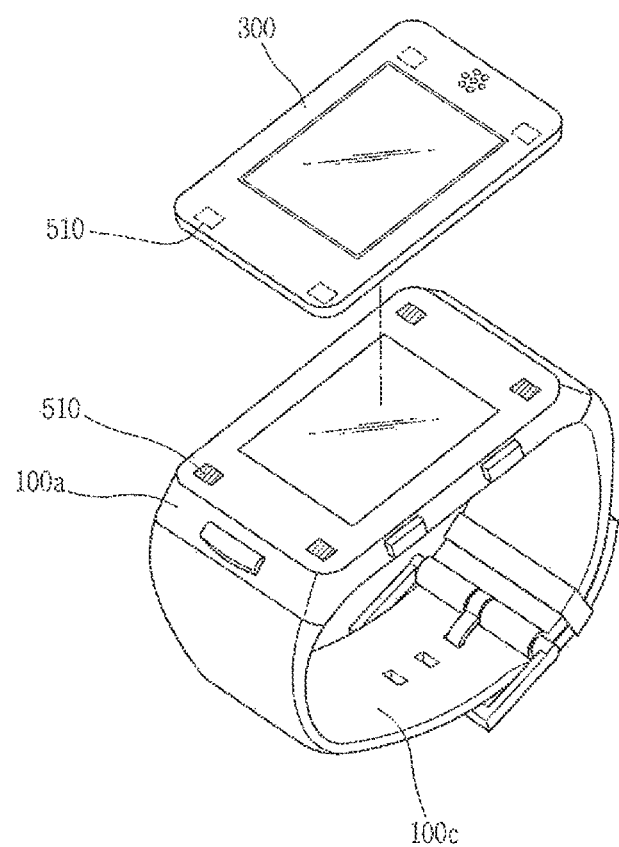

As shown in FIG. 15*b*, a coupling member 510 for fixing the sub-device is provided on at least one side of the second body of the main device, and the sub-device may be adjusted to the position where the coupling member is formed, and pressed to be coupled.

Figure 15C:
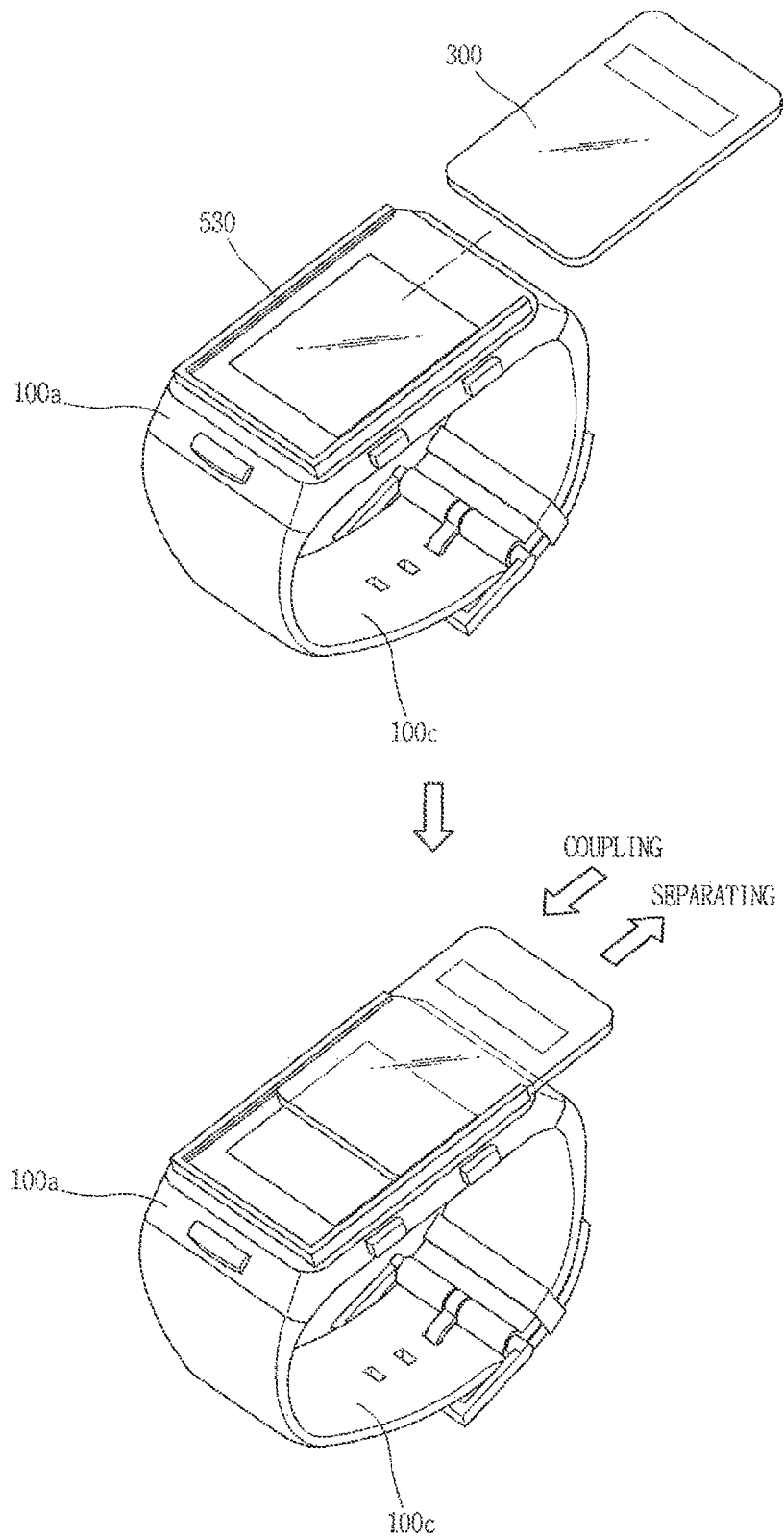

As shown in FIG. 15*c*, the edge holder or a slot 530 with a guide groove is provided on at least one side of the second body of the main device, and the sub-device may be pushed (or slot manner) into the guide groove so as to be coupled. In this case, if the sub-device has elasticity, it may be bent to be pushed into the edge holder so as to be coupled as shown in FIG. 15*d*.

FIG. 16 illustrates the structure of a clip type sub-device that can be easily attached to any types of main devices according to an embodiment of the present invention.

As described above with the reference drawings, the sub-device serves mechanically or electrically as an element of the main device when coupled to the main device, and when the sub-device is separated from the main device, it is easily carried around and remotely connected to the main device to serve as a client terminal of a server terminal and transmit/receive required information to/from the main device.

Thus, the sub-device may be configured to be easily carried around and easily mechanically coupled to the main device. In addition, the main device may be configured such that the sub-device mechanically coupled to the main device is not moved nor easily released. For example, as shown in FIG. 16, a clip 300 in the shape of a channel may integrally has a coupling part 410 so as to be inserted into one side of the terminal when coupled, or may be attached to the clothes of the user such as pockets or belts or to the part of the user's body such as head, ears, eyes, hands, feet, or neck when separated. The coupling part 410 may have elasticity. In other words, the sub-device is not limited in its shape to the plate type but may have such a shape, like '┐' or '└ ', as to be easily coupled to the main device.

In this embodiment, the sub-device is not limited to the clip type, but may have various forms or designs by including the coupling part and an output unit. For example, the sub-device may be configured in the form of ear phones, earrings, or necklaces. Also, two or more sub-devices may be configured to interwork with a single main device. Namely, an ID may be given to each sub-device and different information may be transmitted to each sub-device or the same information may be simultaneously transmitted to every sub-device. Also, the sub-devices may transmit or receive arbitrary information (e.g., voice, image, a message) to each other.

A control method of the mobile terminal that can be coupled and separated (i.e., detachable mobile terminal) will now be described with reference to the accompanying drawings.

The control method of the detachable mobile terminal may be divided into three stages: 'Control method in coupling and separating', 'Control method in a separated state (Separate concept UI)', and 'Control method in a coupled state (Combine concept UI)', and each step will now be described.

Control Method in Coupling and Separating the Mobile Terminal

The control method in coupling/separating the mobile terminal according to an embodiment of the present invention relates to a method for controlling an operation and state of the main device 100 and the sub-device 300 when the sub-device 300 is coupled to the main device 100 of the mobile terminal or separated from the main device 100.

The control method in coupling/separating the mobile terminal according to an embodiment of the present invention may be divided into 'Automatic controlling of terminal operation', 'Automatic controlling of terminal state', 'Automatic controlling of terminal power saving', and 'Automatic controlling of terminal locking'.

Automatic Controlling of Terminal Operation

Figure 17A:
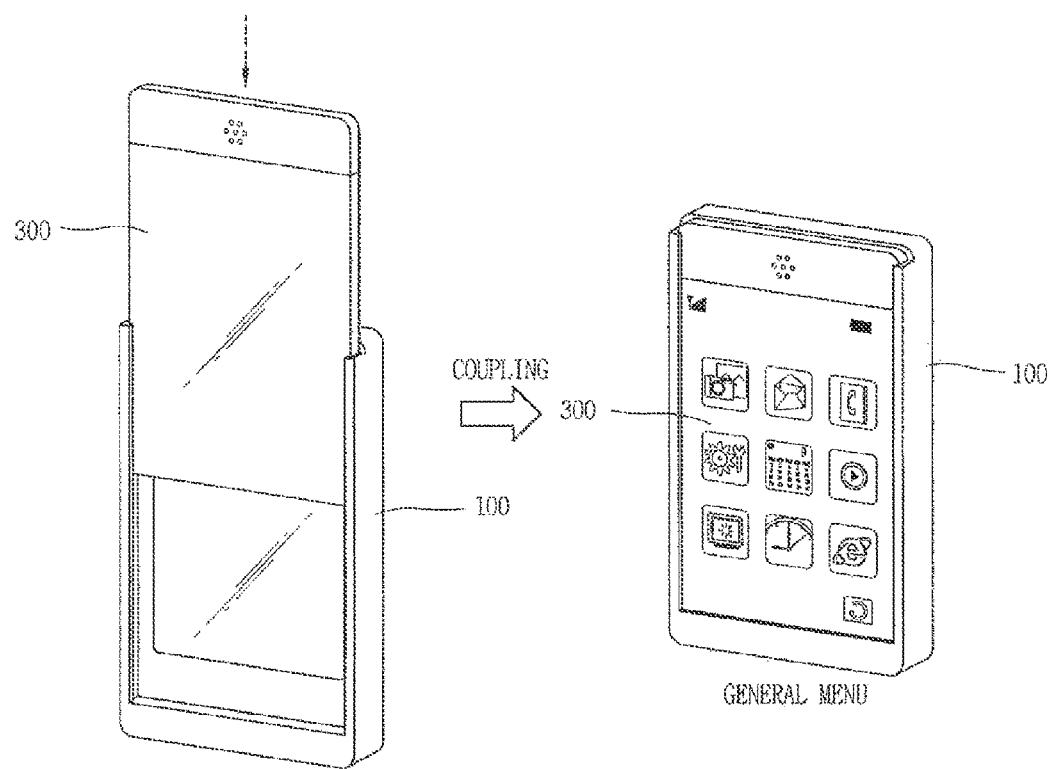
FIGS. 17a and 17b illustrate an example of automatic controlling of a terminal operation (menu display)
Figure 17B:
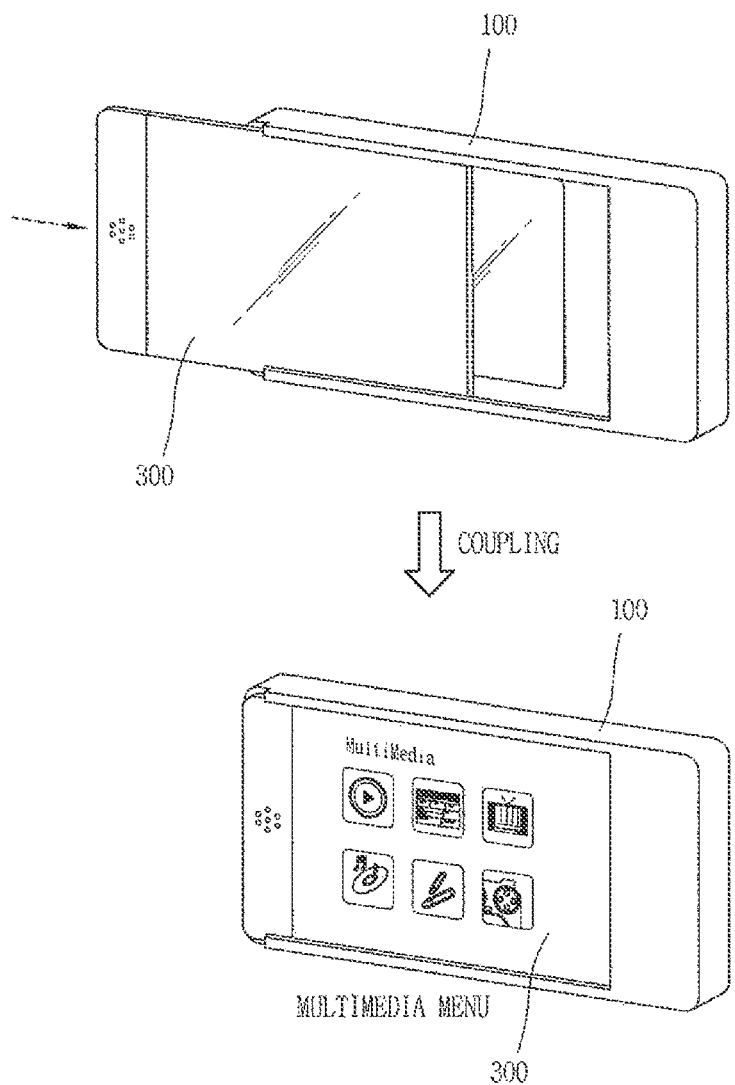

FIGS. 17*a* and 17*b* illustrate an example of automatic controlling of a terminal operation (menu display). A bar type mobile terminal will be described as an example for the sake of brevity.

The controller 180 differently controls the operations (e.g., display) of the main device 100 and the sub-device 300 according to an engaged state (vertical or horizontal).

As shown in FIG. 17*a*, when the main device 100 and the sub-device 300 are engaged in the vertical direction, the controller 180 displays a menu display method or menu items that can be conveniently manipulated in the horizontal display upon detection of it.

If the main device 100 and the sub-device 300 are engaged in the horizontal direction as shown in FIG. 17*b*, the controller 180 displays menu items that can be conveniently manipulated in the horizontal display. For example, the controller displays multimedia menu items such as an image viewer, a broadcast view, a camera function, a video player, and the like.

FIG. 18 illustrates application of the automatic controlling of the terminal operation (menu display) to a swing type or swivel type mobile terminal.

Figure 19A:
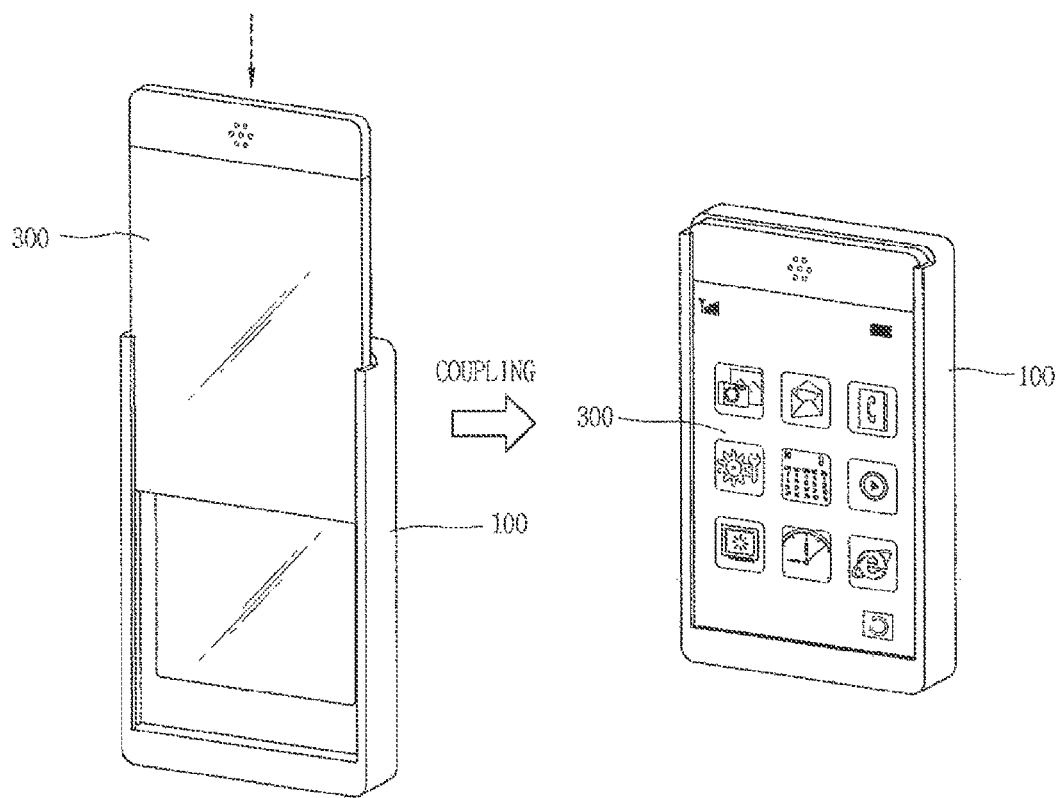
FIGS. 19a and 19b illustrate another example of automatic controlling of a terminal operation (menu display)
Figure 19B:
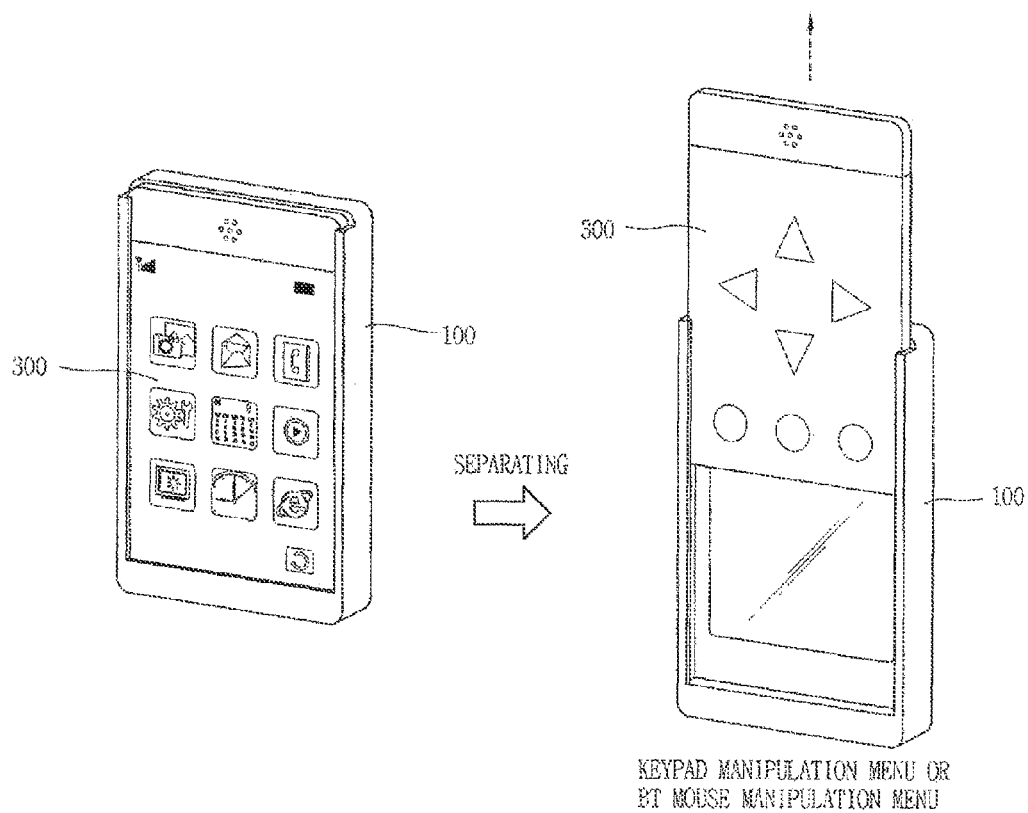

FIGS. 19*a* and 19*b* illustrate another example of automatic controlling of a terminal operation (menu display).

In this embodiment, the controller 180 differently controls the operation (e.g., display) of the sub-device 300 when the two devices 100 and 300 are coupled and separated.

With reference to FIG. 19*a*, when the sub-device 300 is coupled with the main device 100, the sub-device 300 operates as a touch screen. The controller 180 receives a touch input of the user from the sub-device 300.

With reference to FIG. 19b, when the sub-device 300 is separated from the main device 100, the sub-device 300, the sub-device 300 operates as a keypad or a wireless mouse. The controller 180 receives a user's touch inputted via the sub-device 300 through short-range radio communication (e.g., Bluetooth™, radio frequency identification (RFID), infrared data association (IrDA), and the like.

Figure 20A:
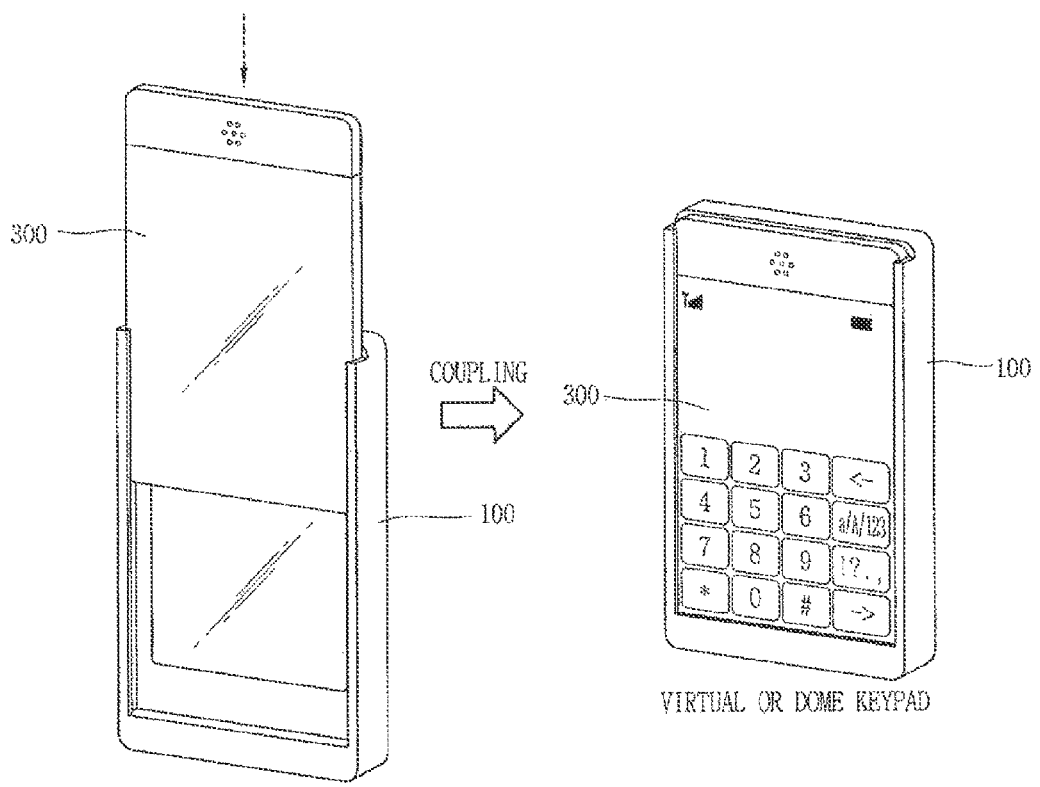
FIGS. 20a and 20b illustrate automatic controlling of a terminal operation (keypad controlling)
Figure 20B:
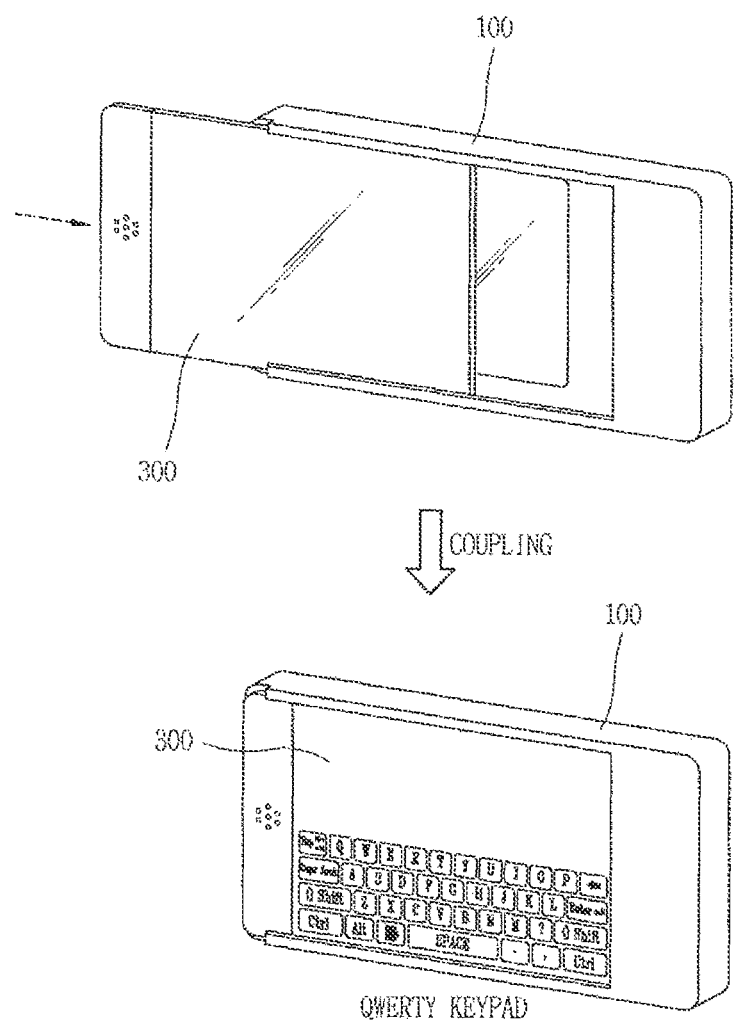

FIGS. 20a and 20b illustrate automatic controlling of a terminal operation (keypad controlling).

The controller 180 displays different keypads on the main device 100 according to an engagement form (vertical or horizontal) of the two devices 100 and 300.

As shown in FIG. 20a, when the main device 100 and the sub-device 300 are coupled in the vertical direction, the controller 180 displays a keypad (e.g., a dome, a more keypad, etc.) suitable for the vertical display upon detection of it.

Meanwhile, if the main device 100 and the sub-device 300 are coupled in the horizontal direction as shown in FIG. 20b, the controller 180 displays a keypad (e.g., a QWERTY keypad, etc.) suitable for the horizontal display.

FIG. 21 illustrates automatic controlling of a terminal operation (application controlling).

In this manner, the controller executes different applications on the main device according to the vertical and horizontal engagements.

Figure 21A:
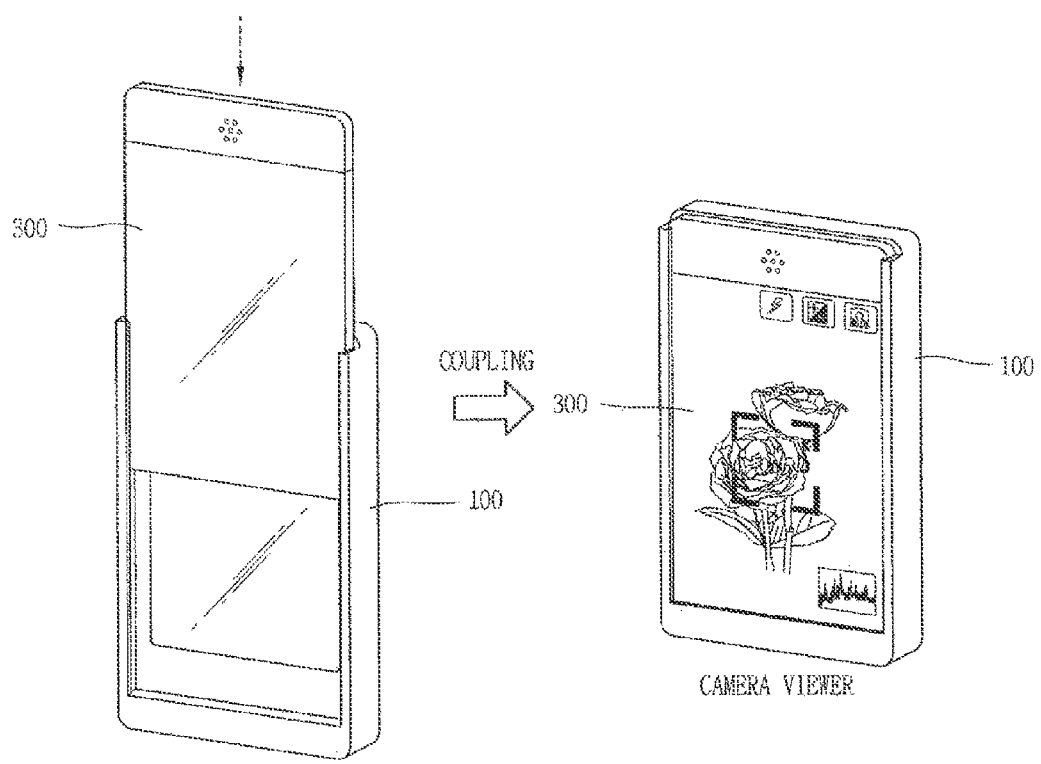
FIG. 21 illustrates automatic controlling of a terminal operation (application controlling)
Figure 21B:
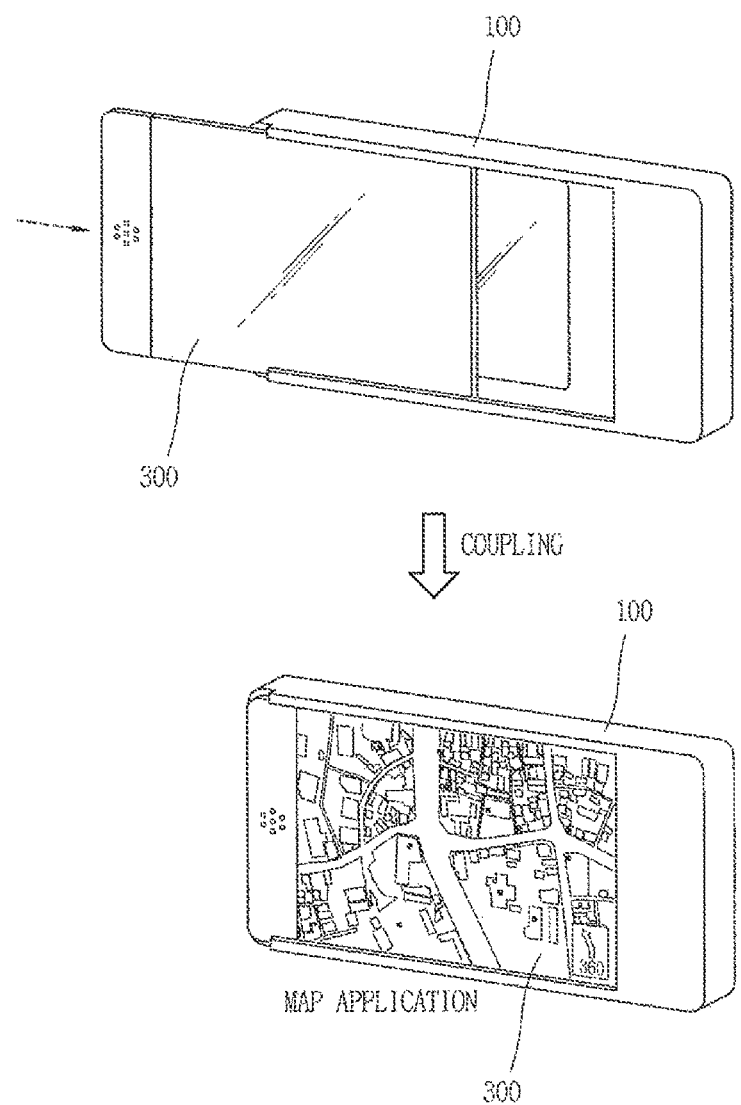

For example, when the main device 100 and the sub-device 300 are coupled in the vertical direction as shown in FIG. 21a, the controller 180 executes a camera viewer, and if the main device 100 and the sub-device 300 are coupled in the horizontal direction as shown in FIG. 21b, the controller 180 executes a map application.

Automatic Controlling of Terminal State

Figure 22:
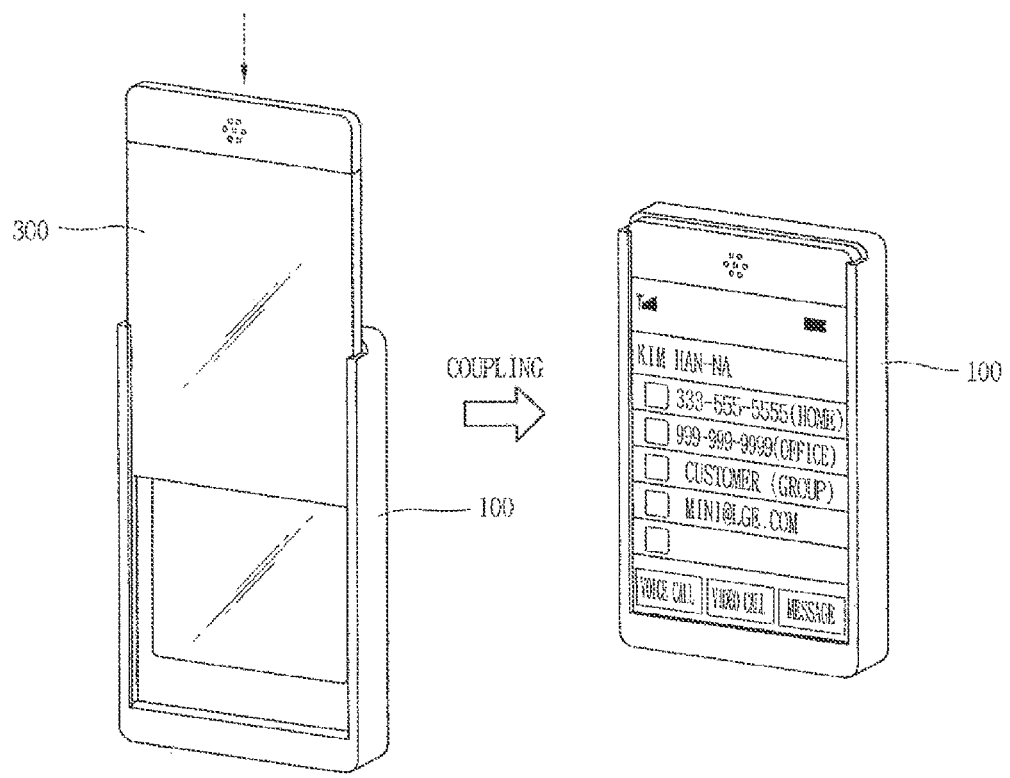
FIG. 22 illustrates an example of automatic controlling of a terminal state.

FIG. 22 illustrates an example of automatic controlling of a terminal state.

In this embodiment, the mobile terminal displays different information with respect to a single application (e.g., a phone book function) when the main device and the sub-device are vertically engaged and when they are horizontally engaged.

As shown in FIG. 22, when the main device 100 and the sub-device 300 are coupled in the vertical direction and the phone book function is executed, the controller 180 displays general information such as the name, a phone number, a phone number photo image, a birthday, and the like, of a selected person.

Meanwhile, if the two devices 100 and 300 are coupled in the horizontal direction and the phone book function is executed, the controller 180 displays communication-related information such as the number of calls, the number of messages, the total call time, the latest call record, and the like, with a selected person.

Figure 23:
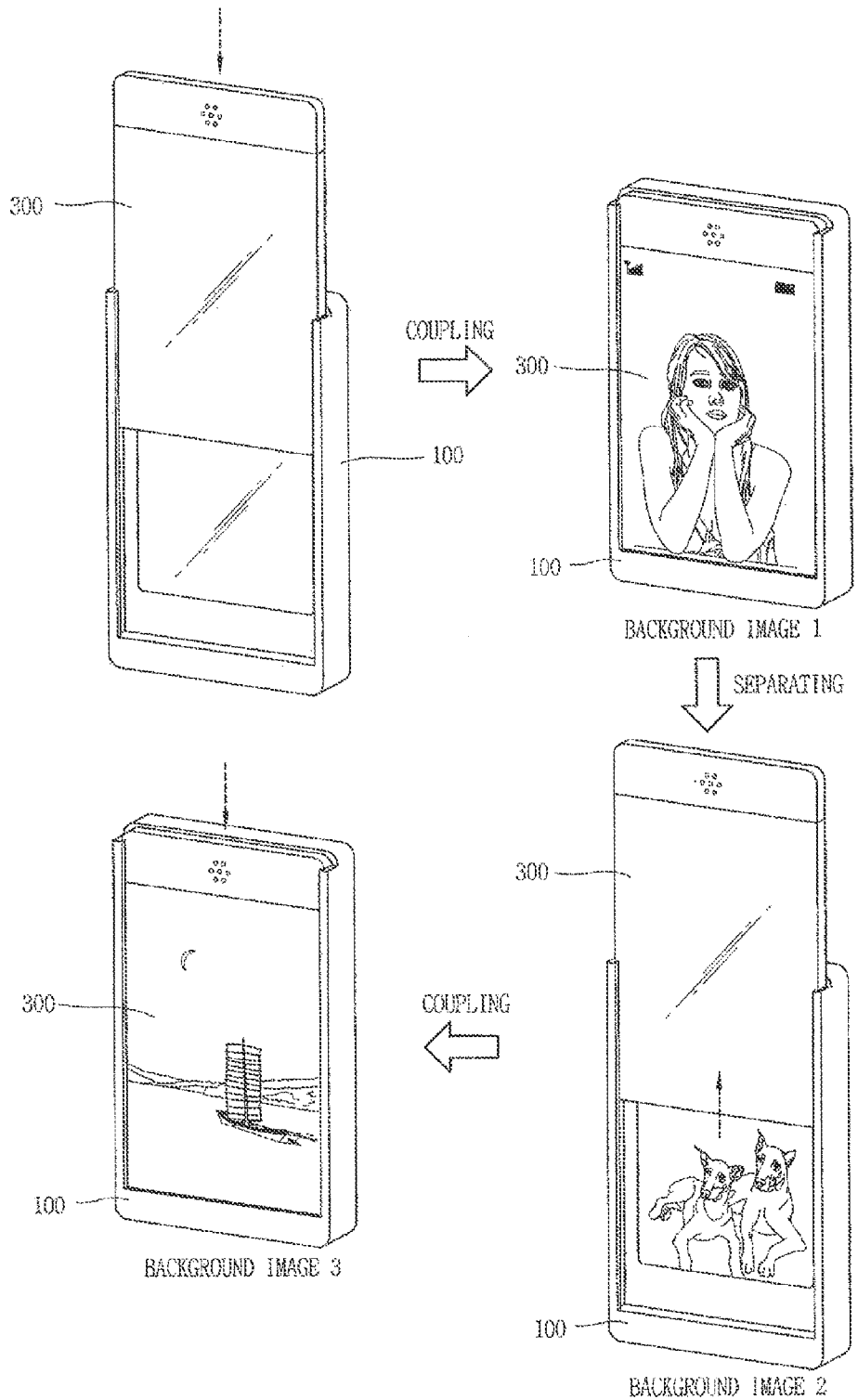
FIG. 23 illustrates another example of automatic controlling of a terminal state.

FIG. 23 illustrates another example of automatic controlling of a terminal state.

In this embodiment, the controller detects coupling or separating of the two devices 100 and 300 and provides control to display different background images on the main device 100.

For example, if a first image is displayed as a background image when the two devices 100 and 300 are coupled, a second image is displayed as the background image when the two devices are separated. And then, if the two devices 100 and 300 are coupled again (re-coupled), the controller 180 displays a third image as the background image. In this embodiment, a plurality of images may be designated as the background image, and the controller 180 may randomly or sequentially display the designated images as the background image each time the two devices 100 and 300 are coupled or separated.

In this embodiment, because various background images stored in the terminal are displayed, the user will be less bored, as functions that are entertaining and fun can be provided to the user.

Automatic Controlling of Terminal Power Saving

Figure 24:
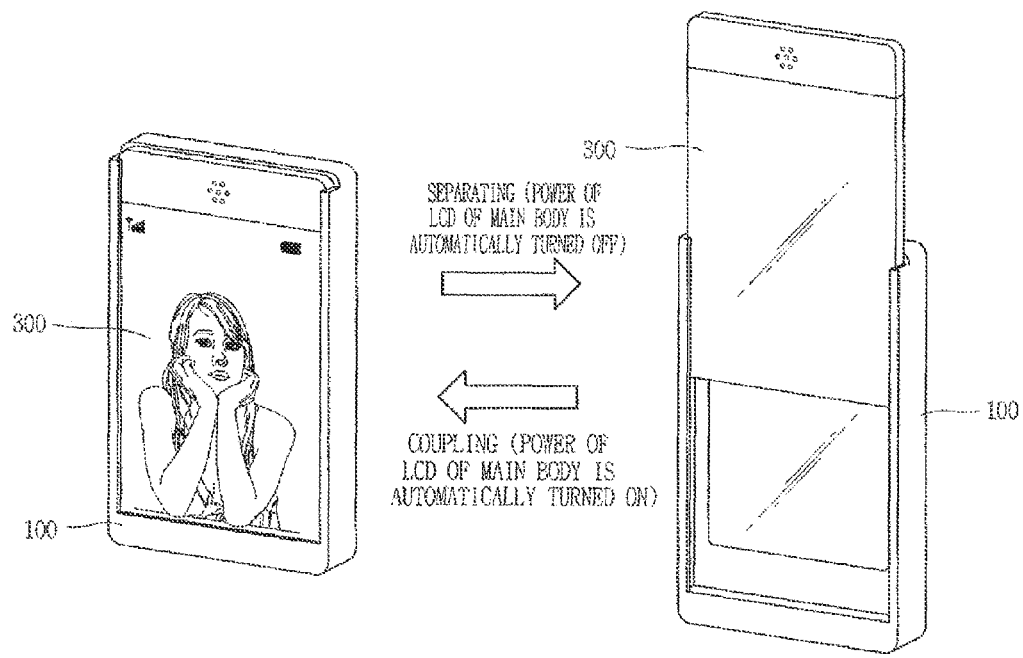
FIG. 24 illustrates automatic controlling of power saving of the terminal.

FIG. 24 illustrates automatic controlling of power saving of the terminal.

In this embodiment, the controller 180 detects the coupling and separating (i.e. coupling or de-coupling) of the two devices 100 and 300 and controls the power supply to the display of the main device 100 to turn it on or off.

For example, when the coupled state of the two devices is released or separated (i.e. when the two devices are de-coupled from each other), the controller 180 detects this and cuts off power supply to the display of the main device 100.

Thereafter, when the two devices 100 and 300 are coupled again, the controller 180 provides control to supply power to the display of the main device 100 to allow the main device to perform displaying. In this embodiment, automatic power controlling may be converted to hand-operated power controlling. When the automatic power controlling is converted into the hand-operated power controlling, power supplied to the display of the main device 100 is controlled by the user regardless of coupling or separating of the two devices 100 and 300.

Automatic Controlling of Terminal Locking

FIG. 25 illustrates automatic controlling of locking of the terminal.

In this embodiment, the controller 180 controls a locking and unlocking function of the main device upon detecting the coupling and separating (i.e. coupling or de-coupling) of the two devices 100 and 300.

When the coupling of the two devices 100 and 300 is released (separated) (i.e. when the two devices are de-coupled from each other), the controller 180 detects 4 this and sets a locking function of the main device 100.

When the two devices 100 and 300 are coupled again, the controller 180 unlocks the locked state to allow the main device 100 to be manipulated.

If the main device 100 and the sub-device 300 are coupled such that the sub-device is inserted in the guide groove and pushed as shown in FIG. 14b, the automatic locking control according to this embodiment may be implemented in a different manner.

This embodiment may be applicable such that the controller 180 monitors a movement of the sub-device 300 in the guide groove, and sets a locking operation at the main device 100 when the sub-device 300 passes a particular point of the guide groove. If the main device 100 is already in a locked state when the sub-device 300 passes the particular point of the guide groove, the controller 180 unlocks the locked state of the main device 300, to thus allow the main device 300 to be manipulated.

Accordingly, the user may control locking/unlocking of the main device 100 by simply and softly moving the sub-device 300 in the guide groove.

FIG. 26 illustrates user setting in controlling of coupling/separating according to an embodiment of the present invention.

As described above, the method of controlling coupling/separating of the mobile terminal according to the embodiment of the present invention may be divided into 'automatic controlling of terminal state', 'automatic controlling of terminal power saving', and 'automatic controlling of terminal locking', and in the present invention, the setting of the automatic controlling may be arbitrarily changed by the user.

Automatic controlling according to the coupling/separating of the two devices 100 and 300 may be rather inconvenient to the user in a sense. In this case, the user may execute a user setting menu as shown in FIG. 26 to change a desired automatic controlling item to an hand-operated controlling and input a desired setting value.

Control Method in Separated State (Separate Concept UI)

A control method in a separated state (Separate Concept UI) will now be described. Namely, the main device 100 and the sub-device 300 are controlled variably in a state of being separated.

Figure 27:
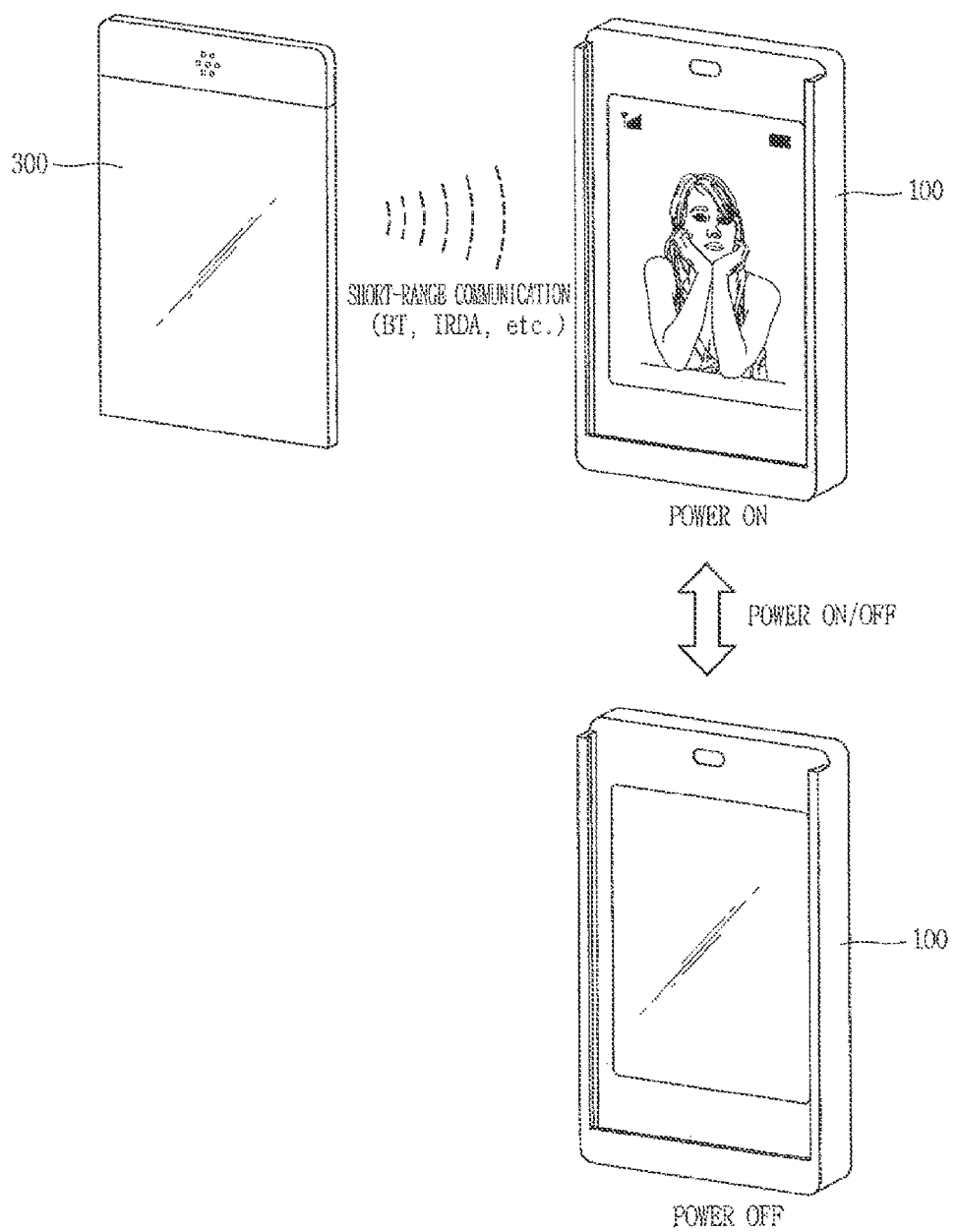
FIG. 27 illustrates controlling of power of the main device 100.

FIG. 27 illustrates controlling of power of the main device 100.

In a state that the main device 100 and the sub-device 300 are separated, the user may manipulate only the sub-device 300 to turn on or off power of the main device 100. To this end, the sub-device 300 may have a software key (or hardware key) for power controlling or execute a menu for power controlling.

A power control command (e.g., ON or OFF) inputted by the user is transmitted on short-range wireless communication (e.g., Bluetooth™, radio frequency identification (RFID), infrared data association (IrDA), and the like) via the connection unit 230 of the sub-device 300.

Thereafter, when the power control command of the user is received by the main device 100, the controller 180 turns on or off power of the main device 100 according to the received power control command.

Figure 28:
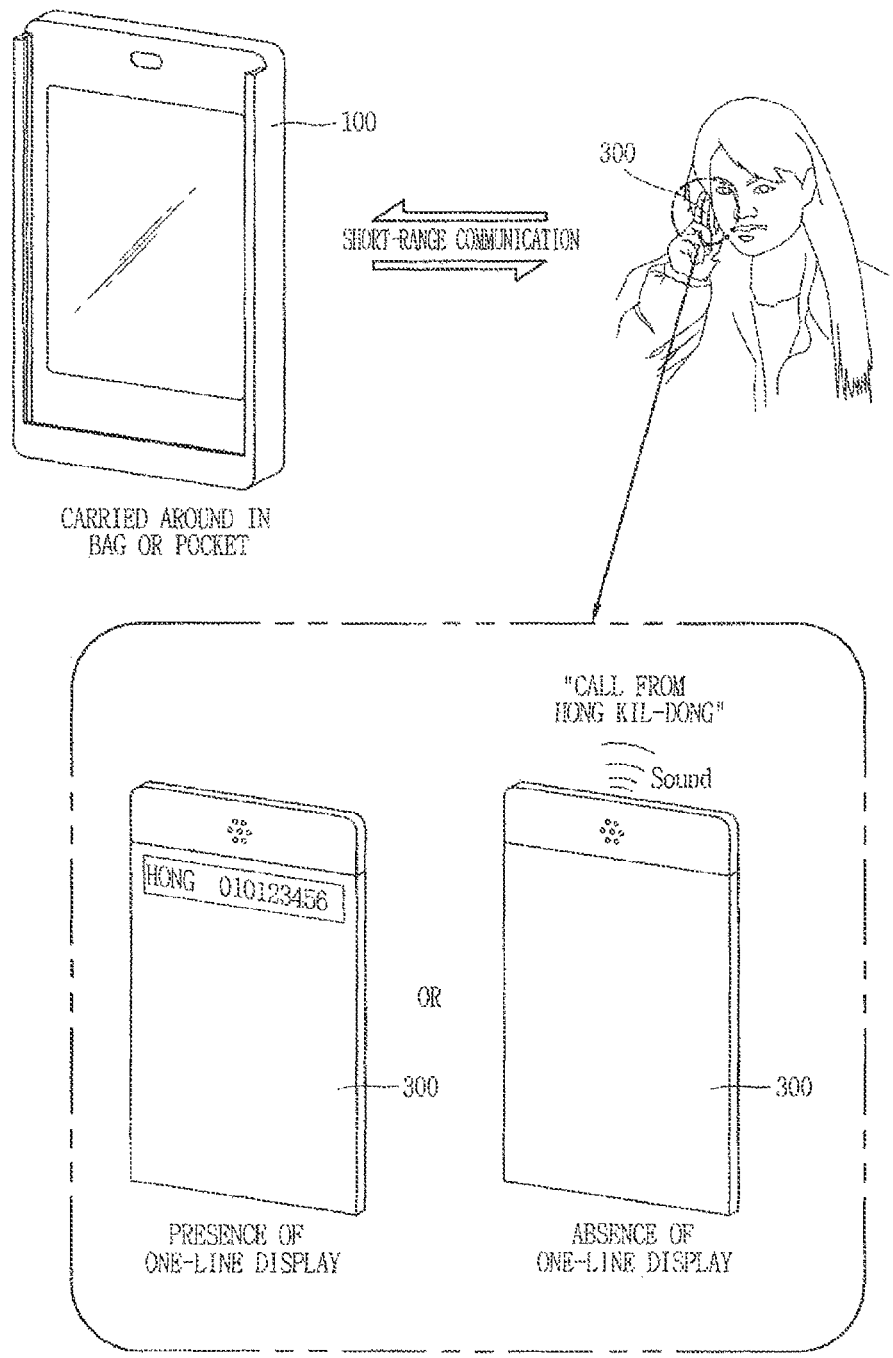
FIG. 28 illustrates controlling of a call function of the sub-device 300.

FIG. 28 illustrates controlling of a call function of the sub-device 300.

In a state that the main device 100 and the sub-device 300 are separated, when a call is received by the main device 100, the sub-device 300 according to the embodiment may provide a call function to the user. To this end, the sub-device may have a function key for call transmission/reception, an input unit (e.g., a microphone, etc.), and an output unit (e.g., an audio output unit, an earphone connection unit, etc.) as shown in FIG. 9c.

When a call is received by the main device 100 in the state that the two devices 100 and 300 are separated, the controller 180 transfers the received call to the sub-device via the connection unit 230. The sub-device 300 takes user's attention through a certain alarm (e.g., sound or vibration), or displays a message informing about the call reception and a phone number of the origination side as shown in FIG. 28 for user recognition.

Thereafter, when the use, upon recognition of the call reception, inputs the cal transmission/reception function key, a signal of the inputted function key is transferred to the main device 100 and the controller 180 establishes a communication path for call communication between the two devices 100 and 300. In this case, transmission of the function key signal and setting of the communication path may interchange in the order.

With the communication path established for call communication between the main device 100 and the sub-device 300, a call communication using the sub-device 300 is available. In case of a message reception, the controller 180 displays the received message on the display of the sub-device 300 and makes a certain alarm (e.g., sound or vibration) for user's attention.

In this embodiment, the user may conveniently perform call communication by using only the sub-device 300, with his mobile terminal (e.g., the main device 100) carried in a pocket or bag.

Figure 29:
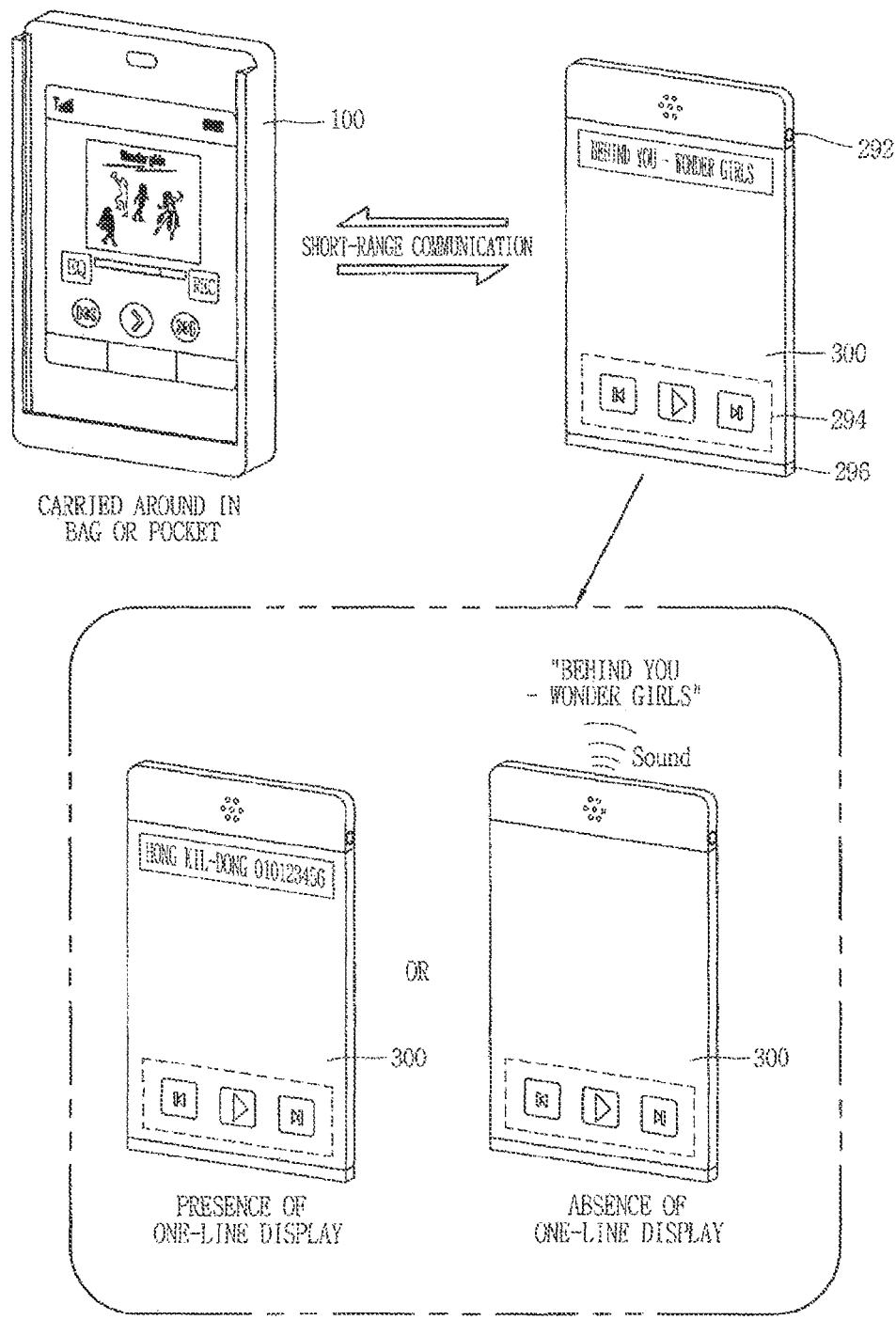
FIG. 29 illustrates controlling of a multimedia player.

FIG. 29 illustrates controlling of a multimedia player.

In a state that the main device 100 and the sub-device 300 are separated, the sub-device 300 according to this embodiment may provide a multimedia reproduction function of the main device 100. To this end, the sub-device 300 may have the function key for reproducing multimedia (e.g., MP3 reproduction), the output unit (e.g., audio output unit, earphone connection unit, etc.) as shown in FIG. 9c.

With the two devices 100 and 300 separated, when the user inputs the MP3 function key, a signal of the inputted function key is transferred to the main device 100 via the connection unit 230. Upon receiving the signal of the function key, the controller 180 establishes a short-range wireless communication path between the two devices 100 and 300.

Thereafter, when a media reproduction and control signal is inputted by the user via the communication path, the controller 180 controls the multimedia player according to the inputted signal and transfers the reproduced music sound to the sub-device 300.

The user may connect an earphone to an earphone connection unit 292 to enjoy music (e.g., MP3, etc.). If the sub-device does not have a display, information related to the corresponding music file may be fed back in advance and enjoy music. If the sub-device 300 has a one-line (or two-line) display, the information related to the music file being outputted may be outputted via the one-line display.

The sub-device 300 according to this embodiment may have software keys 294 for controlling multimedia reproduction or a hardware button as shown in FIG. 9d.

In this embodiment, the sub-device 300 may have a gyro sensor 296. When the sub-device 300 has the gyro-sensor 296, a movement of the sub-device 300 and a change in tilting of the sub-device detected by the sensor 296 are transferred to the main device 100, and the controller 180 performs player controlling such as playing next music, playing previous music, stopping playing, and the like.

In this embodiment, the user may conveniently enjoy music or video by using only the sub-device 300 with the mobile terminal (e.g., the main device 100) carried in his pocket or bag.

Figure 30:
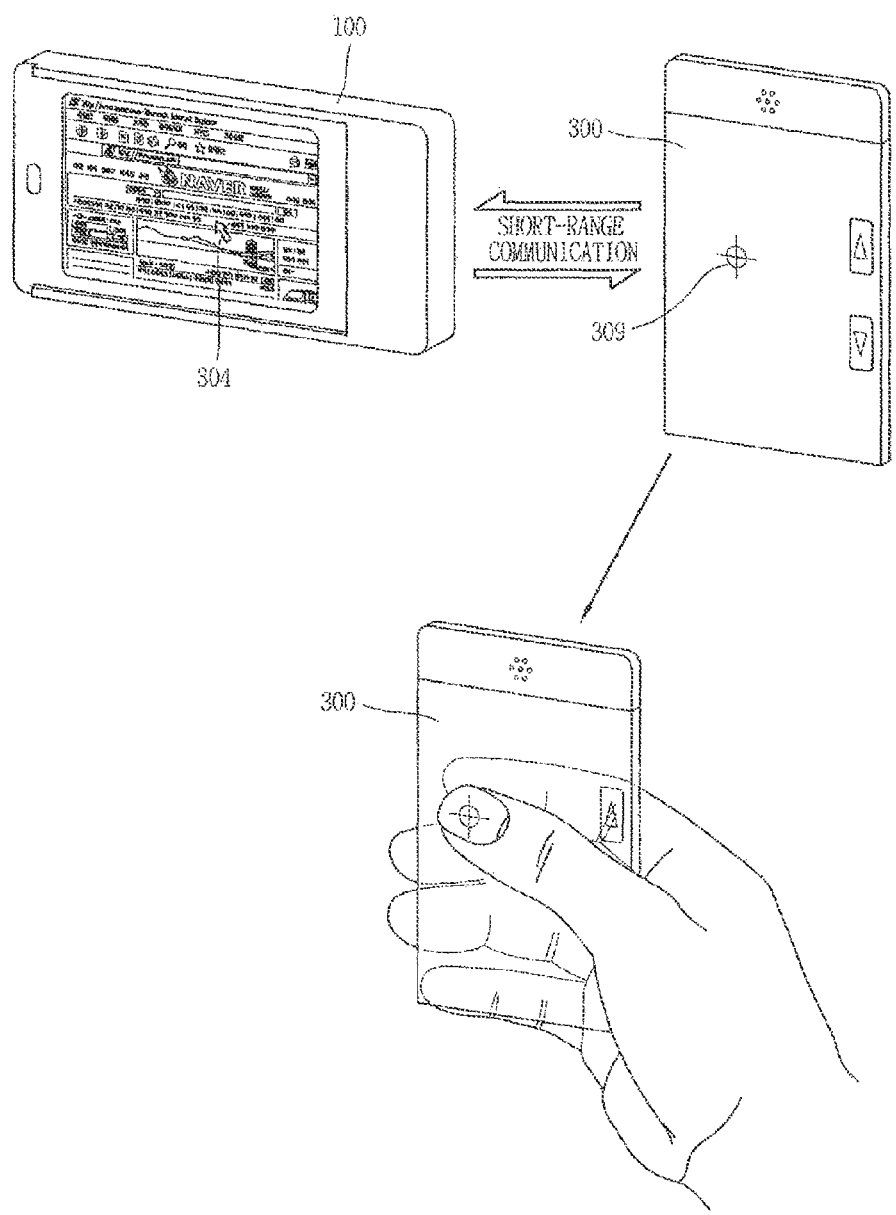
FIG. 30 illustrates an example of controlling of a mouse function.

FIG. 30 illustrates an example of controlling of a mouse function.

In the state that the main device 100 and the sub-device 300 are separated, the sub-device 300 according to this embodiment may provide a mouse function or a touch pad function to the user. To this end, the sub-device 300 may have a certain key for the mouse function or the touch pad function as shown in FIG. 9c.

With the two devices 100 and 300 separated, when the user inputs the function key, a signal of the inputted function key is transferred to the main device 100 via the connection unit 230. Upon receiving the signal of the function key, the controller 180 establishes a short-range radio communication path between the two devices 100 and 300 and displays a mouse pointer 304 at one point of the display of the main device 100.

Thereafter, a user's touch input detected by the sub-device 300 is transferred to the main device 100 via the communication path, and the controller 180 controls the movement of the mouse pointer 304 according to the touch input.

In this embodiment, the user may use the sub-device 300 like a touch pad of a notebook computer, and as shown in FIG. 30, the user may control the mouse pointer 304 by simply moving a certain pointer 309.

In this embodiment, the sub-device 300 may have a software key (or hardware key) at one side of the display to control screen scrolling of the main device 100.

The user may conveniently control an application being executed on the main device 100 by using the sub-device 300 in a state that the main device 100 is separated by a certain distance.

Figure 31:
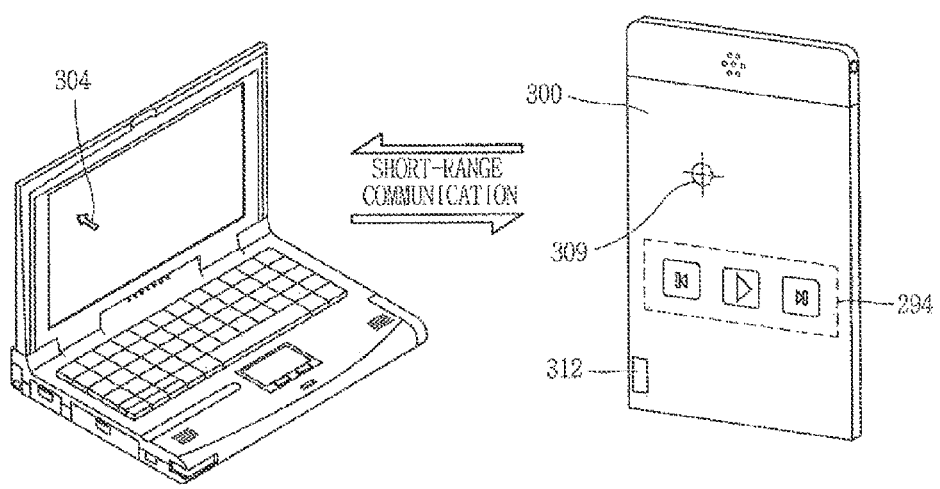
FIG. 31 illustrates another example of controlling of the mouse function.

FIG. 31 illustrates another example of controlling of the mouse function.

In this embodiment, the user may control various applications of a personal computer (e.g., a desktop computer, a notebook computer, etc.) by using the sub-device 300. To this end, the sub-device 300 may have various function keys (e.g., mouse function (or touch pad function), multimedia reproducing function, and the like) as shown in FIG. 9c.

In this embodiment, the user may input a desired function key to establish a short-range radio communication path between the two devices 100 and 300 to control various applications of a personal computer likewise as in the embodiments of FIGS. 29 and 30.

The user may enjoy music files (e.g., MP3 files or the like) stored in the personal computer by using the sub-device 300. In addition, the user may select both the mouse function key and the multimedia reproduction function key to select and execute music files or video files of the personal computer through a touch input via the sub-device 300.

In this embodiment, the sub-device 300 may have a multi-stage slide buttons 312 (hardware or software key) to perform mode switching (Hold/Mode 1/Mode 2). When the sub-device 300 has the multi-stage slide button 312, a hold function (touch lock), a call transmission/reception (or MP3) function (Mode 1), the mouse function (Mode 2), and the like, may be executed through the single button.

The controller 180 switches the mode and executes a function of the corresponding mode each time the multi-stage slide button 312 is inputted.

Figure 32:
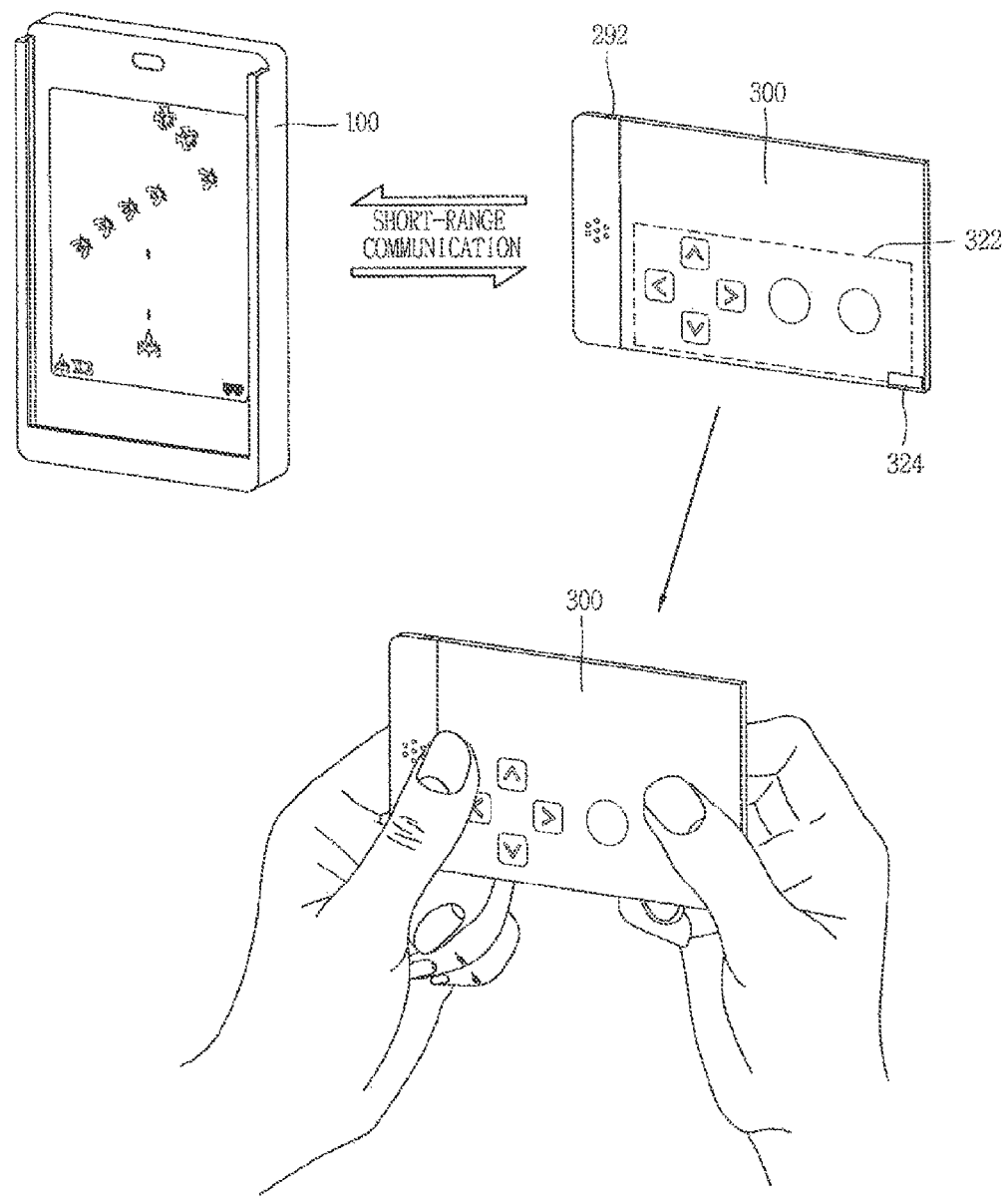
FIG. 32 illustrates controlling of a game function.

FIG. 32 illustrates controlling of a game function.

In the state that the main device 100 and the sub-device 300 are separated, the sub-device according to this embodiment may provide a game control function to the user. To this end, the sub-device 300 may having a function key for controlling games, the output unit (e.g., the audio output unit, the earphone connection unit, etc.), a vibration element, and the like, as shown in FIG. 9c.

With the two devices 100 and 300 separated, when the user inputs the function key, a signal of the inputted function key is transferred to the main device 100 via the connection unit 230. Upon receiving the signal of the function key, the controller 180 establishes a short-range radio communication path between the two devices 100 and 300.

Thereafter, when a control signal (←, ↑, ↓, →, execution key 1, execution key 2, etc.) is inputted via the communication path, the controller 180 controls objects of games according to the input signal and transfers sound effects of the games to the sub-device 300. The user may connect an earphone to the earphone connection unit 292 to enjoy the games along with the sound effects of the games.

The game manipulation buttons 322 may be printed in a grid (or lattice) pattern on the sub-device 300. When the gate manipulation buttons 322 are printed ones, the sub-device 300 may include an illumination element (e.g., LED, etc.).

The sub-device 300 may be implemented such that the printed grid (or lattice) pattern appears or disappears according to blinking of the LED.

The gate manipulation buttons 322 may be implemented by software. When the game manipulation buttons 322 are implemented by software, the user may arbitrarily set positions and manipulation functions of the buttons and add new buttons.

In this embodiment, the sub-device 300 may transmit vibration according to the sound effects of the games or may transmit a vibration feedback according to a user's touch input.

The user may manipulate and control a game being executed on the main device 100 by using the sub-device 300 in a state that the main device 100 is separated by a certain distance.

Figure 33A:
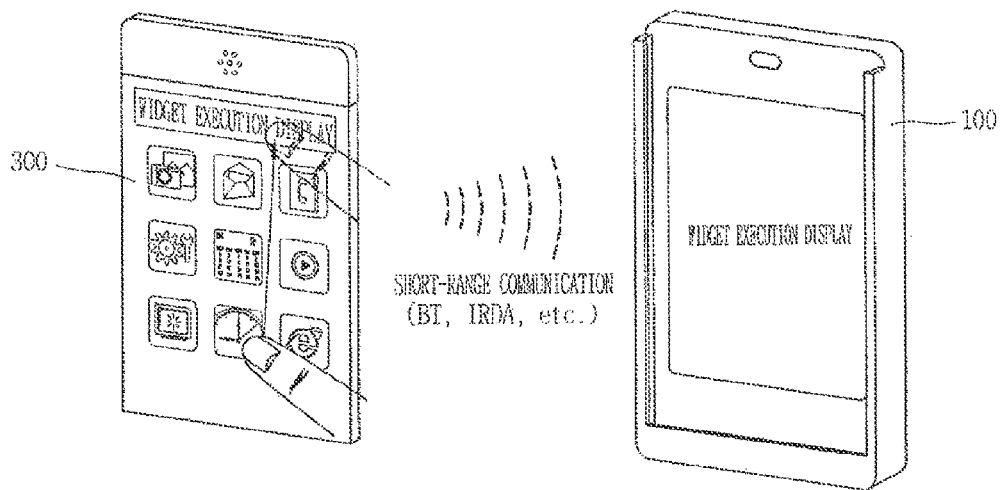
FIGS. 33a and 33b illustrate controlling of execution of a widget.
Figure 33B:
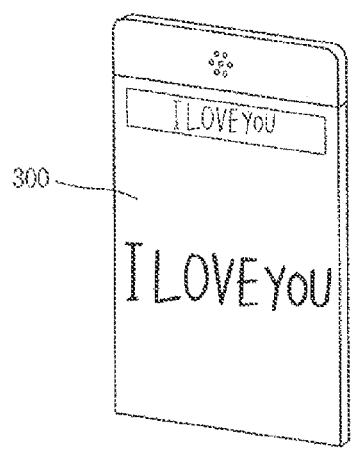

FIGS. 33a and 33b illustrate controlling of execution of a widget.

In the state that the two devices 100 and 300 are separated, the sub-device 300 according to this embodiment may perform a widget function. It is assumed that the sub-device 300 according to this embodiment includes the touch pad with the one-line display (or two-line display) and various function keys printed thereon as shown in FIG. 9d, for the sake of brevity.

When the function keys 332 printed on the touch pad is desired to be executed, the user touch-and-drags one (e.g., a 'clock' function key) of the function keys and puts it on the one-line display. Then, the sub-device 300 displays a current time, date, and the like, on the one-line display. If a 'weather; function key is touch-and-dragged to the one-line display, today's lowest temperature and highest temperature, the probability of rain, a special weather report, and the like, would be displayed on the one-line display.

The function keys (e.g., 'clock' or 'weather' function key) are those printed on the touch pad, so they cannot move to the one-line display. The sub-device 300 detects the user's touch input (touch and drag) and executes a widget of the corresponding function.

For another example of the widget execution, if the user touch-and-drags a 'broadcast view' function key, among the function keys 332, to the one-line display, the sub-device 300 transfers a 'broadcast view' execution command to the main device 100 via the connection unit 230. The controller 180 executes the 'broadcast view' application according to the execution command and provides a broadcast service to the user.

For still another example of the widget execution, if the user inputs letters (hand-written letters) (e.g., 'I love you') on the touch pad, the sub-device 300 may display the letters inputted to the touch pad on the one-line display as shown in FIG. 33b.

Figure 34:
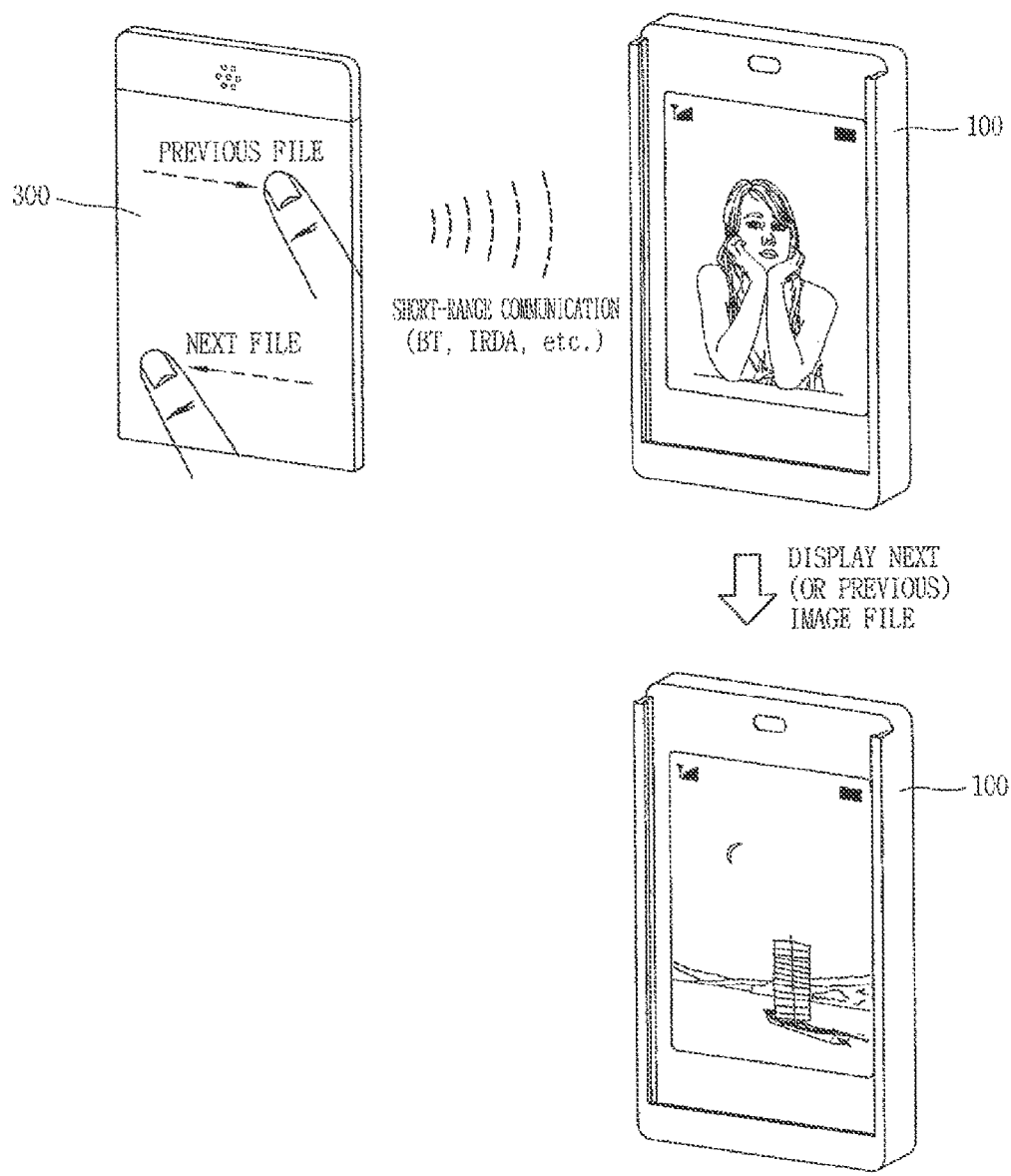
FIG. 34 illustrates an example of controlling of function interworking.

FIG. 34 illustrates an example of controlling of function interworking.

When the main device 100 is executing a photo or image viewer (or a video player), the user may enjoy stored images by simply touching (e.g., dragging, flicking, etc.) the sub-device.

In a state that a short-range radio communication path to the sub-device 300 has been established, when the main device 100 is executing the photo viewer or the image viewer (or the video player), the controller 180 of the main device reacts to a simple touch input to the sub-device 300. For example, the controller 180 performs an image change to a previous image or a next image according to a flicking direction detected by the sub-device 300. When flicking to the left side is detected, the controller 180 displays an image of a next page (or the next order), and when flicking to the right side is detected, the controller 180 displays an image of a previous page (or previous order).

With the main device 100 separated by a certain distance, the user may conveniently (without a control button input or a key manipulation) enjoy the images stored in the main device 100 by using the sub-device 300.

Figure 35:
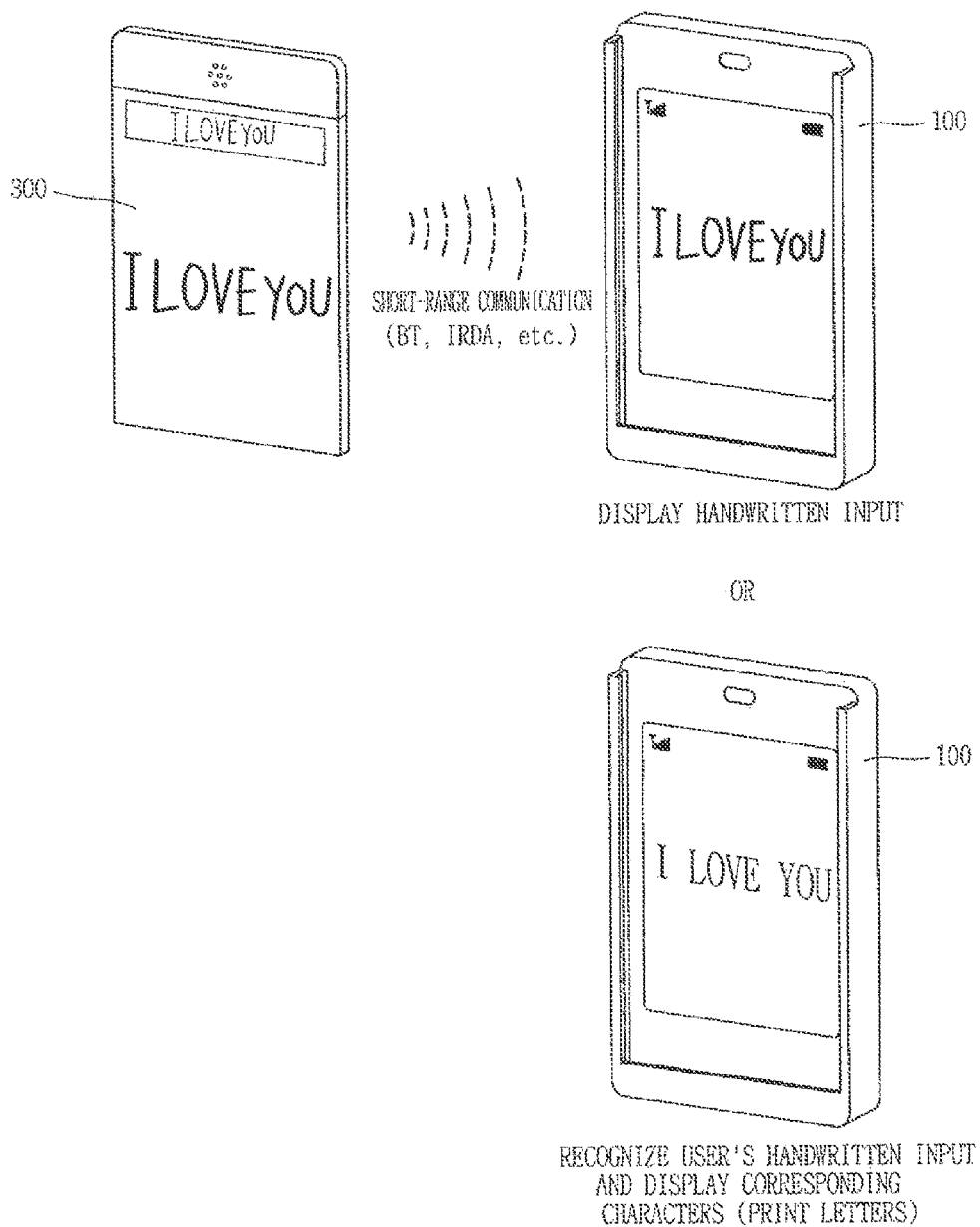
FIG. 35 illustrates another example of controlling of function interworking.

FIG. 35 illustrates another example of controlling of function interworking.

When the main device 100 is executing a character input editor, the user according to this embodiment may input characters via the sub-device 300.

With the character input editor executed on the main device 100, when the user inputs letters (i.e., hand-written letters) (e.g., 'I love you') to the touch pad, the sub-device 300 transmits the letters inputted to the touch pad to the main device 100 via the established communication path. And the controller 180 displays the transmitted letters of the user on the display of the main device as shown in FIG. 35.

In this embodiment, the controller 180 may convert the hand-written letters of the user into print letters according to settings of the terminal. When the hand-written letters of the user are transmitted to the main device 100, the controller 180 converts the transmitted letters to print letters through a certain character recognition process, and displays the converted print letters on the display of the main device 100 as shown in FIG. 35.

Figure 36:
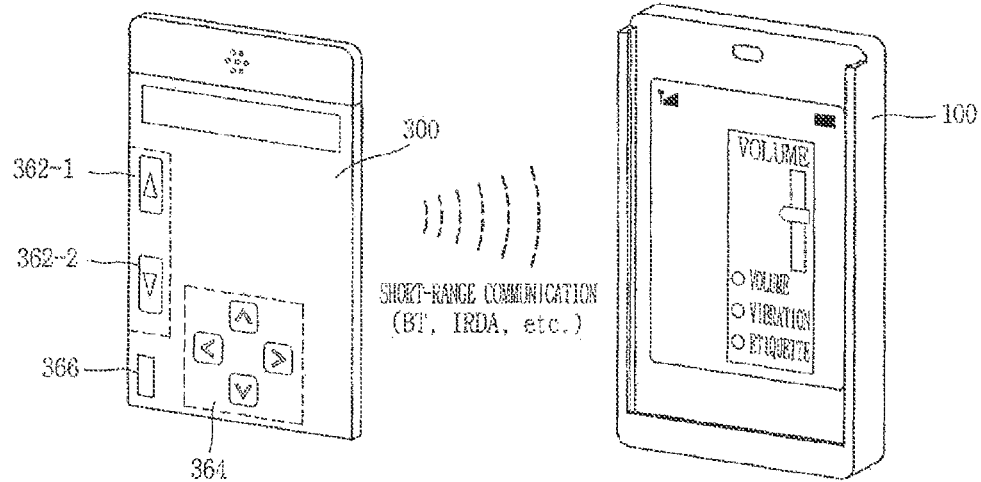
FIG. 36 illustrates mode conversion and strength adjustment of the main device.

FIG. 36 illustrates mode conversion and strength adjustment of the main device.

In the state that the main device 100 and the sub-device 300 are separated, the sub-device 300 according to this embodiment may convert the mode (or state) of the main device 100 (e.g., etiquette mode to power mode, or vice versa) or adjust a bell sound or the strength of vibration. To this end, the sub-device according to this embodiment may have side keys 362-1 and 362-2, a navigation key 364, a lock key 366, and the like.

With the two devices 100 and 300 separated, when the user inputs one of the function keys 362, 364, and 366, a signal of the inputted function key is transferred to the main device 100 via the connection unit 230. The controller 180 of the main device 100 converts the mode of the main device 100 or adjusts the strength of the bell sound (or vibration) according to the inputted signal.

When the user inputs the upper side key 362-1 for a long time (e.g., two or three seconds), the controller 180 converts the main device 100 into the power mode.

If the user inputs the lower side key 362-2 for a long time (e.g., two or three seconds), the controller 180 converts the main device 100 into the etiquette mode.

When the user simply inputs the upper side key 362-1 (or the navigation key), the controller 180 levels up by one step the bell sound (or vibration) of the main device 100.

When the user simply inputs the lower side key 362-2 (or the navigation key), the controller 180 levels down by one step the bell sound (or vibration) of the main device 100.

When the user inputs the lock key 366, the controller 180 set to lock the main device 100. In this case, if the main device 100 has been already locked, the controller 180 unlocks the locked state of the main device 300 to allow the main device 100 to be manipulated.

In a different embodiment of FIG. 36, temporarily adjusting of a reception volume sound (or bell sound) or the strength of vibration may be applicable.

For example, if the user is in call communication by using the sub-device 300 likewise as in the embodiment of FIG. 28 and inputs the side key (362-1 or 362-2) to adjust the reception sound volume, the controller 180 adjusts the level of the reception sound of the main device 100 according to the user input. In this case, the adjusted level of the reception sound is maintained only during the user's call communication. When the user's call communication is terminated and the controller detects it, the controller 180 changes the level of the reception sound of the main device 100 to its original set value.

Figure 37:
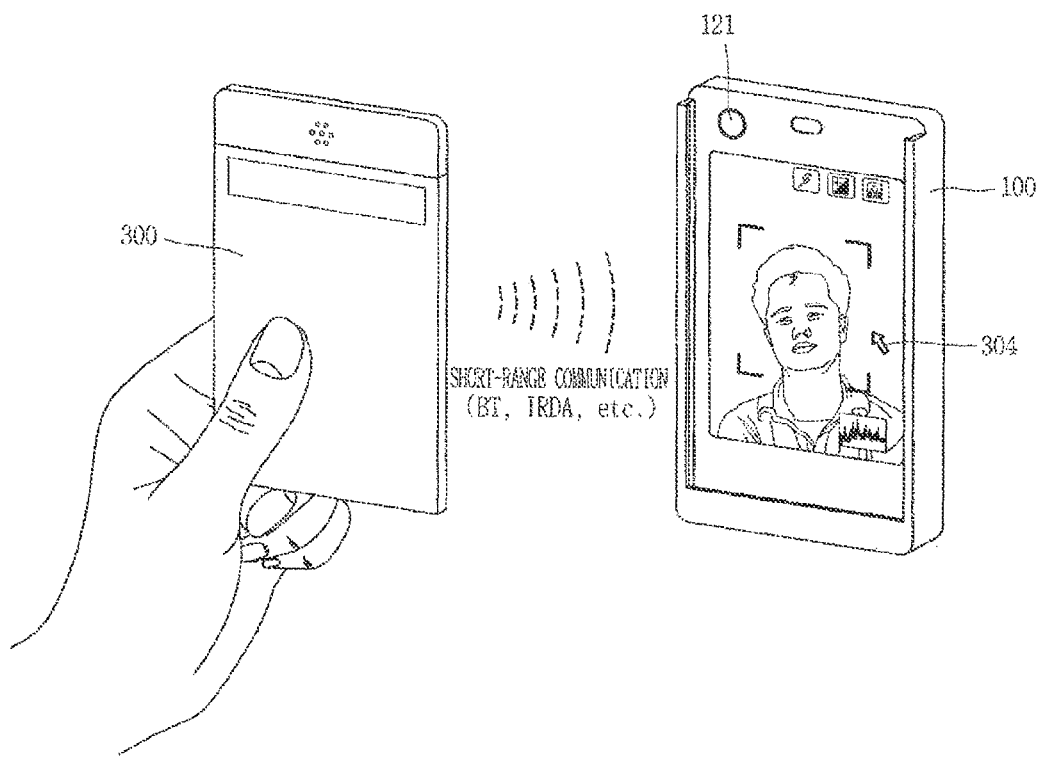
FIG. 37 illustrates remote controlling of an image capture function.

FIG. 37 illustrates remote controlling of an image capture function.

In the state that the main device 100 and the sub-device 300 are separated, the sub-device 300 according to this embodiment may remotely control the camera 121.

With a short-range radio communication path established with the sub-device 300, when the main device 100 is converted into the camera mode, the controller 180 executes an image capture application and displays a mouse pointer 304 at one point of the screen image as shown in FIG. 37.

The controller 180 controls the movement of the mouse pointer 304 according to a touch manipulation by the user inputted to the sub-device 300. Like the touch pad of a notebook computer, the user may control the mouse pointer 304 by simply moving a certain pointer 309 as shown in FIG. 30.

The user may perform a self-camera image capturing or Web-cam image capturing by using the sub-device 300 in a state that the sub-device 300 is separated from a camera module of the main device 100. Or, the user may remotely change set values of various camera environment settings (e.g., resolution, screen mode, filter, balance, timer, image capture mode, ISO, picture image, storage space, clean view setting, hand-shaking prevention, eye blinking prevention, automatic focusing, image capture sound, guide image capturing, and the like) and store the same. And, the user may conveniently use them for video call communication.

Figure 38A:
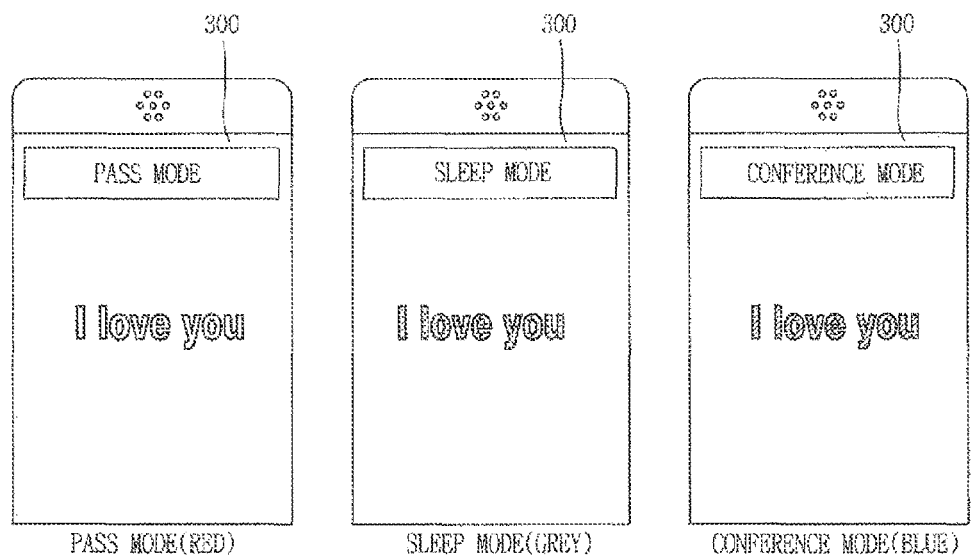
FIGS. 38a and 38b illustrate controlling of an emotion mode.
Figure 38B:
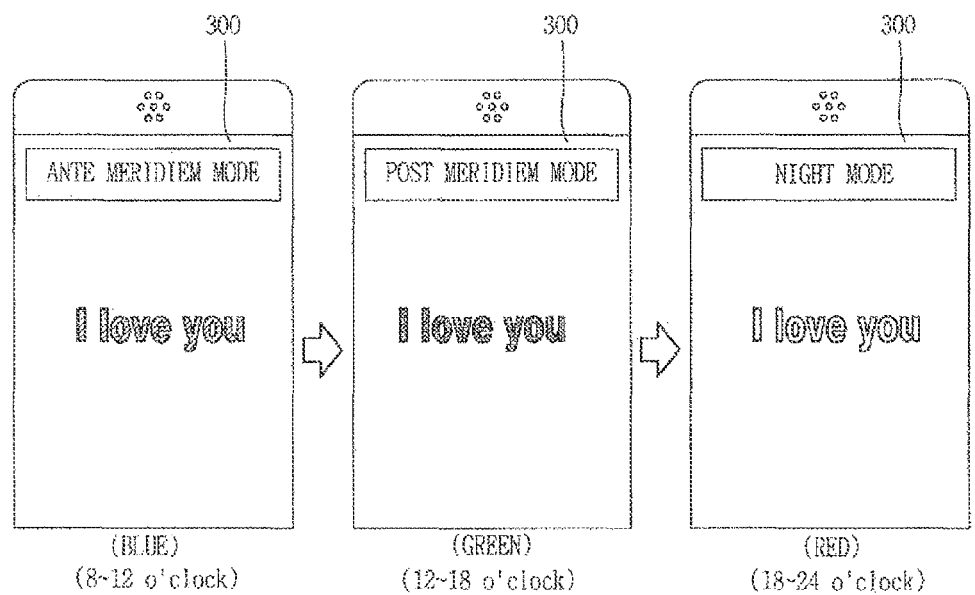

FIGS. 38a and 38b illustrate controlling of an emotion mode.

The sub-device 300 according to an embodiment of the present invention is not only a control device controlling the mobile terminal or a multimedia device interworking with the mobile terminal but also has the characteristics as an accessory allowing the user to create different atmospheres (e.g., a background color, a letter color, etc.) according to the user situation or time slots. That is, the sub-device may used as a tool for expressing the user's emotion.

In an embodiment as shown in FIG. 38a, the emotion mode of the sub-device 300 is divided into an active mode, a sleep mode, a conference mode according to user situations and different background colors and letter colors are applied to each mode. In this embodiment, the background color or the letter color of the sub-device 300 may be set as gray for the sleep mode, blue for the conference mode, and red for the active mode. The background color or letter color applied to each mode manifests the user's emotion, and the setting of the colors of each mode (sleep mode, active mode and conference mode) may be arbitrarily selected by the user. The sub-device 300 may include an illumination element (e.g., a light emitting diode (LED), etc.) for representing a background color.

In the embodiment of FIG. 38b, the emotion mode of the sub-device 300 may be divided into an anti meridiem (a.m.) mode, a post meridiem (p.m.) mode and a night mode, and different background colors or letter colors are applied to the respective modes. Once the user finishes setting of the background colors (or letter colors) for the respective modes, the sub-device 300 automatically changes the background color (or the letter color) of each mode with the lapse of time.

FIGS. 39a to 39e illustrate controlling of a function of the clip type sub-device.

In the state that the two devices 100 and 300 are separated, the navigation, GPS information display function, handsfree function, call function, remote camera controlling, and the like, may be more effectively operated in the clip-type sub-device 300.

The clip-type sub-device 300 may be simply put on the user's pockets or belts in a state of being separated from the main device 100, and the coupling unit 410 may be integrally configured to be attached to the part of the user's body or a protrusion of a device. The mechanical characteristics of the clip-type sub-device 300 can exert its effects when the user makes a trip or tracking outdoors.

In this embodiment, the sub-device 300 may basically include the display 251, the input unit (e.g., the microphone, etc.), and the output unit (e.g., the audio output unit, the earphone connection unit, etc.). In addition, the multi-stage slide button 312 may be provided to execute two or more functions.

Figure 39A:
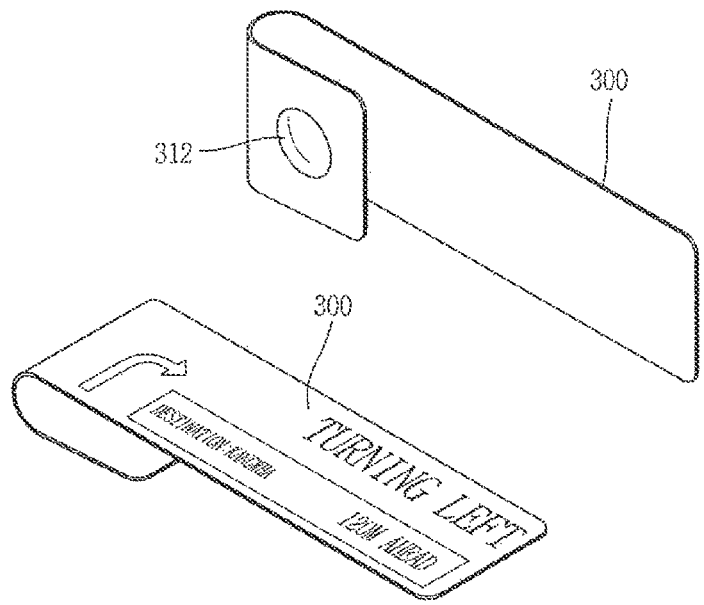
FIGS. 39a to 39e illustrate controlling of a function of the clip type sub-device.

As shown in FIG. 39a, the clip-type sub-device 300 may provide a navigation function.

When the user executes an application to be provided with the navigation service, the controller 180 connects to a server to download service information according to the movement of the user. And the controller 180 transfers information about navigation to a destination, via the short-range radio communication path established with the sub-device 300. The information transferred to the sub-device 300 is displayed as shown in FIG. 39a.

Figure 39B:
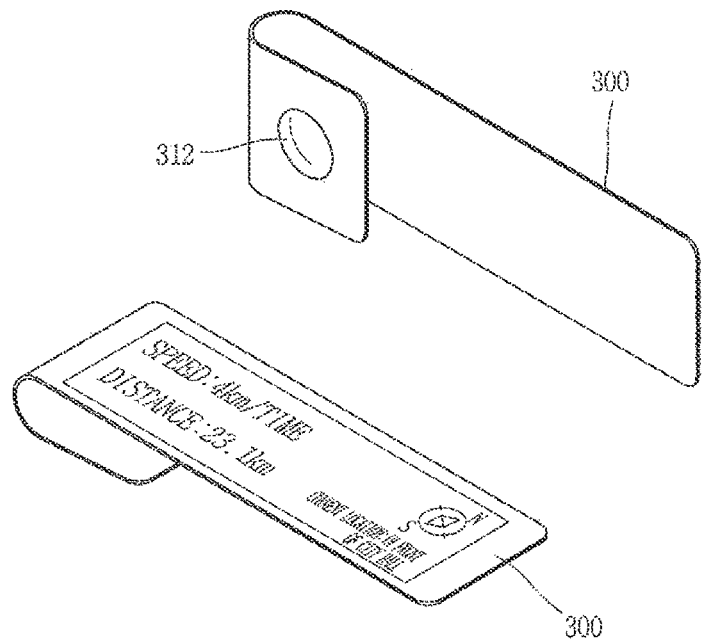

The clip-type sub-device 300 according to this embodiment may provide a GPS information display function as shown in FIG. 39b. The clip-type sub-device 300 receives various GPS information from the main device 100 and displays the same. The sub-device 300 may provide information regarding a current location of the user, the distance to the destination, the direction, the speed, and the like.

Figure 39C:
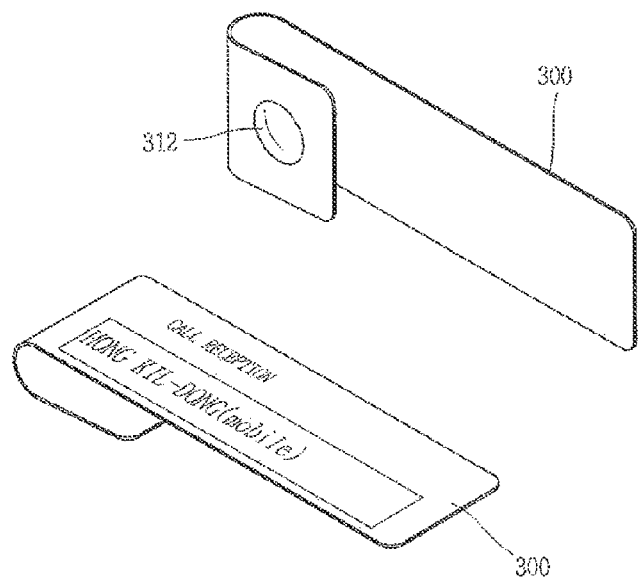

In this embodiment, as shown in FIG. 39c, the clip-type sub-device 300 may provide a message reception and call function. When a call is received by the main device 10, as shown in FIG. 28, the short-range radio communication path is established between the main device 100 and the sub-device 300 and the user can perform call communication with another party by using the sub-device 300.

Figure 39D:
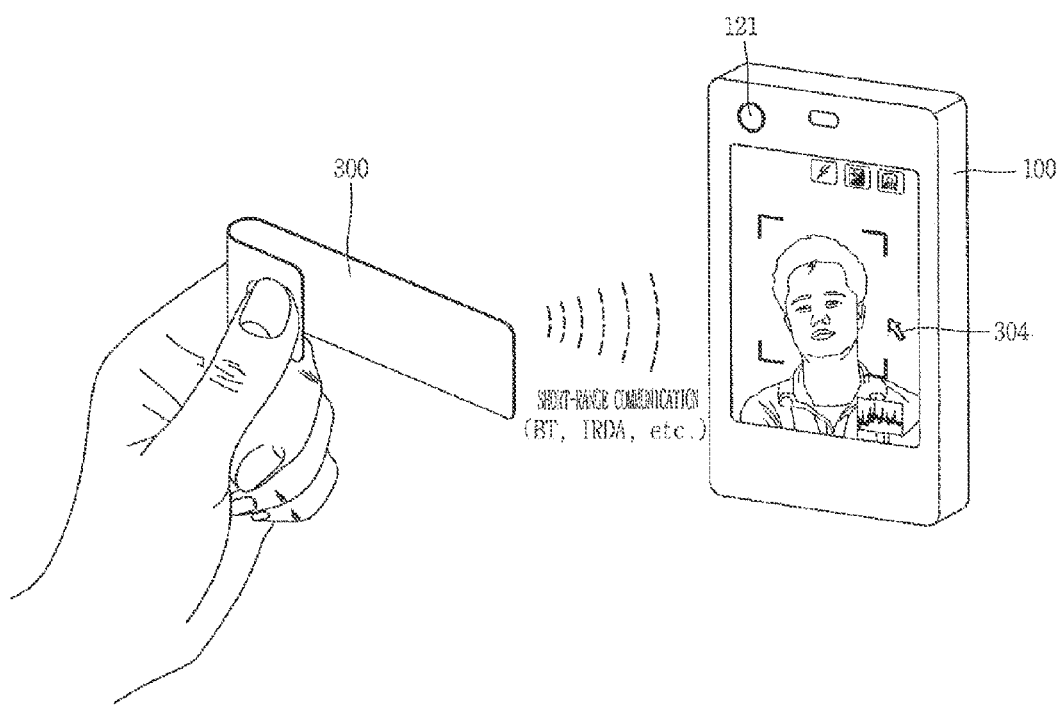

In this embodiment, the clip-type sub-device 300 may provide a remote image capture control function as shown in FIG. 39d. Separated by a certain distance from the main device 100, the sub-device 300 remotely operates the camera of the main device 100 according to a user input (e.g., input of the button 312).

Figure 39E:
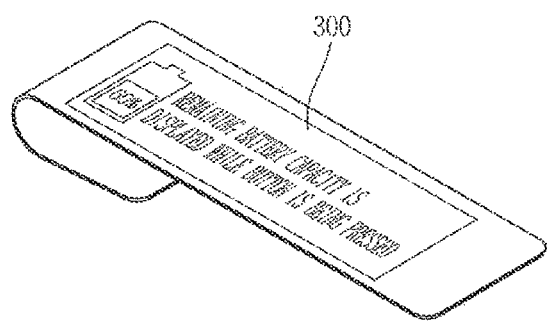

As shown in FIG. 39e, the clip-type sub-device 300 may provide a remaining battery capacity display function. The controller 180 periodically measures a remaining battery capacity of the main device 100 and transfers the measured value to the sub-device 300. Then, the sub-device 300 may display the transferred measured value, or may store it and then display it when the button 312 is inputted by the user.

Control Method in a Coupled State (Combine Concept UI)

The control method in the coupled state will now be described. That is, in the state that the main device 100 and the sub-device 300 of the mobile terminal are coupled, the two devices 100 and 300 are controlled variably.

Figure 40A:
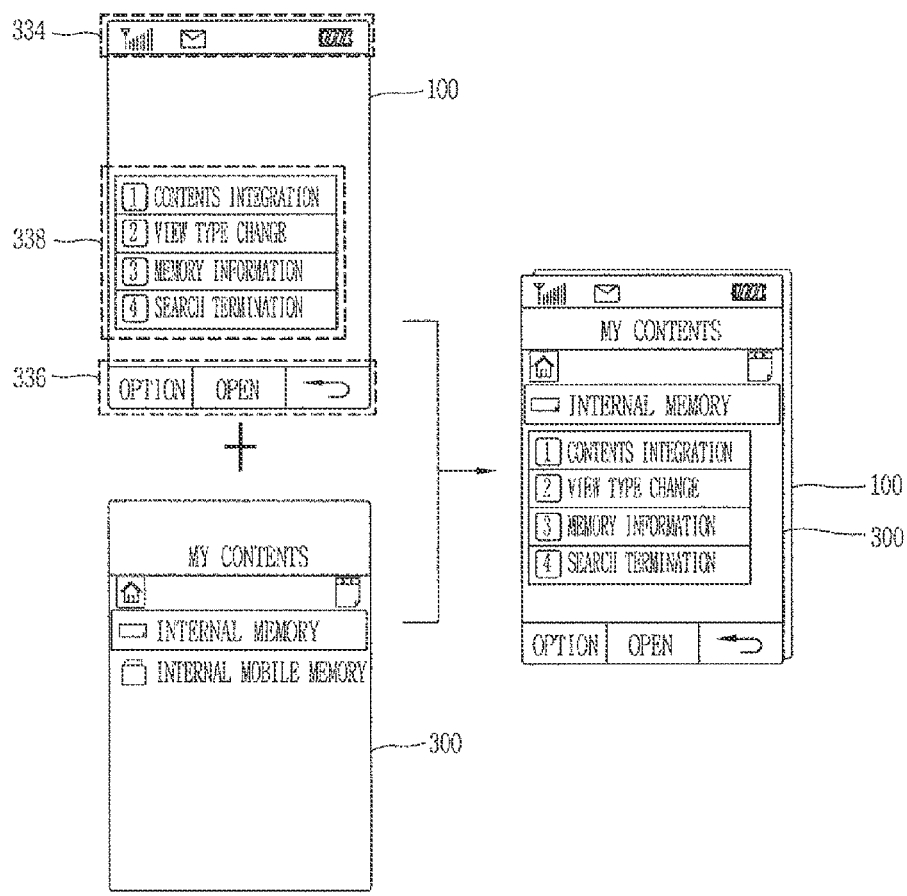
FIGS. 40a and 40b illustrate an example of a method of controlling the main device 100 and the sub-device 300 in a coupled state.
Figure 40B:
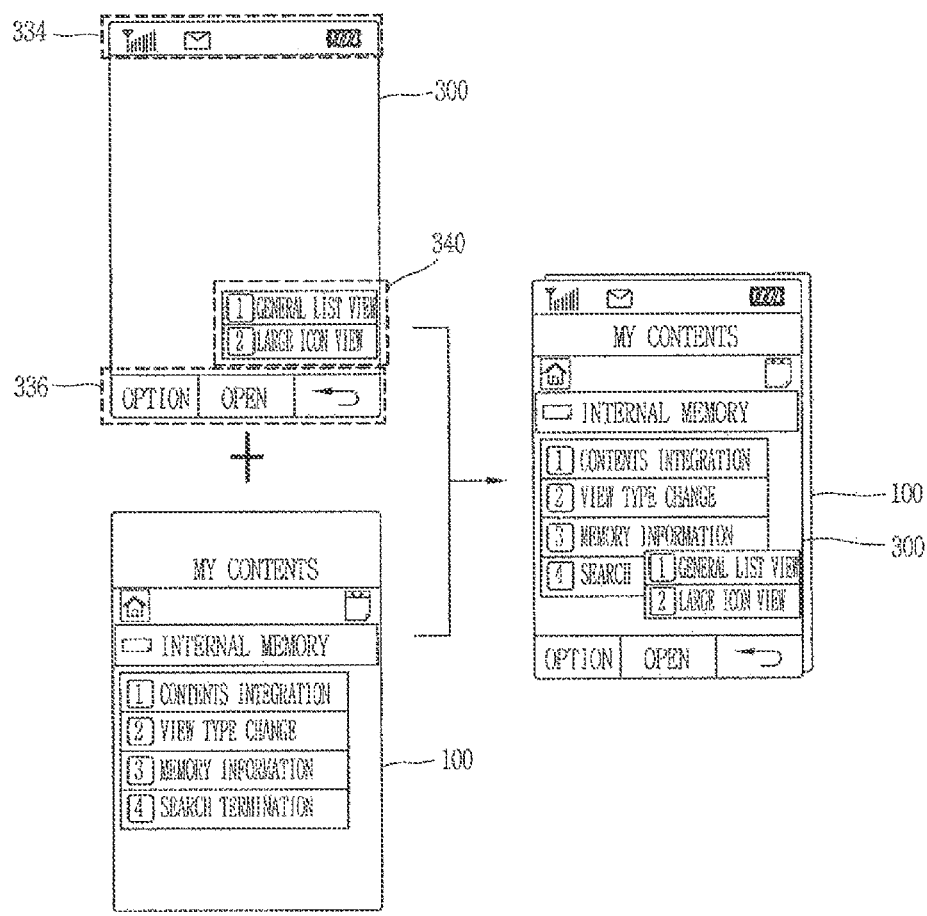

FIGS. 40a and 40b illustrate an example of a method of controlling the main device 100 and the sub-device 300 in a coupled state.

In this embodiment, in the state that the two devices 100 and 300 are coupled, a 'my contents' menu is executed and the entire screen image and a pop-up screen image of the 'my contents' menu are divided to be displayed on the display of the main device 100 and that of the sub-device 300.

Once the 'my contents' menu is executed, the controller 180 displays a 'my contents' screen image on the main device 100, and then, displays an indicator 334 and a software menu 336 on the sub-device.

Thereafter, when the user presses an 'option' software menu, the controller 180 displays a corresponding pop-up window (option main menu window 338) on the sub-device 300 as shown in FIG. 40a. And the indicator 334 and the software menu 336, which have been displayed on the sub-device 300, are interchanged to be displayed along with the 'my contents' screen image on the main device 100.

Because the option menu window 338, which is additionally displayed on the 'my contents' screen image, is displayed via the sub-device 300 overlaid on the main device 100, the menu screen image of the terminal has a cubic effect.

FIG. 40b shows displaying of a corresponding sub-menu window 340 on the sub-device 300 when a 'view type change' item is selected from the option main menu window 338 of FIG. 40a.

When the sub-menu window 340 is displayed on the sub-device 300, the controller 180 displays the corresponding pop-up window (sub-menu window 340) on sub-device 300 as shown in FIG. 40b. And the controller 180 displays the option main menu window 338, which has been displayed on the sub-device 300, on the main device 100 together with the 'my contents' screen image.

FIG. 41 illustrates another example of a method of controlling the main device 100 and the sub-device 300 in a coupled state.

In this embodiment, in the state that the main device 100 and the sub-device 300 are coupled, a specific function (e.g., photo album, etc.) is executed and a selected object and non-selected objects of a corresponding menu list are divided to be displayed on the two devices 100 and 300.

As shown in FIG. 41, when the user executes the photo album, the controller 180 displays a file list of the photo album on the main device 100 and displays the indicator 334, the software menu 336 and a scroll bar 424 on the sub-device 300.

When the user touches a specific object (e.g., Lee Na-young) on the file list, a selection bar of the list is placed on the touched object 'Lee Na-young', selecting the object. The controller 180 provides control to allow the object being displayed (e.g., text of "Lee Na-young") on the main device 100 to be displayed on the sub-device 300.

Thereafter, when the user maintains the touch for more than two or three seconds, namely, when the user inputs a long touch, the controller 180 displays an image of the object 'Lee Na-young' on the sub-device 300. When the touch is removed (namely, when the user takes off his hands, the object (e.g., 'Lee Na-young') and the selection bar 422, which have been displayed on the sub-device 300, are moved to the main device 100. In this respect, however, the terminal may be set such that the object (e.g., 'Lee Na-young') and the selection bar 422 are displayed as it is on the sub-device 300. In addition, the object (e.g., 'Lee Na-young') and the selection bar 422 may be moved to the main device with the lapse of a certain time.

The mobile terminal according to an embodiment of the present invention may classify a touch operation detected in the state that the main device 100 and the sub-device 300 are coupled, into a touch (or a proximity touch), a long touch, a long touch & drag, and the like, and process them. Various sensors may be provided to perform various sensing functions, and a proximity sensor or a tactile sensor may be provided in the sensing unit 140 to sense a proximity touch.

When a touch detected from the exterior is a long touch (a touch of at least more than two to three seconds), the controller 180 moves an image list (e.g., the object 'Lee Na-young') of the main device 100 corresponding to the touched point to display it on the sub-device 300 as shown in FIG. 41. The long touch may be used to selectively move a desired one of the objects displayed on the main device 100 to the sub-device 300. The user performs long touch on a specific object of the main device 100 to move it to be displayed on the sub-device 300. Meanwhile, if unnecessarily too many objects are displayed on the sub-device 300, the user may selectively move to display the objects of the sub-device 300 on the main device 100 by using a certain touch input.

If dragging is detected along with a long touch from the exterior, the controller 180 may display a preview screen image of an image selected by the long touch on the sub-device 300.

A selection cursor (or a selection bar 342) of the main device 100 is moved along the dragging operation, and an image selected by the selection cursor 342 is displayed on the preview screen. Thereafter, when the external touch disappears, the first image selected by the long-time touch is displayed. In this case, as soon as contact from the user is removed (i.e. immediately after the user takes his finger off the touch screen), the controller 180 can provide control such that either the initial image re-appears or the currently displayed image is maintained on the display for a short period of time and then shows the initial image thereafter.

Figure 42:
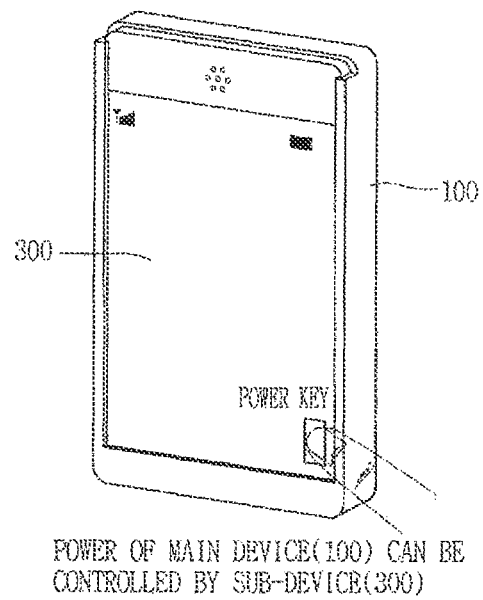
FIG. 42 illustrates controlling of power of the terminal.

FIG. 42 illustrates controlling of power of the terminal.

In this embodiment, when the main device 100 and the sub-device 300 are coupled, power of the main device 100 may be turned on or off by using a power key (e.g., hardware or software key) 426 provided at the sub-device.

When the input of the key 426 is detected, a signal generated by the key input is transferred to the controller 180 via a certain path and the main device 100 is turned off as the controller 180 cuts off power supply.

Figure 43A:
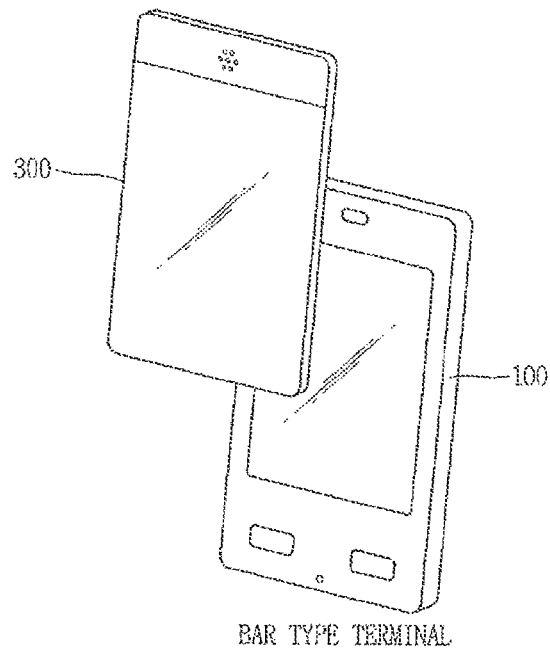
FIGS. 43a to 43c illustrate coupling of non-touch type terminals and the sub-device.
Figure 43B:
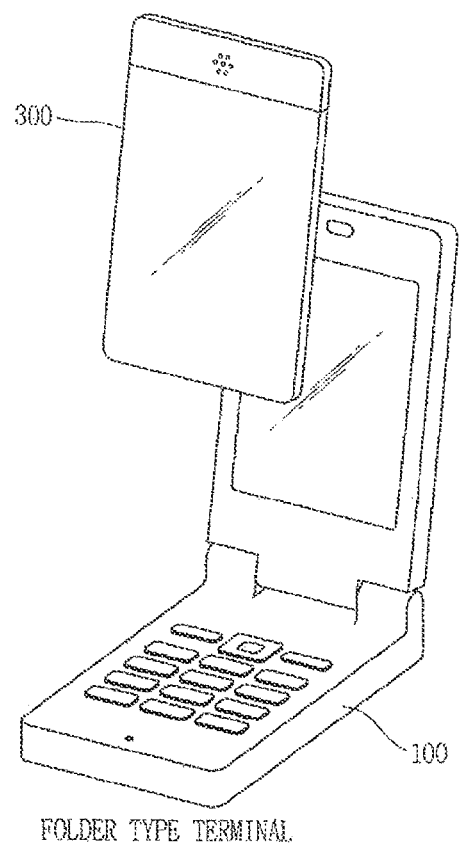
Figure 43C:
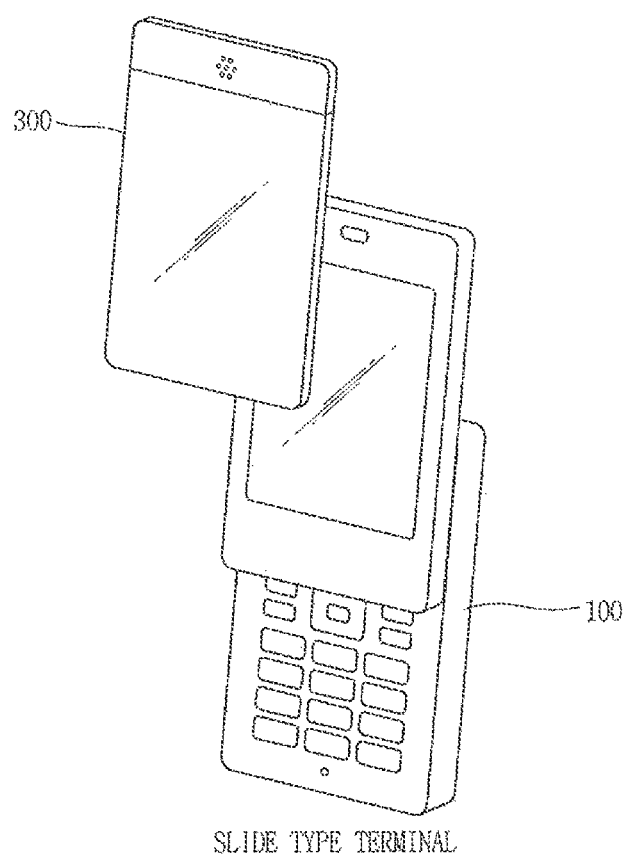

FIGS. 43a to 43c illustrate coupling of non-touch type terminals (bar type, folder type, slide terminals) and the sub-device. In this embodiment, the sub-device 300 may be coupled to the non-touch type terminal to have a touch function.

In this embodiment, because the sub-device 300 includes the touch pad and the touch sensor, it converts pressure applied to a particular portion of the touch pad or a change in capacitance generated at a particular portion of the touch pad into an electrical input signal.

In order to give the touch function to the non-touch type terminal, the user may couple the non-touch type terminal and the sub-device 300 and establishes a short-range radio communication path between the two devices.

With the short-range radio communication path established with the terminal, when a touch input is detected, the sub-device 300 transmits a corresponding signal(s) and data to the terminal via the communication path.

Then, the controller 180 of the terminal calculates the touched object (or region) of the display unit 151 based on the transmitted data, and moves, selects, executes the corresponding object according to a pattern (e.g., long touch, dragging, flicking, etc.) of the touch input.

Embodiments (FIGS. 44 to 49) in which the main device and the sub-device are functionally specialized will now be described.

For example, in the mobile terminal, the main device 100 is specialized as a voice function part (or control function part) and the sub-device 300 is specialized as a visual function part.

FIG. 44 illustrates a voice function part and a visual function part of the mobile terminal. FIG. 44(A) shows closed configuration as the voice function part (or first body) 100 and the visual function part (or second body) 300 are coupled. FIG. 44(B) shows an open configuration of a folder type mobile terminal with first and second bodies engaged in a vertical direction and a communicator type mobile terminal with first and second bodies engaged in a horizontal direction.

In this embodiment, the voice function part 100 may include the wireless communication unit 110, the audio input unit 122, the audio output unit 152, the user input unit 130 (e.g., keypad, etc.), the controller 180, and the like. The visual function part 300 may include the display 151, a digital broadcast receiving module (DMB) module, the camera 121, and the like.

The voice function part 100 and the visual function part 300 may commonly include the microphone 122, the speaker 152, the battery 190, and the short-range communication module 114.

Figure 45:
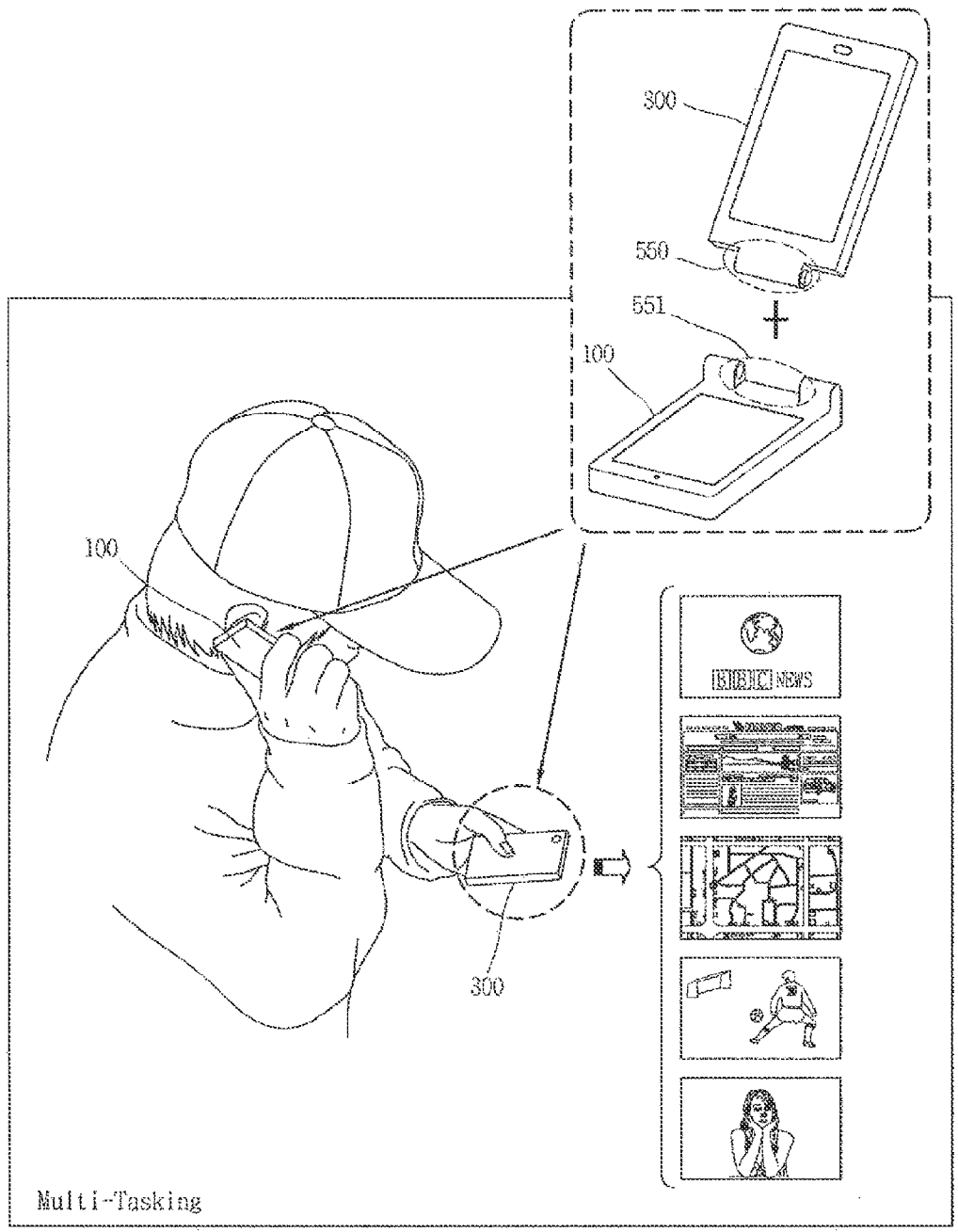
FIG. 45 illustrates multitasking of the voice function part and the visual function part.

FIG. 45 illustrates multitasking of the voice function part and the visual function part. It is assumed that the user performs call communication via the first body 100.

As shown in FIG. 45, the user may separate the visual function part 300, namely, the second body, from the first body and attempt Web surfing (local information, performance (concert or exhibition) information, map, etc.) to obtain information required for conversation with another party during the call communication, search a subway line route map, search a phone book, checks a schedule, transmits/receives a message (e.g., short message service (SMS), multimedia message service (MMS), or e-mail, etc.), or use a camera. If the user is in video call communication, he may show another party surroundings via the camera attached to the second body 300.

The embodiment of FIG. 45 may be applicable in the same manner in the opposite situation. For example, when the user is executing a particular function (e.g., game, digital broadcast (DMB), text viewer, e-book, text editor (e.g., word (office), etc.), Web surfing, multimedia (e.g., video, etc.) via the second body 300, he may receive a call (e.g., voice call, video call).

The hinge parts 550 and 551 illustrated in FIG. 45 are examples of fastening units that can be applicable to couple the first body 100 and the second body 300.

Figure 46:
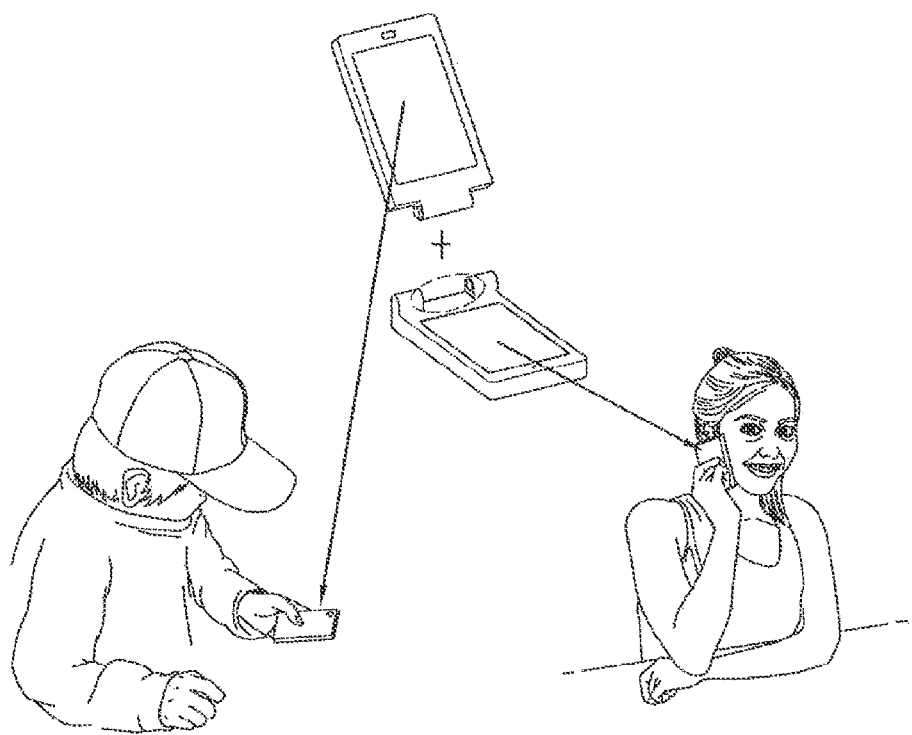
FIG. 46 illustrates the mobile terminal used by several people at the same time.

The terminal including the voice function part and the visual function part that can be coupled or separated may be used by several people at the same time. FIG. 46 illustrates the mobile terminal used by several people at the same time.

As shown in FIG. 46, in a state that the user performs call communication with the first body 100, another user may execute the visual function such as game, digital broadcast (DMB), Web surfing, multimedia (e.g., video, etc.), and the like, with the second body 300.

Some of the visual functions may be executed by the second body 300 by itself, but for the others, the second body 300 may interwork with the first body 100 to receive those executed in the first body 100 through short-range radio communication and display the same. When the second body 300 includes an execution module or an application mounted therein, it can execute a corresponding visual function by itself.

When the second body 300 executes navigation, the second body is separated to be mounted at one side of a dashboard of a vehicle and navigation remote controlling may be performed by using the first body 100. In addition, when voice call communication is performed, the first body 100 and the second body 300 simultaneously perform voice call communication and navigation, respectively, performing multitasking. Thus, the user can perform call communication via the first body 100 without affecting the operation of the navigation.

Figure 47A:
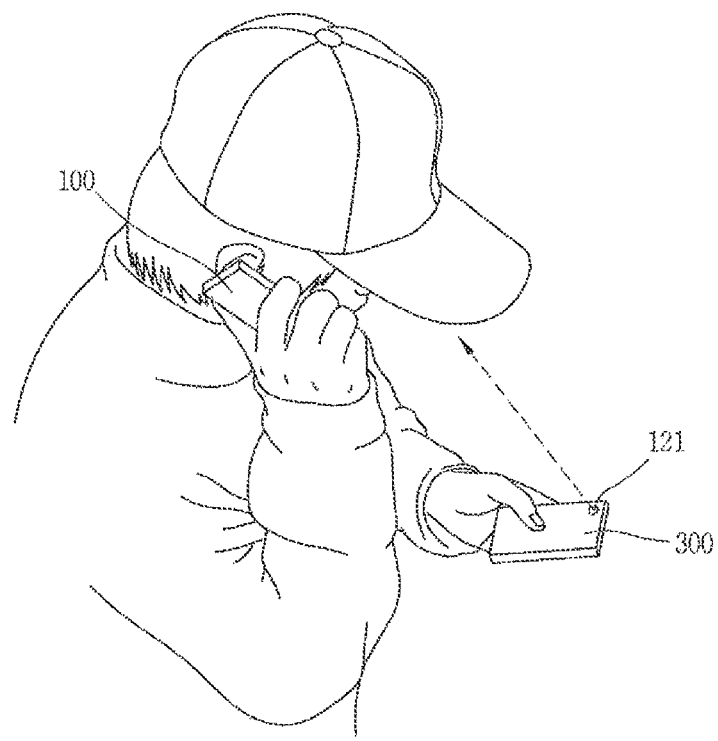
FIGS. 47a and 47b illustrate a video call of the mobile terminal according to an embodiment of the present invention.
Figure 47B:
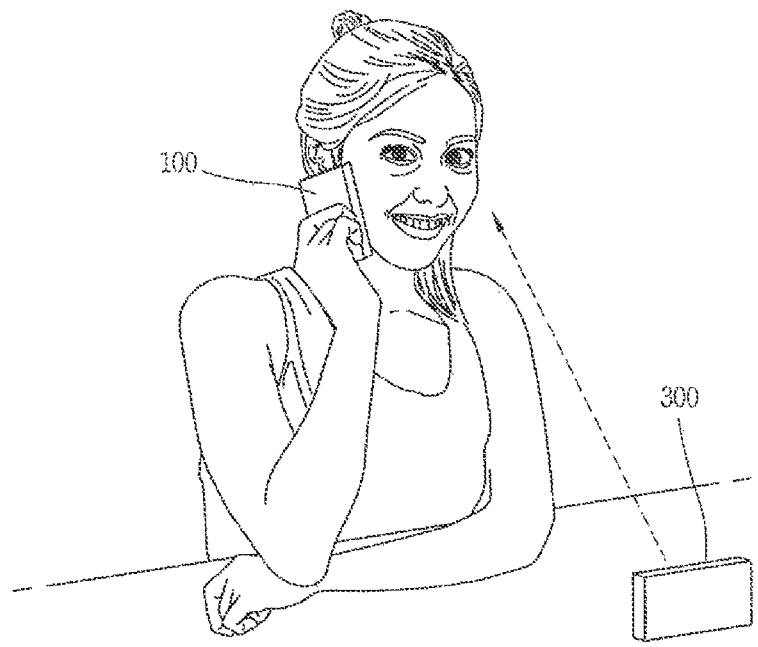

FIGS. 47*a* and 47*b* illustrate a video call of the mobile terminal according to an embodiment of the present invention.

In FIG. 47*a*, the user may communicate with another party via the first body 100 while viewing himself and another party displayed on the display of the second body 300. When the image of the user is captured by the camera 121 mounted on the second body 300, the controller 180 receives the captured image from the second body 300 and transmits it to the terminal of another party.

In case of video call communication using a general mobile terminal, in order to transmit the image of the user to another party, the terminal must be separated from the user by more than a certain distance, causing the user's voice to interfere with others around the user. In addition, in order to avoid interference with others, the use of an ear microphone is essential. However, in this embodiment, the user can perform video call communication freely without using such an ear microphone and without invading privacy of the user himself.

In FIG. 47*b*, the user may perform video call communication with the second body 300 including the camera 121 mounted at a certain distance the user's hands may not reach. This is convenient when the user wants to include objects or people around him in a single screen or when the user performs call communication for a long time.

The second body 300 illustrated in FIG. 47B may be used for monitoring (or remote monitoring). Namely, the second body 300 separated from the first body 100 may be placed at a position desired to be monitored, and the controller 180 may receive an image captured by the remote second body 300. In this case, the camera 121 of the second body 300 operates as a remote monitoring camera, and the controller 180 displays the image received from the second body 300. In this embodiment, the first body 100 may include a display unit (not shown) and displays the image received from the second body via the display unit. In the separated state, the separation distance between the first and second bodies 100 and 300 cannot exceed the short-range communication available range.

FIG. 48 illustrates the use of the second body in the separated state.

As shown in FIG. 48, the second body 300 separated from the first body 100 may operate variably as a remote controller, a keyboard, a Bluetooth headset, and the like.

A user input detected by the keyboard 130 of the first body 100 is transferred (through short-range radio communication) to the second body, and the controller 180 displays the transferred user input on the display unit 151. The user may use the first body 100 as a remote keyboard.

When the first and second bodies 100 and 300 are separated, the controller 180 establishes a short range radio communication path between the two devices 100 and 300. Transmission of a control signal or a data signal between the two separated devices 100 and 300 is made via the established short-range radio communication path. When Bluetooth™ is adapted as the short-range radio communication method, the first body 100 or the second body 300 may be used as a Bluetooth headset.

As described above, when navigation is executed by the second body 300, the user may use the first body as a remote controller. Navigation executed by the second body 300 is remotely controlled according to a user manipulation inputted via the first body 100.

In case of a self-camera, the user may use the first body 100 as a remote controller or a timer to control the camera 121 of the second body 300 as shown in FIG. 47*b*. The controller 180 remotely controls the operation of the camera 121 according to the user manipulation inputted via the first body 100.

Figure 49:
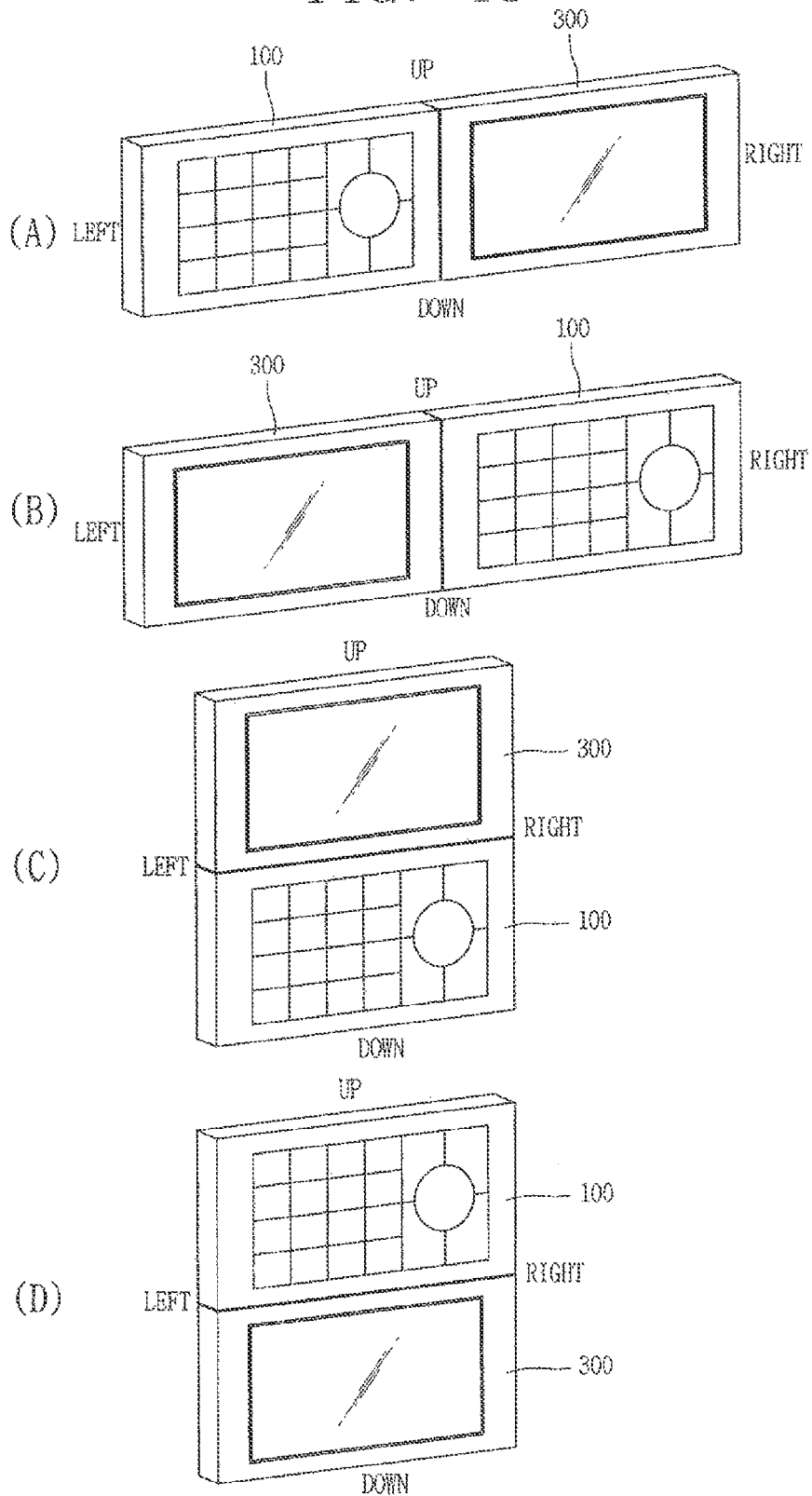
FIG. 49 illustrates a coupling method of first and second bodies according to an embodiment of the present invention.

FIG. 49 illustrates a coupling method of first and second bodies according to an embodiment of the present invention.

The mobile terminal shown in FIG. 49 is implemented such that the two component (i.e., first body 100 and second body 300) are coupled in four directions, and the fastening unit applicable for the coupling is as illustrated in FIGS. 9 to 13.

FIG. 49*c* shows the mobile terminal with the second body 300, which performs the visual function, coupled to a lower end of the first body 100. When a text message is created and transmitted, user's privacy can be protected.

An embodiment of a mobile terminal that charges a battery with a solar cell.

The solar cell is a device for changing light energy directly or indirectly emitted from the sun into electrical energy, which may use a photo voltage effect of semiconductor such as silicon.

Figure 50:
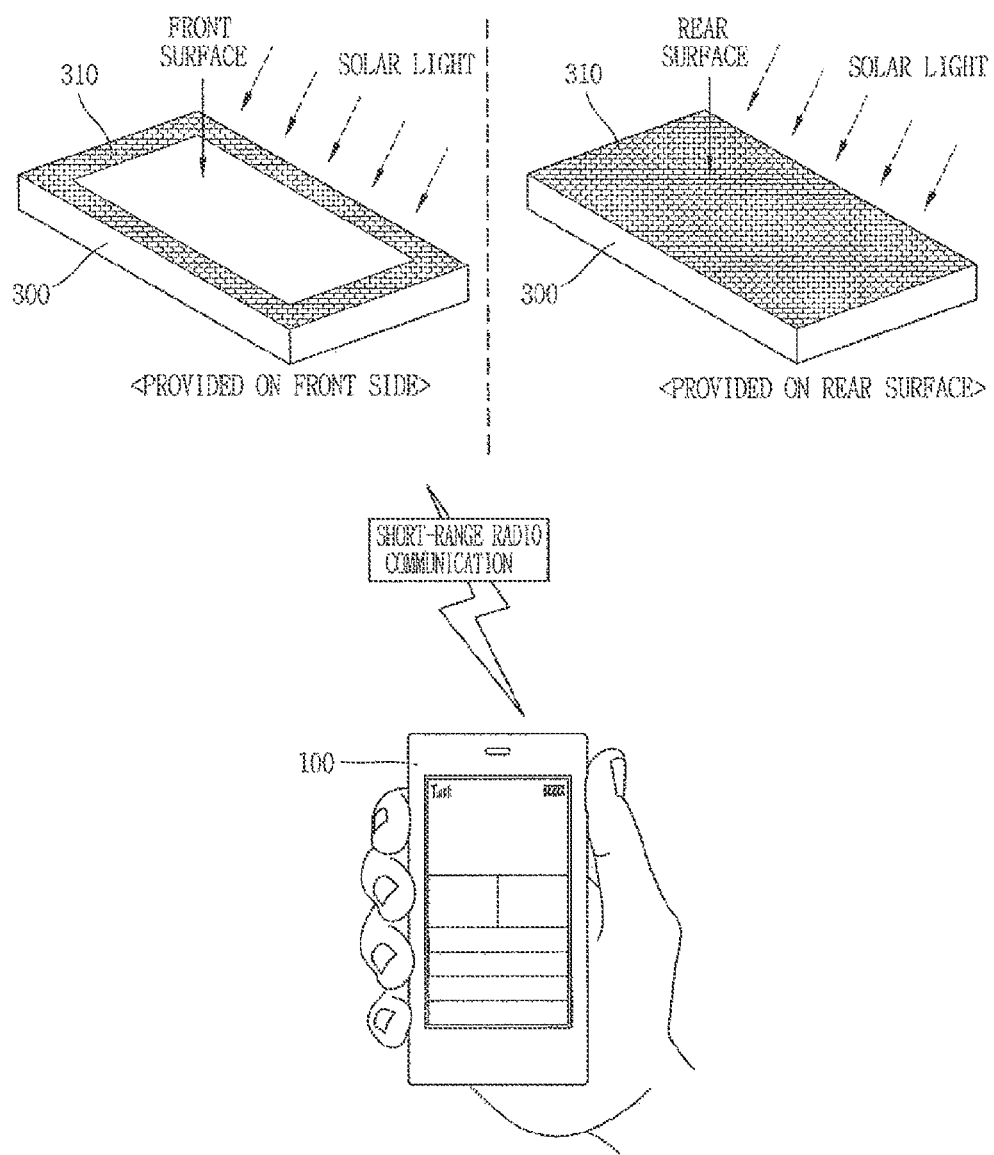
FIG. 50 illustrates the mobile terminal provided with power from a solar cell.

FIG. 50 illustrates the mobile terminal provided with power from a solar cell. The main device (i.e., first body 100) or the sub-device (i.e., the second body 300) may have a solar cell. In this embodiment, it is assumed that the sub-device 300 includes a solar cell 310. The solar cell 310 may be attached to a front or rear surface of the sub-device 300. Or, the solar cell 310 may be attached to both the front and rear surfaces of the sub-device 300.

As shown in FIG. 50, the sub-device 300 includes the solar cell 310 attached at one side of the body surface.

The body surface of the sub-device 300 collects solar light energy the sun directly or indirectly emits, and converts the collected solar light energy into electrical energy. The electrical energy is charged in the battery (e.g., the power supply unit 190) of the sub-device 300 or the main device 100.

When the two devices 300 and 100 are in a coupled state, the controller 180 starts charging of the main device 100 after the sub-device 300 is completely charged. However, the main device 100 may be first charged according to a user selection.

Figure 51:
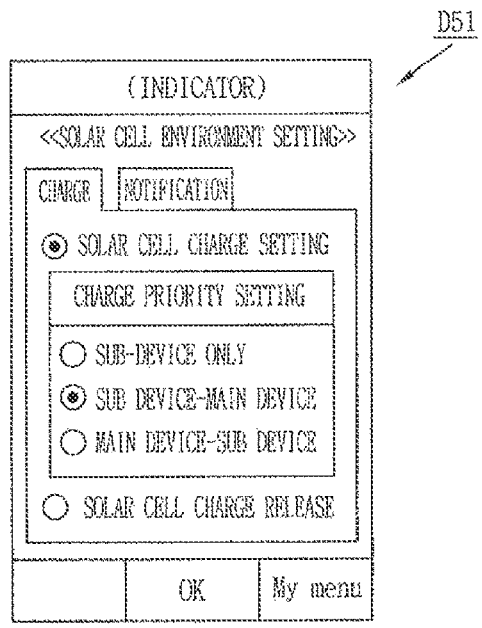
FIG. 51 illustrates a screen image of a charge menu of a solar cell environment setting.

FIG. 51 illustrates a screen image of a charge menu of a solar cell environment setting.

When a certain key input is detected, the controller 180 displays a charge menu screen image D51 as shown in FIG. 51. The user can preferentially select a device to be charged through the menu screen image D51.

When a 'sub-device-main device' is set in the charge priority setting, the controller 180 starts charging of the main device 100 after the sub-device 300 is completely charged. If the 'main device-sub-device' is set, the main device3 100 is first charged and then the sub-device 300 is charged.

The setting of the priority in charging is applicable when the sub-device 300 is in a coupled state. If the two devices 100 and 300 are separated, the user may maintain power supply to the main device 100 by replacing the charged battery of the sub-device 300 with that of the main device 100.

Figure 52:
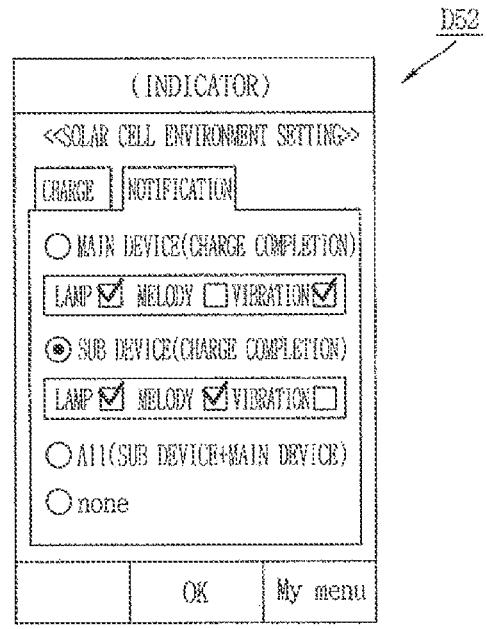
FIG. 52 illustrates a screen image of a notification menu of the solar cell environment setting.
Figure 53:
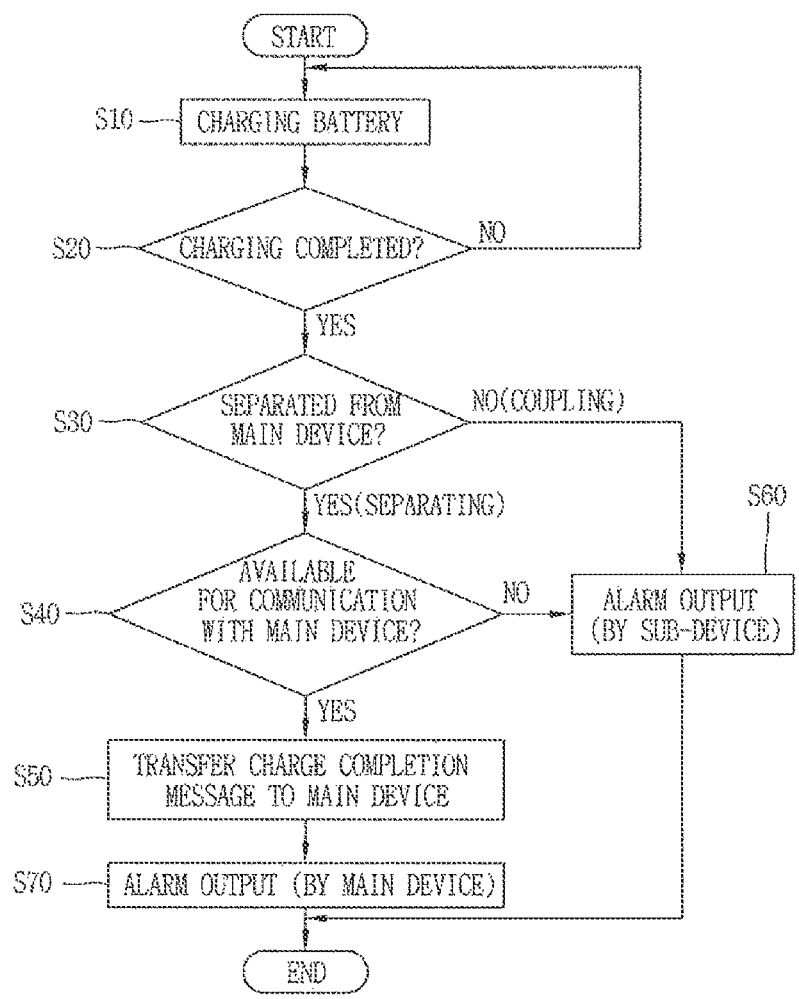
FIG. 53 is a flow chart illustrating the process of charging a battery by the solar cell.

FIG. 52 illustrates a screen image of a notification menu of the solar cell environment setting, and FIG. 53 is a flow chart illustrating the process of charging a battery by the solar cell.

As shown in FIGS. 52 and 53, the user may set a charge completion notification (e.g., vibration, lamp, melody, etc.) of the main device 100 or the sub-device 300 through a notification menu screen image D52.

The controller 180 may display an indicator or output an alarm of lamp, vibration, melody, and the like, to allow the user to recognize whether or not the main device 100 or the sub-device 300 has been completely charged.

The user may set the 'charge completion notification' only at one of the two devices 100 and 300 or at both of the devices 100 and 300.

Thereafter, when charging of the solar cell is completed (S10, S20), the sub-device 300 checks whether it is separated from or coupled to the main device 100 (S30). When the sub-device 300 is checked to be in a state of being separated fro the main device 100, it checks whether short-range communication with the main device 100 is available (S40).

If communication with the main device 100 is available, the sub-device 300 transfers a message signal informing that charging has been completed to the main device 100 (S50). Then, the controller 180 of the main device displays a certain icon indicating the completion of charging of the sub-device 300 at an indicator region, and outputs an alarm (e.g., lamp, vibration, melody, etc.) according to the charge completion notification setting) (S70).

If the sub-device 300 is not available for communication with the main device 100, the sub-device 300 outputs the alarm such as the lamp, vibration, melody, and the like, according to the charge completion notification setting (S60).

There may be various reasons for the situation in which the sub-device 300 is not available for communication with the main device 100, and one of the major reasons would be that the sub-device 300 is out of the short-range communication available range with the main device 100.

For re-recharging the solar cells, when the sub-device 300 is placed in a sunny location (i.e. where sunlight is plentiful) at some distance away from the user or from the main device 100, the sub-device 300 may produce an alert (e.g., by emitting sounds, sending signals to the main device 100, etc.) to notify the user that solar cell re-charging has been completed.

When the sub-device 300 is checked to be in a state of being coupled to the main device 100 in step S30, the sub-device 300 directly outputs an alarm to allow the user to recognize that its battery has been charged (S60). Also, the main device 100 displays an 'charge completion' icon at the indicator region for user recognition. Of course, the sub-device 300 may also display the 'charge completion' icon at one side of the display.

In this embodiment, the user may charge the batteries of the sub-device 300 and the main device 100 any time by the solar cell 310 without the necessity of carrying around a charging device. The user may charge the battery by simply carrying around (e.g., necklace, etc.) the sub-device 300 such that it is exposed to solar light.

In an embodiment of the present invention, the above-described method can be implemented as software codes that can be read by a computer in a program-recorded medium. The computer-readable medium may include various types of recording devices in which data that can be read by a computer system is stored.

The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). In addition, the computer may include the controller 180 of the terminal.

As so far described, by having the sub-device 300 allowed to be attached to or detached from the mobile terminal, the operation and state of the terminal can be remotely controlled.

As the main device 100 and the sub-device 300 are coupled and separated, the operation and state of the terminal can be automatically controlled.

In a state that the sub-device is separated from the main device 100, elements and the application of the main device 100 can be controlled via a short-range radio communication path.

In the state that the main device 100 and the sub-device 300 are coupled, the two devices 100 and 300 may interwork to operate the displays.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a main device having a display and being shaped to define an area accessible via an opening; and
a sub-device configured to be removably coupled to the main device via the opening, wherein the sub-device comprises a pen-type object, wherein the area is sized to receive an elongated portion of the pen-type object to permit coupling of the sub-device with the main device;
a detection unit configured to detect decoupling of the sub-device from the main device;
a controller configured to:
cause the mobile terminal to transition to an unlocked state in response to the detection unit detecting the decoupling of the sub-device from the main device; and
cause the display to display an image in response to the detecting of the decoupling of the sub-device from the main device.

2. The mobile terminal of claim 1, wherein the controller is further configured to change an operation mode of the main device from a first mode to a second mode in response to coupling of the sub-device to the main device.

3. The mobile terminal of claim 1, wherein the controller is further configured to turn on or off the display in response to coupling or decoupling of the sub-device to or from the main device.

4. The mobile terminal of claim 1, wherein the controller is further configured to control the display to display a user setting menu for setting automatic controlling of the mobile terminal in response to coupling or decoupling of the sub-device to or from the main device.

5. The mobile terminal of claim 1, wherein the decoupling occurs when the sub-device is partially withdrawn from the area.

6. The mobile terminal of claim 1, wherein the main device includes an end comprising a substantially planar surface; and
wherein the sub-device includes an end comprising a substantially planar surface such that the end of the sub-device and the end of the main device lie along a same plane when the sub-device is coupled with the main device.

7. The mobile terminal of claim 1, wherein the controller is further configured to:
cause the mobile terminal to transition from a locked state to the unlocked state according to the decoupling of the sub-device from the main device.

8. The mobile terminal of claim 1, wherein the decoupling of the sub-device from the main device occurs when the elongated portion of the pen-type object is partially withdrawn from the area.

9. The mobile terminal of claim 1, wherein the decoupling of the sub-device from the main device occurs when the elongated portion of the pen-type is withdrawn and passes a particular portion of the area.

10. The mobile terminal of claim 1, wherein the sub-device includes an antenna.

11. The mobile terminal of claim 10, wherein the antenna of the sub-device is configured to receive a radio signal transmitted from the main device, wherein the radio signal serves as an energy source to power the sub-device without using an internal battery.

12. The mobile terminal of claim 1, further comprising:
a proximity sensor configured to detect a proximity touch received at the display.

13. The mobile terminal of claim 12, wherein the proximity sensor includes a radio frequency oscillation proximity sensor.

14. The mobile terminal of claim 12, wherein the proximity sensor includes an electrostatic capacity proximity sensor.

15. The mobile terminal of claim 1, further comprising:
a fixing member configured to releasably maintain coupling of the sub-device to the main device.

16. The mobile terminal of claim 15, wherein the fixing member includes a hook.

17. The mobile terminal of claim 15, wherein the fixing member includes a hook positioned to couple with the elongated portion of the pen-type object.

18. The mobile terminal of claim 1, further comprising:
a spring positioned relative to the area to facilitate the decoupling of the sub-device from the main device.

19. The mobile terminal of claim 1, wherein the sub-device further comprises:
a recess formed at an end of the sub-device, wherein the recess facilitates the coupling of the sub-device to the main device.

20. The mobile terminal of claim 1, wherein the sub-device further comprises:
a function key which functionally cooperates with the controller.

21. The mobile terminal of claim 20, wherein the function key is a mouse key.

22. The mobile terminal of claim 1, wherein the sub-device further comprises:
a pointer configured to receive an input, wherein the pointer functionally cooperates with the display of the main device to permit control of a user interface displayed on the display via the input received at the pointer.

23. The mobile terminal of claim 1, further comprising:
a user setting to permit user control of functions associated with the coupling or decoupling of the sub-device.

24. The mobile terminal of claim 1, wherein the controller is further configured to:
cause the display to display information indicating coupling status of the sub-device to the main device.

25. The mobile terminal of claim 1, further comprising:
a haptic element configured to provide a haptic effect in response to an input received at the mobile terminal.

26. The mobile terminal of claim 1, wherein the display of the main device is a flexible display.

27. The mobile terminal of claim 1, further comprising:
a universal subscriber identity module (USIM).

28. The mobile terminal of claim 1, further comprising:
a proximity sensor configured to detect a proximity touch received at the display.

29. The mobile terminal of claim 28, wherein the controller is further configured to:
recognize touch patterns according to the proximity touch detected by the proximity sensor.

30. A method for controlling a mobile terminal comprising a main device and a sub-device, the main device having a display and being shaped to define an area accessible via an opening, wherein the sub-device is configured to be removably coupled to the main device via the opening, the method comprising:
detecting decoupling of the sub-device from the main device, wherein the sub-device comprises a pen-type object, wherein the area is sized to receive an elongated portion of the pen-type object to permit coupling of the sub-device with the main device;
transitioning the mobile terminal to an unlocked state in response to the detecting the decoupling of the sub-device from the main device; and
displaying an image on the display in response to the detecting of the decoupling of the sub-device from the main device.

31. The method of claim 30, further comprising changing an operation mode of the main device from a first mode to a second mode in response to coupling of the sub-device to the main body.

32. The method of claim 30, further comprising turning on or off the display in response to coupling or decoupling of the sub-device to or from the main device.

33. The method of claim 30, further comprising displaying a user setting menu for setting automatic controlling of the mobile terminal in response to coupling or decoupling of the sub-device to or from the main device.

34. The method of claim 30, wherein the decoupling occurs when the sub-device is partially withdrawn from the area.

35. The method of claim 30, wherein the main device includes an end comprising a substantially planar surface; and
wherein the sub-device includes an end comprising a substantially planar surface such that the end of the sub-device and the end of the main device lie along a same plane when the sub-device is coupled with the main device.

36. The method of claim 30, further comprising:
causing the mobile terminal to transition from a locked state to the unlocked state according to the decoupling of the sub-device from the main device.

37. The method of claim 30, wherein the decoupling of the sub-device from the main device occurs when the elongated portion of the pen-type object is partially withdrawn from the area.

38. The method of claim 30, wherein the decoupling of the sub-device from the main device occurs when the elongated portion of the pen-type is withdrawn and passes a particular portion of the area.

39. The method of claim 30, wherein the sub-device includes an antenna.

40. The method of claim 39, wherein the antenna of the sub-device is configured to receive a radio signal transmitted from the main device, wherein the radio signal serves as an energy source to power the sub-device without using an internal battery.

41. The method of claim 30, further comprising:
detecting a proximity touch received at the display via a proximity sensor.

42. The method of claim 41, wherein the proximity sensor includes a radio frequency oscillation proximity sensor.

43. The method of claim 41, wherein the proximity sensor includes an electrostatic capacity proximity sensor.

44. The method of claim 30, further comprising:
maintaining coupling of the sub-device to the main device via a fixing member.

45. The method of claim 44, wherein the fixing member includes a hook.

46. The method of claim 44, wherein the fixing member includes a hook positioned to couple with the elongated portion of the pen-type object.

47. The method of claim 30, further comprising:
decoupling of the sub-device from the main device using a spring.

48. The method of claim 30, wherein the sub-device further comprises:
a recess formed at an end of the sub-device, wherein the recess facilitates the coupling of the sub-device to the main device.

49. The method of claim 30, wherein the sub-device further comprises:
a function key which functionally cooperates with the controller.

50. The method of claim 49, wherein the function key is a mouse key.

51. The method of claim 30, further comprising:
controlling a user interface displayed on the display via an input received at pointer of the sub-device.

52. The method of claim 30, further comprising:
controlling functions associated with the coupling or decoupling of the sub-device via a user setting menu.

53. The method of claim 30, further comprising:
displaying information indicating coupling status of the sub-device to the main device.

54. The method of claim 30, further comprising:
providing a haptic effect in response to an input received at the mobile terminal.

55. The method of claim 30, wherein the display of the main device is a flexible display.

56. The method of claim 30, wherein the mobile terminal further comprises:
a universal subscriber identity module (USIM).

57. The method of claim 30, further comprising:
detecting a proximity touch received at the display via a proximity sensor.

58. The method of claim 57, further comprising:
recognizing touch patterns according to the proximity touch.

* * * * *